US010699382B2

(12) United States Patent
Vogels et al.

(10) Patent No.: US 10,699,382 B2
(45) Date of Patent: Jun. 30, 2020

(54) DENOISING MONTE CARLO RENDERINGS USING NEURAL NETWORKS WITH ASYMMETRIC LOSS

(71) Applicants: Pixar, Emeryville, CA (US); Disney Enterprises, Inc., Burbank, CA (US)

(72) Inventors: Thijs Vogels, Lausanne (CH); Fabrice Rousselle, Ostermundingen (CH); Jan Novak, Meilen (CH); Brian McWilliams, Zürich (CH); Mark Meyer, Davis, CA (US); Alex Harvill, Berkeley, CA (US)

(73) Assignees: Disney Enterprises, Inc., Burbank, CA (US); Pixar, Emeryville, CA (US)

(*) Notice: Subject to any disclaimer, the term of this patent is extended or adjusted under 35 U.S.C. 154(b) by 107 days.

(21) Appl. No.: 16/050,336

(22) Filed: Jul. 31, 2018

(65) Prior Publication Data

US 2019/0304069 A1    Oct. 3, 2019

Related U.S. Application Data

(60) Provisional application No. 62/650,106, filed on Mar. 29, 2018.

(51) Int. Cl.
*G06T 5/00* (2006.01)
*G06N 3/08* (2006.01)
(Continued)

(52) U.S. Cl.
CPC ............ *G06T 5/002* (2013.01); *G06F 17/18* (2013.01); *G06N 3/0454* (2013.01); *G06N 3/08* (2013.01); *G06N 5/046* (2013.01); *G06N 20/00* (2019.01); *G06T 5/50* (2013.01); *G06T 15/06* (2013.01); *G06T 15/506* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS 8,542,898 B2    9/2013    Bathe et al.
9,799,098 B2   10/2017    Seung et al.
(Continued)

OTHER PUBLICATIONS

U.S. Appl. No. 15/946,654, "Notice of Allowance", dated Oct. 8, 2019, 10 pages.
(Continued)

*Primary Examiner* — David Perlman
(74) *Attorney, Agent, or Firm* — Kilpatrick Townsend & Stockton LLP

(57) ABSTRACT

A modular architecture is provided for denoising Monte Carlo renderings using neural networks. The temporal approach extracts and combines feature representations from neighboring frames rather than building a temporal context using recurrent connections. A multiscale architecture includes separate single-frame or temporal denoising modules for individual scales, and one or more scale compositor neural networks configured to adaptively blend individual scales. An error-predicting module is configured to produce adaptive sampling maps for a renderer to achieve more uniform residual noise distribution. An asymmetric loss function may be used for training the neural networks, which can provide control over the variance-bias trade-off during denoising.

20 Claims, 26 Drawing Sheets

(51) Int. Cl.
G06T 15/06 (2011.01)
G06T 15/50 (2011.01)
G06N 5/04 (2006.01)
G06N 20/00 (2019.01)
G06F 17/18 (2006.01)
G06N 3/04 (2006.01)
G06T 5/50 (2006.01)

(56) References Cited

U.S. PATENT DOCUMENTS

| | | | |
|---|---|---|---|
| 10,572,979 | B2 | 2/2020 | Vogels et al. |
| 2010/0044571 | A1 | 2/2010 | Miyaoka et al. |
| 2012/0135874 | A1 | 5/2012 | Wang et al. |
| 2014/0029849 | A1 | 1/2014 | Sen et al. |
| 2016/0269723 | A1 | 9/2016 | Zhou et al. |
| 2016/0321523 | A1 | 11/2016 | Sen et al. |
| 2017/0091982 | A1 | 3/2017 | Engel et al. |
| 2017/0109925 | A1 | 4/2017 | Gritzky et al. |
| 2017/0256090 | A1 | 9/2017 | Zhou et al. |
| 2017/0278224 | A1 | 9/2017 | Onzon et al. |
| 2017/0365089 | A1 | 12/2017 | Mitchell et al. |
| 2018/0082172 | A1 | 3/2018 | Patel et al. |
| 2018/0114096 | A1 | 4/2018 | Sen et al. |
| 2018/0158233 | A1 | 6/2018 | Wyman et al. |
| 2018/0165554 | A1 | 6/2018 | Zhang et al. |
| 2018/0204314 | A1 | 7/2018 | Kaplanyan et al. |

OTHER PUBLICATIONS

Bako et al., "Kernel-Predicting Convolutional Networks for Denoising Monte Carlo renderings", ACM Transactions on Graphics, vol. 36, No. 4, Article 97, Jul. 2017, pp. 97:1-97:14.

Papadrakakis et al., "Reliability-Based Structural Optimization using Neural Networks and Monte Carlo Simulation", Computer Methods in Applied Mechanics and Engineering, vol. 191, Issue 32, Jun. 7, 2007, pp. 3491-3507.

Pindoriya et al., "Composite Reliability Evaluation Using Monte Carlo Simulation and Least Squares Support Vector Classifier", IEEE Transactions on Power Systems, vol. 26, No. 4, Nov. 2011, pp. 2483-2490.

Rousselle et al., "Robust Denoising using Feature and Color Information", Computer Graphics Forum, vol. 32, No. 7, Nov. 2013, pp. 121-130.

Zwicker et al., "Recent Advances in Adaptive Sampling and Reconstruction for Monte Carlo Rendering", Computer Graphics Forum, vol. 34, No. 2, 2015, pp. 667-681.

U.S. Appl. No. 15/946,649, "Notice of Allowance", dated Oct. 25, 2019, 9 pages.

Zhang et al., "SeqGAN: Sequence Generative Adversarial Nets with Policy Gradient", Proceedings of the Thirty-First AAAI Conference on Artificial Intelligence (AAAI-17), 2017, pp. 2852-2858.

U.S. Appl. No. 16/050,332, "Notice of Allowance", dated Feb. 10, 2020, 8 pages.

U.S. Appl. No. 15/946,649, filed Apr. 5, 2018, 80 pages.

U.S. Appl. No. 15/946,652, filed Apr. 5, 2018, 83 pages.

U.S. Appl. No. 15/946,654, filed Apr. 5, 2018, 82 pages.

U.S. Appl. No. 16/050,314, filed Jul. 31, 2018, 102 pages.

U.S. Appl. No. 16/050,332, filed Jul. 31, 2018, 103 pages.

U.S. Appl. No. 16/050,362, filed Jul. 31, 2018, 100 pages.

Bako et al., "Removing Shadows from Images of Documents", Proceedings of ACCV 2016, Available Online at ttp://cvc.ucsb.edu/graphics/Papers/ACCV2016_DocShadow/, 2016.

Kalantari et al., "A Machine Learning Approach for Filtering Monte Carlo Noise", ACM Transactions on Graphics, vol. 34, No. 4, Proceedings of ACM SIGGRAPH 2015, Aug. 2015, 12 pages.

Szegedy et al., "Going Deeper with Convolutions", Available Online at https://www.cs.unc.edu/~wliu/papers/GoogLeNet.pdf, 2014, pp. 1-9.

Xie et al., "Image Denoising and Inpainting with Deep Neural Networks", Available Online at https://papers.nips.cc/paper/4686-image-denoising-and-inpainting-with-deep-neural-networks.pdf, 2012, pp. 1-9.

Xu, "Deep Edge-Aware Filters", Proceedings of the 32nd International Conference on Machine Learning, Lille, France, vol. 37, Available Online at http://www.cs.toronto.edu/~rjliao/papers/ICML_2015_Deep.pdf, 2015, 10 pages.

U.S. Appl. No. 15/946,652, "Corrected Notice of Allowability", dated Mar. 2, 2020, 2 pages.

U.S. Appl. No. 16/050,362, "Notice of Allowance", dated Mar. 5, 2020, 11 pages.

U.S. Appl. No. 16/735,079, "Non-Final Office Action", dated Feb. 13, 2020, 5 pages.

DENOISING MONTE CARLO RENDERINGS USING NEURAL NETWORKS WITH ASYMMETRIC LOSS

CROSS-REFERENCES TO RELATED APPLICATIONS

This application claims the benefit of U.S. Provisional Patent Application No. 62/650,106, filed on Mar. 29, 2018, the content of which is incorporated by reference in its entirety.

The following four U.S. patent applications (including this one) are being filed concurrently, and the entire disclosure of the other application is incorporated by reference into this application for all purposes:

application Ser. No. 16/050,314, filed on Jul. 31, 2018, entitled "TEMPORAL TECHNIQUES OF DENOISING MONTE CARLO RENDERINGS USING NEURAL NETWORKS", U.S. Pat. No. 16,050,332, filed on Jul. 31, 2018, entitled "MULTI-SCALE ARCHITECTURE OF DENOISING MONTE CARLO RENDERINGS USING NEURAL NETWORKS", application Ser. No. 16/050,336, filed on Jul. 31, 2018, entitled "DENOISING MONTE CARLO RENDERINGS USING NEURAL NETWORKS WITH ASYMMETRIC LOSS", and application Ser. No. 16/050,362, filed on Jul. 31, 2018, entitled "ADAPTIVE SAMPLING IN MONTE CARLO RENDERINGS USING ERROR-PREDICTING NEURAL NETWORKS".

BACKGROUND

Monte Carlo (MC) path tracing is a technique for rendering images of three-dimensional scenes by tracing paths of light through pixels on an image plane. This technique is capable of producing high quality images that are nearly indistinguishable from photographs. In MC path tracing, the color of a pixel is computed by randomly sampling light paths that connect the camera to light sources through multiple interactions with the scene. The mean intensity of many such samples constitutes a noisy estimate of the total illumination of the pixel. Unfortunately, in realistic scenes with complex light transport, these samples might have large variance, and the variance of their mean only decreases linearly with respect to the number of samples per pixel. Typically, thousands of samples per pixel are required to achieve a visually converged rendering. This can result in prohibitively long rendering times. Therefore, there is a need to reduce the number of samples needed for MC path tracing while still producing high-quality images.

SUMMARY

A modular architecture is provided for denoising Monte Carlo renderings using neural networks. A source-aware encoding module may be configured to extract low-level features and embed them into a feature space common between sources, which may allow for quickly adapting a trained network to novel data. A spatial module may be configured to extract abstract, high-level features for reconstruction.

According to some embodiments, a temporal denoiser may consider an entire sequence of frames when denoising a single frame. Each respective frame of the sequence of frames may be pre-processed individually by a source encoder and a spatial-feature extractor. The spatial features extracted from each frame of the sequence of frames are concatenated and fed into a temporal-feature extractor. The temporal-feature extractor extracts a set of temporal features from the concatenated sets of spatial features. A denoised frame corresponding to the center frame is reconstructed based on the temporal features.

According to some other embodiments, a multi-scale architecture may construct a multi-level pyramid for an input frame or a sequence of input frames using down-sampling operations. Separate single-frame denoising modules or temporal denoising modules are used to denoise the input frame or the sequence of input frames at individual scales. One or more scale compositor neural networks are configured to adaptively blend the denoised images of the various scales.

According to some further embodiments, an asymmetric loss function may be used for training a denoising neural network. The asymmetric loss function can provide control over the variance-bias trade-off during denoising. The asymmetric loss function may penalize a denoised result that is not on the same "side" relative to the reference by scaling the loss function using an additional factor $\lambda$.

According to some other embodiments, a sampling-map prediction neural network may be configured to produce adaptive sampling maps for a renderer to achieve more uniform residual noise distribution. The sampling-map prediction neural network is coupled to a denoiser and a MC renderer, and configured to take a noisy image and a corresponding denoised image as inputs, and generate a sampling map. The sampling map may include reconstruction error data for each pixel in the denoised image. In a next iteration, the total number of samples across all pixels in the image plane may be increased, where the samples are allocated to each pixel proportionally to the sampling map (i.e., adaptive sampling). This process may be repeated for one or more iterations.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION

Figure 1:
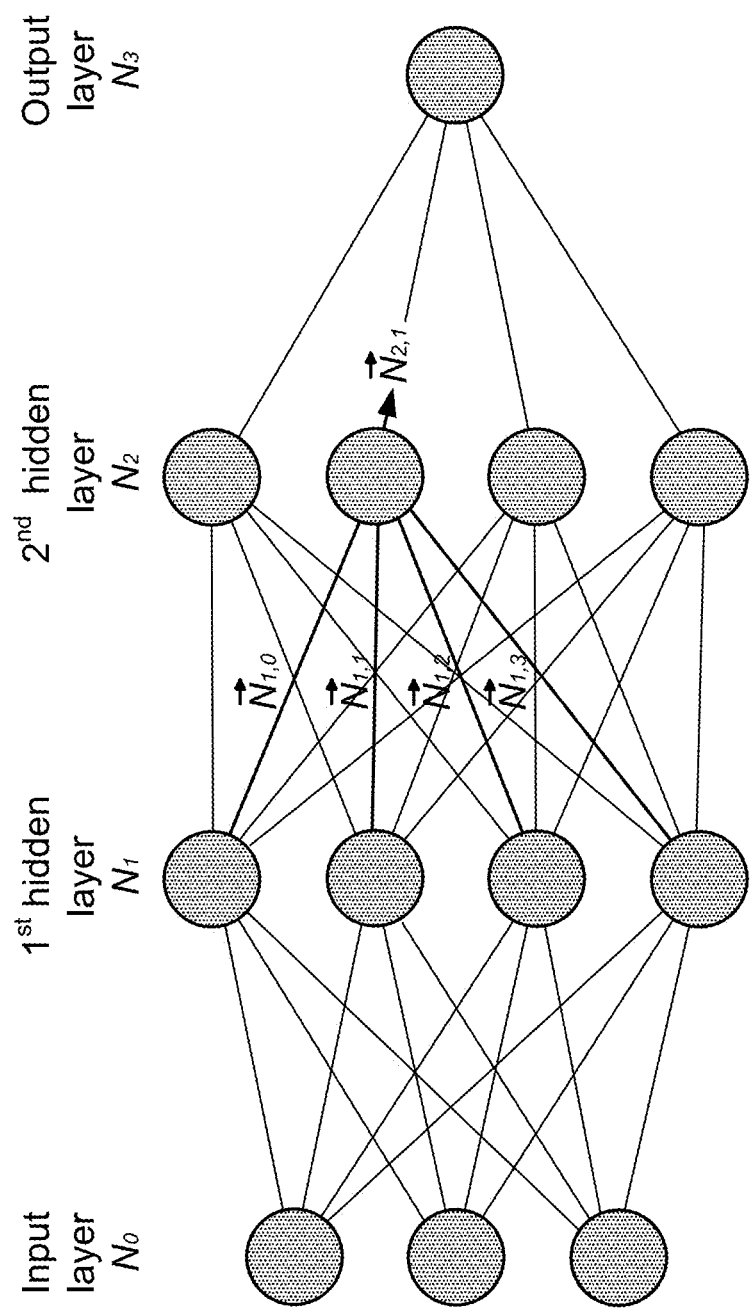
FIG. 1 illustrates an exemplary neural network according to some embodiments.

Monte Carlo (MC) rendering is used ubiquitously in computer animation and visual effect productions [A. Keller et al., 2015. In *ACM SIGGRAPH* 2015 *Courses* (*SIGGRAPH '15*). ACM, New York, N.Y., USA, Article 24, 7 pages]. Despite continuously increasing computational power, the cost of constructing light paths—the core component of image synthesis—remains a limiting practical constraint that leads to noise. Among the many strategies have been explored to reduce Monte Carlo noise, image space denoising has emerged as a particularly attractive solution due to its effectiveness and ease of integration into rendering pipelines.

Until recently, the best-performing MC denoisers were hand-designed and based on linear regression models [Matthias Zwicker et al., 2015. *Recent Advances in Adaptive Sampling and Reconstruction for Monte Carlo Rendering*, 34, 2 (May 2015), 667-681]. In publications from last year, however, Steve Bako et al. (2017) [Steve Bako et al., Kernel-Predicting Convolutional Networks for Denoising Monte Carlo Renderings. ACM Transactions on Graphics (Proceedings of SIGGRAPH 2017) 36, 4, Article 97 (2017), 97:1-97:14 pages. https://doi.org/10.1145/3072959.3073708; Thijs Vogels, 2016. *Kernel-predicting Convolutional Networks for Denoising Monte Carlo Renderings*. Master's thesis. ETH Zürich, Zürich, Switzerland], and Chaitanya et al. (2017) [Chakravarty R. A., Chaitanya Anton Kaplanyan et al., 2017. *ACM Trans. Graph.* (*Proc. SIGGRAPH*) (2017)] demonstrated that solutions employing convolutional neural networks (CNN) can outperform the best zero- and first-order regression models under specific circumstances. Despite this, the previous generation of hand-designed models are still used extensively in commercial rendering systems (e.g. RenderMan, VRay and Corona). Furthermore, there are several well-known issues with neural networks—in particular with regards to data efficiency during training and domain adaptation during inference—which limit their broad application. In this disclosure, several architectural extensions that may overcome these limitations and enable greater user control over the output are discussed.

Data-efficiency of deep learning remains an open challenge with larger networks requiring enormous training datasets to produce good results. This poses a particular problem for denoising since generating ground-truth renders to be used as targets for prediction in the supervised-learning framework is extremely computationally expensive. This issue impacts several areas including training, adaptation to data from different sources, and temporal denoising. Several solutions to overcome this problem are disclosed herein.

First, the denoiser may be based on the recently presented kernel prediction (KPCN) architecture [Steve Bako et al., Kernel-Predicting Convolutional Networks for Denoising Monte Carlo Renderings. ACM Transactions on Graphics (Proceedings of SIGGRAPH 2017) 36, 4, Article 97 (2017), 97:1-97:14 pages. https://doi.org/10.1145/3072959.3073708; Thijs Vogels, 2016. *Kernel-predicting Convolutional Networks for Denoising Monte Carlo Renderings*. Master's thesis. ETH Zürich, Zürich, Switzerland]. Intuitively, kernel prediction trades a larger inductive bias for lower-variance estimates resulting in faster, and more stable training than direct prediction. This work provides theoretical reasoning for why KPCN converges faster. Specifically, it is shown that in the convex case, optimizing the kernel prediction problem using gradient descent is equivalent to performing mirror descent [Amir Beck and Marc Teboulle, *Operations Research* Letters 31, 3 (2003), 167-175], which enjoys an up-to-exponentially faster convergence speed than standard gradient descent.

Second, to integrate data from different sources (e.g. different renderers and auxiliary buffer sets), embodiments include source-aware encoders that extract low-level features particular to each data source. This allows the network to leverage data from multiple renderers during training by embedding different datasets into a common feature space. Furthermore, it enables a pre-trained network to be quickly adapted to a new data source with few training examples, but at the same time avoiding catastrophic forgetting [James Kirkpatrick et al., Overcoming catastrophic forgetting in neural networks. *Proceedings of the National Academy of Sciences* (2017), 201611835], which can result from naive fine-tuning.

Third, embodiments include an extension to the temporal domain—necessary for processing animated sequences—that requires less ground-truth data than previous approaches. [Chaitanya et al., 2017] [Chakravarty R. A., Chaitanya Anton Kaplanyan et al., 2017. *ACM Trans. Graph. (Proc. SIGGRAPH)* (2017)] propose a recurrent model which they train using a converged reference image for each frame in the sequence. An alternative scheme is used that does not require reference images for each input in the sequence. Instead, feature representations from individual frames are combined using a lightweight, temporal extension to KPCN. This approach amortizes the cost of denoising each frame across multiple sliding temporal windows yet produces temporally stable animations of higher quality.

These developments are incorporated in a modular, multi-scale architecture that operates on a mip-map pyramid to reduce low-frequency noise. This approach employs a lightweight scale-compositing module trained to combine scales such that blotches and ringing artifacts are prevented.

Embodiments also include a dedicated error prediction module that approximates the reconstruction error. This enables adaptive sampling by iteratively executing the error prediction during rendering and distributing the samples according to the predicted error. It is demonstrated that this approach, which acknowledges the strengths and weaknesses of the denoiser, yields better results than importance-sampling using the variance of rendered outputs.

Finally, embodiments provide a mechanism for user control over the trade-off between variance and bias. An asymmetric loss function that magnifies gradients during backpropagation when the result deviates strongly from the input may be used. The asymmetry is varied during training and linked to an input parameter of the denoiser that provides the user with direct control over the trade-off between residual noise and loss of detail due to blurring or other artifacts—a crucial feature for production scenarios.

I. Rendering Using Monte Carlo Path Tracing

Path tracing is a technique for presenting computer-generated scenes on a two-dimensional display by tracing a path of a ray through pixels on an image plane. The technique can produce high-quality images, but at a greater computational cost. In some examples, the technique can include tracing a set of rays to a pixel in an image. The pixel can be set to a color value based on the one or more rays. In such examples, a set of one or more rays can be traced to each pixel in the image. However, as the number of pixels in an image increases, the computational cost also increases.

In a simple example, when a ray reaches a surface in a computer-generated scene, the ray can separate into one or more additional rays (e.g., reflected, refracted, and shadow rays). For example, with a perfectly specular surface, a reflected ray can be traced in a mirror-reflection direction from a point corresponding to where an incoming ray reaches the surface. The closest object that the reflected ray intersects can be what will be seen in the reflection. As another example, a refracted ray can be traced in a different direction than the reflected ray (e.g., the refracted ray can go into a surface). For another example, a shadow ray can be traced toward each light. If any opaque object is found between the surface and the light, the surface can be in shadow and the light may not illuminate the surface. However, as the number of additional rays increases, the computational costs for path tracing increases even further. While a few types of rays have been described that affect computational cost of path tracing, it should be recognized that there can be many other variables that affect computational cost of determining a color of a pixel based on path tracing.

In some examples, rather than randomly determining which rays to use, a bidirectional reflectance distribution function (BRDF) lobe can be used to determine how light is reflected off a surface. In such examples, when a material is more diffuse and less specular, the BRDF lobe can be wider, indicating more directions to sample. When more sampling directions are required, the computation cost for path tracing may increase.

In path tracing, the light leaving an object in a certain direction is computed by integrating all incoming and generated light at that point. The nature of this computation is recursive, and is governed by the rendering equation:

$$L_o(\vec{x}, \vec{\omega}_o) = L_e(\vec{x}, \vec{\omega}_o) + \int_\Omega f_r(\vec{x}, \vec{\omega}_i, \vec{\omega}_o) L_i(\vec{x}, \vec{\omega}_i)(\vec{\omega}_i \cdot \vec{n}) d\vec{\omega}_i, \quad (1)$$

where $L_o$ represents the total radiant power transmitted from an infinitesimal region around a point $\vec{x}$ into an infinitesimal cone in the direction $\vec{\omega}_o$. This quantity may be referred to as "radiance." In equation (1), $L_e$ is the emitted radiance (for light sources), $\vec{n}$ is the normal direction at position $\vec{x}$, $\Omega$ is the unit hemisphere centered around $\vec{n}$ containing all possible values for incoming directions $\vec{\omega}_i$, and $L_i$ represents the incoming radiance from $\vec{\omega}_i$. The function $f_r$ is referred to as the bidirectional reflectance distribution function (BRDF). It captures the material properties of an object at $\vec{x}$.

The recursive integrals in the rendering equation are usually evaluated using a MC approximation. To compute the pixel's color, light paths are randomly sampled throughout the different bounces. The MC estimate of the color of a pixel i may be denoted as the mean of n independent samples $p_{i,k}$ from the pixel's sample distribution $\mathbb{S}_i$ as follows, $$\bar{p}_i = \frac{1}{n} \sum_{k=1}^{n} p_{i,k}, \quad p_{i,k} \sim \mathbb{S}_i \forall i \in [1, n]. \quad (2)$$

The MC approximated $\bar{p}_i$ is an unbiased estimate for the converged pixel color mean $\tilde{p}_i$ that would be achieved with an infinite number of samples:

$$\tilde{p}_i = \lim_{n \to \infty} \frac{1}{n} \sum_{k=1}^{n} p_{i,k}. \quad (3)$$

In unbiased path tracing, the mean of $\mathbb{S}_i$ equals $\tilde{p}_i$, and its variance depends on several factors. One cause might be that light rays sometimes just hit an object, and sometimes just miss it, or that they sometimes hit a light source, and sometimes not. This makes scenes with indirect lighting and many reflective objects particularly difficult to render. In these cases, the sample distribution is very skewed, and the samples $p_{i,k}$ can be orders of magnitude apart.

The variance of the MC estimate $\bar{p}_i$ based on n samples, follows from the variance of $\mathbb{S}_i$ as $$Var[\bar{p}_i] = \frac{1}{n} Var[\mathbb{S}_i]. \tag{4}$$

Because the variance decreases linearly with respect to n, the expected error $$\sqrt{Var[\bar{p}_i]}$$

decreases as $1/\sqrt{n}$.

II. Image-Space Denoising

To deal with the slow convergence of MC renderings, several denoising techniques have been proposed to reduce the variance of rendered pixel colors by leveraging spatial redundancy in images. Most existing denoisers estimate $\hat{p}_i$ by a weighted sum of the observed pixels $\bar{p}_k$ in a region of pixels around pixel i:

$$\hat{p}_i = \sum_{k \in \mathcal{R}_i} \bar{p}_k w(i,k), \tag{5}$$

where $\mathcal{R}_i$ is a region (e.g. a square region) around pixel i and $\sum_{k \in \mathcal{R}_i} w(i,k)=1$. The weights $w(i,k)$ follow from different kinds of weighted regressions on $\mathcal{R}_i$.

Most existing denoising methods build on the idea of using generic non-linear image-space filters and auxiliary feature buffers as a guide to improve the robustness of the filtering process. One important development was to leverage noisy auxiliary buffers in a joint bilateral filtering scheme, where the bandwidths of the various auxiliary features are derived from the sample statistics. One application of these ideas was to use the non-local means filter in a joint filtering scheme. The appeal of the non-local means filter for denoising MC renderings is largely due to its versatility.

Recently, it was shown that joint filtering methods, such as those discussed above, can be interpreted as linear regressions using a zero-order model, and that more generally most state-of-the-art MC denoising techniques are based on a linear regression using a zero- or first-order model. Methods leveraging a first-order model have proved to be very useful for MC denoising, and while higher-order models have also been explored, it must be done carefully to prevent overfitting to the input noise.

III. Machine Learning and Neural Networks

A. Machine Learning

In supervised machine learning, the aim may be to create models that accurately predict the value of a response variable as a function of explanatory variables. Such a relationship is typically modeled by a function that estimates the response variable y as a function $\hat{y}=f(\vec{x},\vec{w})$ of the explanatory variables $\vec{x}$ and tunable parameters $\vec{w}$ that are adjusted to make the model describe the relationship accurately. The parameters $\vec{w}$ are learned from data. They are set to minimize a cost function or loss function $L(\mathcal{D}_{train},\vec{w})$ (also referred herein as error function) over a training set $\mathcal{D}_{train}$, which is typically the sum of errors on the entries of the dataset:

$$L(\mathcal{D}_{train}, \vec{w}) = \frac{1}{|\mathcal{D}_{train}|} \sum_{(\vec{x}_i, \tilde{y}_i) \in \mathcal{D}_{train}} l(\tilde{y}_i, f(\vec{x}_i, \vec{w})), \tag{6}$$

where l is a per-element loss function. The optimal parameters may satisfy $$\vec{w} = \underset{\vec{w}}{\arg\min} L(\mathcal{D}_{train}, \vec{w}). \tag{7}$$

Typical loss functions for continuous variables are the quadratic or $L_2$ loss $l_2(y,\hat{y})=(y-\hat{y})^2$ and the $L_1$ loss $l_1(y,\hat{y})=|y-\hat{y}|$.

Common issues in machine learning may include overfitting and underfitting. In overfitting, a statistical model describes random error or noise in the training set instead of the underlying relationship. Overfitting occurs when a model is excessively complex, such as having too many parameters relative to the number of observations. A model that has been overfit has poor predictive performance, as it overreacts to minor fluctuations in the training data. Underfitting occurs when a statistical model or machine learning algorithm cannot capture the underlying trend of the data. Underfitting would occur, for example, when fitting a linear model to non-linear data. Such a model may have poor predictive performance.

To control over-fitting, the data in a machine learning problem may be split into three disjoint subsets: the training set $\mathcal{D}_{train}$, a test set $\mathcal{D}_{test}$, and a validation set $\mathcal{D}_{val}$. After a model is optimized to fit $\mathcal{D}_{train}$, its generalization behavior can be evaluated by its loss on $\mathcal{D}_{test}$. After the best model is selected based on its performance on $\mathcal{D}_{test}$, it is ideally re-evaluated on a fresh set of data $\mathcal{D}_{val}$.

B. Neural Networks

Neural networks are a general class of models with potentially large numbers of parameters that have shown to be very useful in capturing patterns in complex data. The model function $f$ of a neural network is composed of atomic building blocks called "neurons" or nodes. A neuron $n_i$ has inputs $\vec{x}_i$ and an scalar output value $y_i$, and it computes the output as $$y_i = n_i(\vec{x}_i, \vec{w}_i) = \phi_i(\vec{x}_i \cdot \vec{w}_i), \tag{8}$$

where $\vec{w}_i$ are the neuron's parameters and $\vec{x}_i$ is augmented with a constant feature. $\phi$ is a non-linear activation function that ensures a composition of several neurons can be non-linear. Activation functions can include hyperbolic tangent $\tan h(x)$, sigmoid function $\phi_{sigmoid}(x)=(1+\exp(-x))^{-1}$, and the rectified linear unit (ReLU) $\phi_{ReLU}(x)=\max(x,0)$.

A neural network is composed of layers of neurons. The input layer $N_0$ contains the model's input data $\vec{x}$, and the neurons in the output layer predict an output $\hat{\vec{y}}$. In a fully connected layer $N_k$, the inputs of a neuron are the outputs of all neurons in the previous layer $N_{k-1}$.

FIG. 1 illustrates an exemplary neural network, in which neurons are organized into layers. $\vec{N}_k$ denotes a vector containing the outputs of all neurons $n_i$ in a layer k>0. The input layer $\vec{N}_0$ contains the model's input features $\vec{x}$. The neurons in the output layer return the model prediction $\vec{\hat{y}}$. The outputs of the neurons in each layer k form the input of layer k+1.

The activity of a layer $N_i$ of a fully-connected feed forward neural network can be conveniently written in matrix notation:

$$\vec{N}_0 = \vec{x}, \quad (9)$$

$$\vec{N}_k = \phi_k(W_k \vec{N}_{k-1}) \forall k \in [1,n), \quad (10)$$

where $W_k$ is a matrix that contains the model parameters $\vec{w}_j$ for each neuron in the layer as rows. The activation function $\phi_k$ operates element wise on its vector input.

1. Multilayer Perceptron Neural Networks

There are different ways in which information can be processed by a node, and different ways of connecting the nodes to one another. Different neural network structures, such as multilayer perceptron (MLP) and convolutional neural network (CNN), can be constructed by using different processing elements and/or connecting the processing elements in different manners.

FIG. 1 illustrates an example of a multilayer perceptron (MLP). As described above generally for neural networks, the MLP can include an input layer, one or more hidden layers, and an output layer. In some examples, adjacent layers in the MLP can be fully connected to one another. For example, each node in a first layer can be connected to each node in a second layer when the second layer is adjacent to the first layer. The MLP can be a feedforward neural network, meaning that data moves from the input layer to the one or more hidden layers and to the output layer when receiving new data.

The input layer can include one or more input nodes. The one or more input nodes can each receive data from a source that is remote from the MLP. In some examples, each input node of the one or more input nodes can correspond to a value for a feature of a pixel. Exemplary features can include a color value of the pixel, a shading normal of the pixel, a depth of the pixel, an albedo of the pixel, or the like. In such examples, if an image is 10 pixels by 10 pixels, the MLP can include 100 input nodes multiplied by the number of features. For example, if the features include color values (e.g., red, green, and blue) and shading normal (e.g., x, y, and z), the MLP can include 600 input nodes (10×10×(3+3)).

A first hidden layer of the one or more hidden layers can receive data from the input layer. In particular, each hidden node of the first hidden layer can receive data from each node of the input layer (sometimes referred to as being fully connected). The data from each node of the input layer can be weighted based on a learned weight. In some examples, each hidden layer can be fully connected to another hidden layer, meaning that output data from each hidden node of a hidden layer can be input to each hidden node of a subsequent hidden layer. In such examples, the output data from each hidden node of the hidden layer can be weighted based on a learned weight. In some examples, each learned weight of the MLP can be learned independently, such that a first learned weight is not merely a duplicate of a second learned weight.

A number of nodes in a first hidden layer can be different than a number of nodes in a second hidden layer. A number of nodes in a hidden layer can also be different than a number of nodes in the input layer (e.g., as in the neural network illustrated in FIG. 1).

A final hidden layer of the one or more hidden layers can be fully connected to the output layer. In such examples, the final hidden layer can be the first hidden layer or another hidden layer. The output layer can include one or more output nodes. An output node can perform one or more operations described above (e.g., non-linear operations) on data provided to the output node to produce a result to be provided to a system remote from the MLP.

2. Convolutional Neural Networks

In a fully connected layer, the number of parameters that connect the layer with the previous one is the product of the number of neurons in the layers. When a color image of size w×h×3 is the input of such a layer, and the layer has a similar number of output-neurons, the number of parameters can quickly explode and become infeasible as the size of the image increases.

Figure 2:
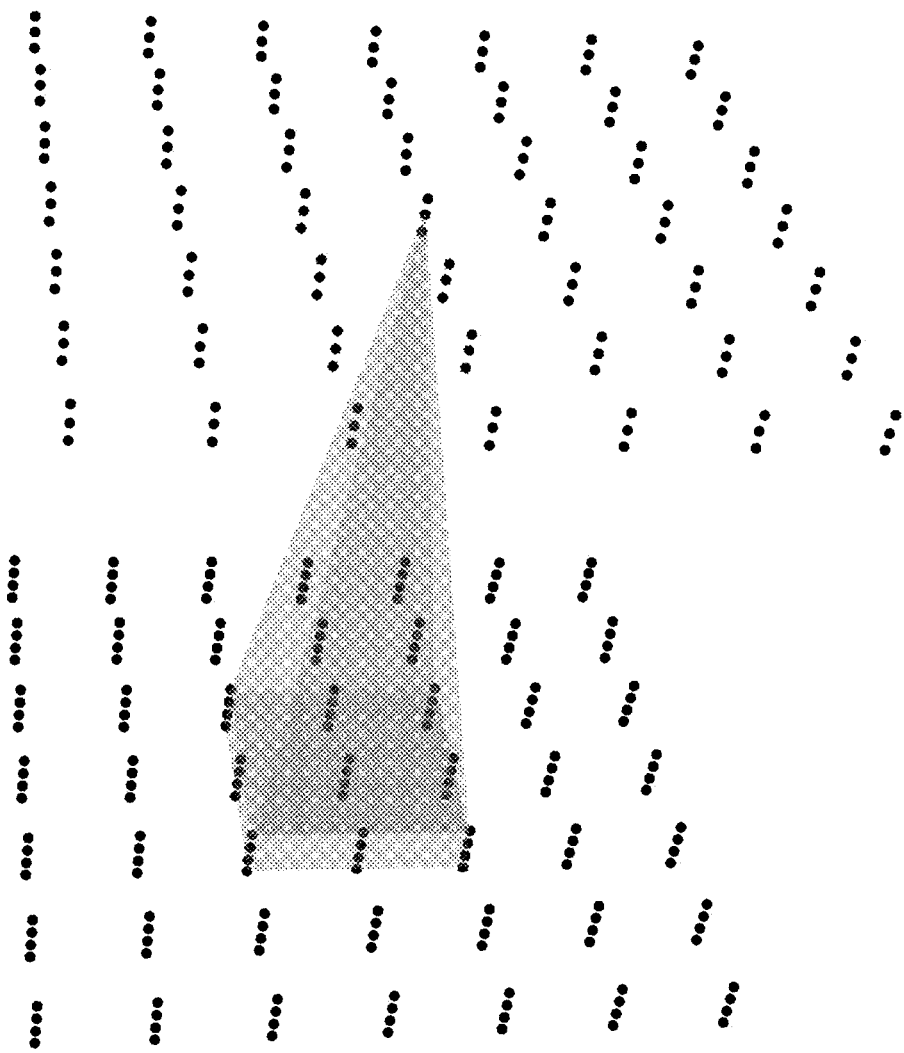
FIG. 2 illustrates an exemplary convolutional network (CNN) according to some embodiments.

To make neural networks for image processing more tractable, convolutional neural networks (CNNs) may simplify the fully connected layer by making the connectivity of neurons between two adjacent layers sparse. FIG. 2 illustrates an exemplary CNN layer where neurons are conceptually arranged into a three-dimensional structure. The first two dimensions follow the spatial dimensions of an image, and the third dimension contains a number of neurons (may be referred to as features or channels) at each pixel location. The connectivity of the nodes in this structure is local. Each of a layer's output neurons is connected to all input neurons in a spatial region centered around it. The size of this region, $k_x \times k_y$, is referred to as the kernel size. The network parameters used in these regions are shared over the spatial dimensions, bringing the number of free parameters down to $d_{in} \times k_x \times k_y \times d_{out}$, where $d_{in}$ and $d_{out}$ are the number of features per pixel in the previous layer and the current layer, respectively. The number $d_{out}$ is referred to as the number of channels or features in the layer.

In recent years, CNNs have emerged as a popular model in machine learning. It has been demonstrated that CNNs can achieve state-of-the-art performance in a diverse range of tasks such as image classification, speech processing, and many others. CNNs have also been used a great deal for a variety of low-level image-processing tasks. In particular, several works have considered the problem of natural image denoising and the related problem of image super-resolution.

IV. Denoising Using Neural Networks

According to some embodiments of the present invention, techniques based on machine learning, and more particularly based on neural networks, are used to denoise Monte Carlo path tracing renderings. The techniques disclosed herein may use the same inputs used in conventional denoising techniques based on linear regression or zero-order and higher-order regressions. The inputs may include, for example, pixel color and its variance, as well as a set of auxiliary buffers (and their corresponding variances) that encode scene information (e.g., surface normal, albedo, depth, and the like).

A. Modeling Framework

Before introducing the denoising framework, some mathematical notations may be defined as follows. The samples output by a typical MC renderer can be averaged down into a vector of per-pixel data, $$x_p = \{c_p, f_p\}, \text{ where } x_p \in \mathbb{R}^{3+D} \tag{11}$$

where, $c_p$ represents the red, green and blue (RGB) color channels, and $f_p$ is a set of D auxiliary features (e.g., the variance of the color feature, surface normals, depth, albedo, and their corresponding variances).

The goal of MC denoising may be defined as obtaining a filtered estimate of the RGB color channels $\hat{c}_p$ for each pixel p that is as close as possible to a ground truth result $\bar{c}_p$ that would be obtained as the number of samples goes to infinity. The estimate of $\hat{c}_p$ may be computed by operating on a block $X_p$ of per-pixel vectors around the neighborhood $\mathcal{N}(p)$ to produce the filtered output at pixel p. Given a denoising function $g(X_p; \theta)$ with parameters $\theta$ (which may be referred to as weights), the ideal denoising parameters at every pixel can be written as:

$$\hat{\theta}_p = \text{argmin}_\theta l(\bar{c}_p, g(X_p; \theta)), \tag{12}$$

where the denoised value is $d_p = g(X_p; \hat{\theta}_p)$, and $l(\hat{c}, d)$ is a loss function between the ground truth values $\bar{c}$ and the denoised values d.

Since ground truth values $\bar{c}$ are usually not available at run time, an MC denoising algorithm may estimate the denoised color at a pixel by replacing $g(X_p; \theta)$ with $\theta^T \phi(x_q)$, where function $\phi: \mathbb{R}^{3+D} \to \mathbb{R}^M$ is a (possibly non-linear) feature transformation with parameters $\theta$. A weighted least-squares regression on the color values, $c_q$, around the neighborhood, $q \in \mathcal{N}(p)$, may be solved as:

$$\hat{\theta}_p = \text{argmin}_\theta \sum_{q \in \mathcal{N}(p)} (c_q - \theta^T \phi(x_q))^2 \omega(x_p, x_q), \tag{13}$$

where $\omega(x_p, x_q)$ is the regression kernel. The final denoised pixel value may be computed as $d_p = \hat{\theta}_p^T \phi(x_p)$. The regression kernel $\omega(x_p, x_q)$ may help to ignore values that are corrupted by noise, for example by changing the feature bandwidths in a joint bilateral filter. Note that $\omega$ could potentially also operate on patches, rather than single pixels, as in the case of a joint non-local means filter.

As discussed above, some of the existing denoising methods can be classified as zero-order methods with $\phi_0(x_q) = 1$, first-order methods with $\phi_1(x_q) = [1; x_q]$, or higher-order methods where $\phi_m(x_q)$ enumerates all the polynomial terms of $x_q$ up to degree m (see Bitterli et al. for a detailed discussion). The limitations of these MC denoising approaches can be understood in terms of bias-variance tradeoff. Zero-order methods are equivalent to using an explicit function such as a joint bilateral or non-local means filter. These represent a restrictive class of functions that trade reduction in variance for a high modeling bias.

Using a first- or higher-order regression may increase the complexity of the function, and may be prone to overfitting as $\hat{\theta}_p$ is estimated locally using only a single image and can easily fit to the noise. To address this problem, Kalantari et al. proposed to take a supervised machine learning approach to estimate g using a dataset $\mathcal{D}$ of N example pairs of noisy image patches and their corresponding reference color information, $\mathcal{D} = \{(X_1, \bar{c}_1), \ldots, (X_N, \bar{c}_N)\}$, where $\bar{c}_i$ corresponds to the reference color at the center of patch $X_i$ located at pixel i of one of the many input images. Here, the goal is to find parameters of the denoising function, g, that minimize the average loss with respect to the reference values across all the patches in $\mathcal{D}$:

$$\hat{\theta} = \text{argmin}_\theta \frac{1}{N} \sum_{i=1}^{N} l(\bar{c}_i, g(X_i; \theta)). \tag{14}$$

In this case, the parameters, $\theta$, are optimized with respect to all the reference examples, not the noisy information as in Eq. (13). If $\hat{\theta}$ is estimated on a large and representative training dataset, then it can adapt to a wide variety of noise and scene characteristics.

B. Deep Convolutional Denoising

In some embodiments, the denoising function g in Eq. (14) is modeled with a deep convolutional neural network (CNN). Since each layer of a CNN applies multiple spatial kernels with learnable weights that are shared over the entire image space, they are naturally suited for the denoising task and have been previously used for natural image denoising. In addition, by joining many such layers together with activation functions, CNNs may be able to learn highly nonlinear functions of the input features, which can be advantageous for obtaining high-quality outputs.

Figure 3:
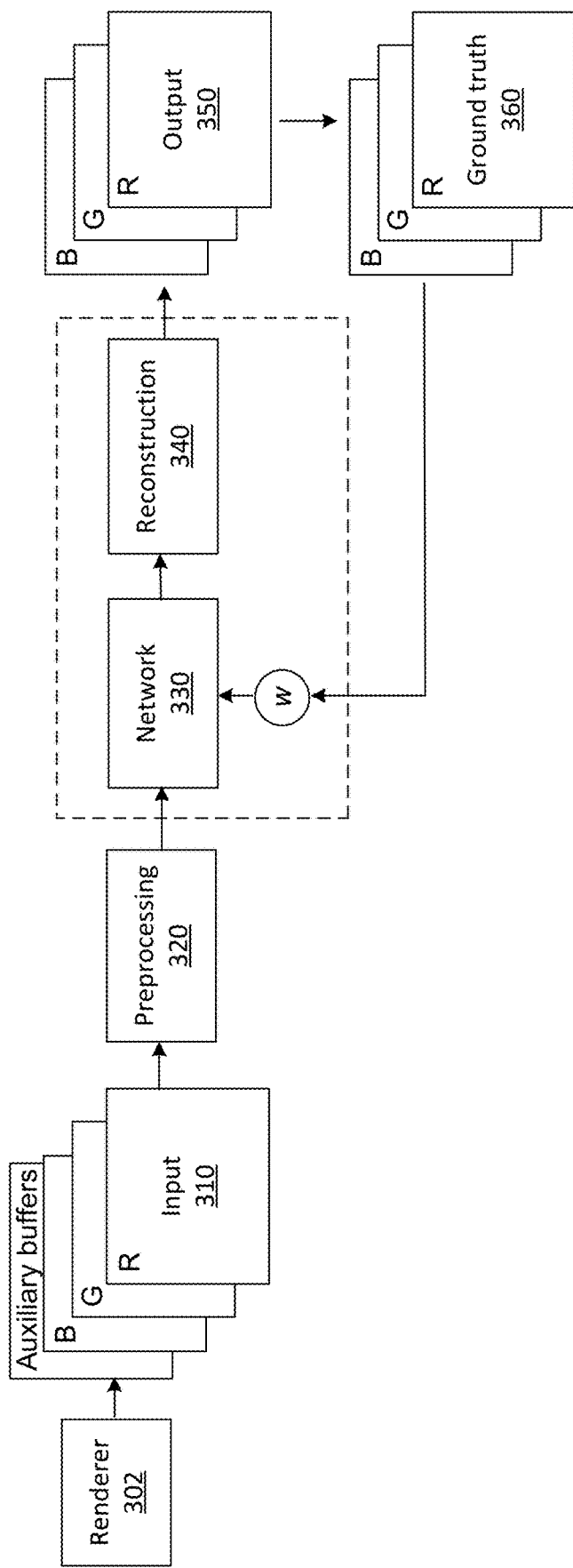
FIG. 3 illustrates an exemplary denoising pipeline according to some embodiments.

FIG. 3 illustrates an exemplary denoising pipeline according to some embodiments of the present invention. The denoising method may include inputting raw image data (310) from a renderer 302, preprocessing (320) the input data, and transforming the preprocessed input data through a neural network 330. The raw image data may include intensity data, color data (e.g., red, green, and blue colors), and their variances, as well as auxiliary buffers (e.g., albedo, normal, depth, and their variances). The raw image data may also include other auxiliary data produced by the renderer 302. For example, the renderer 302 may also produce object identifiers, visibility data, and bidirectional reflectance distribution function (BRDF) parameters (e.g., other than albedo data). The preprocessing step 320 is optional. The neural network 330 transforms the preprocessed input data (or the raw input data) in a way that depends on many configurable parameters or weights, w, that are optimized in a training procedure. The denoising method may further include reconstructing (340) the image using the weights w output by the neural network, and outputting (350) a denoised image. The reconstruction step 340 is optional. The output image may be compared to a ground truth 360 to compute a loss function, which can be used to adjust the weights w of the neural network 330 in the optimization procedure.

C. Reconstruction

According to some embodiments, the function g outputs denoised color values using two alternative architectures: a direct-prediction convolutional network (DPCN) or a kernel-prediction convolutional network (KPCN).

1. Direct Prediction Convolutional Network (DPCN)

To produce the denoised image using direct prediction, one may choose the size of the final layer L of the network to ensure that for each pixel p, the corresponding element of the network output, $z_p^L \in \mathbb{R}^3$ is the denoised color:

$$d_p = g_{direct}(X_p; \theta) = z_p^L. \tag{15}$$

Direct prediction can achieve good results in some cases. However, it is found that the direct prediction method can make optimization difficult in some cases. For example, the magnitude and variance of the stochastic gradients computed during training can be large, which slows convergence. In some cases, in order to obtain good performance, the DPCN architecture can require over a week of training.

2. Kernel Prediction Convolutional Network (KPCN)

According to some embodiments, instead of directly outputting a denoised pixel, $d_p$, the final layer of the network outputs a kernel of scalar weights that is applied to the noisy neighborhood of p to produce $d_p$. Letting $\mathcal{N}(p)$ be the k×k neighborhood centered around pixel p, the dimensions of the final layer can be chosen so that the output is $z_p^L \in \mathbb{R}^{k \times k}$. Note that the kernel size k may be specified before training along with the other network hyperparameters (e.g., layer size, CNN kernel size, and so on), and the same weights are applied to each RGB color channel.

Defining $[z_p^L]_q$ as the q-th entry in the vector obtained by flattening $z_p^L$, one may compute the final normalized kernel weights as, $$w_{pq} = \frac{\exp([z_p^L]_q)}{\sum_{q' \in \mathcal{N}(p)} \exp([z_p^L]_{q'})}. \tag{16}$$

The denoised pixel color may be computed as, $$d_p = g_{weighted}(X_p; \theta) = \sum_{q \in \mathcal{N}(p)} c_q w_{pq}. \tag{17}$$

The kernel weights can be interpreted as including a softmax activation function on the network outputs in the final layer over the entire neighborhood. This enforces that $0 \leq w_{pq} \leq 1$, $\forall q \in \mathcal{N}(p)$ and $\sum_{q \in \mathcal{N}(p)} w_{pq} = 1$.

This weight normalization architecture can provide several advantages. First, it may ensure that the final color estimate always lies within the convex hull of the respective neighborhood of the input image. This can vastly reduce the search space of output values as compared to the direct-prediction method and avoids potential artifacts (e.g., color shifts). Second, it may ensure that the gradients of the error with respect to the kernel weights are well behaved, which can prevent large oscillatory changes to the network parameters caused by the high dynamic range of the input data. Intuitively, the weights need only encode the relative importance of the neighborhood; the network does not need to learn the absolute scale. In general, scale-reparameterization schemes have recently proven to be beneficial for obtaining low-variance gradients and speeding up convergence. Third, it can potentially be used for denoising across layers of a given frame, a common case in production, by applying the same reconstruction weights to each component.

Although both direct prediction method and kernal prediction method can converge to a similar overall error, the kernel prediction method can converge faster than the direct prediction method. Further details of the kernal prediction method are described in U.S. patent application Ser. No. 15/814,190, the content of which is incorporated herein by reference in its entirety.

V. Modular Architecture and Temporal Denoiser

Embodiments of the present invention include a modular design that allows reusing trained components in different networks and facilitates easy debugging and incremental building of complex structures. In some embodiments, parts of a trained neural network may serve as low-level building blocks for novel tasks. A modular architecture may permit constructing large networks that would be difficult to train as monolithic blocks, for example, due to large memory requirements or training instability.

A. Single-Frame Denoiser and Source Encoder

Figure 4A:
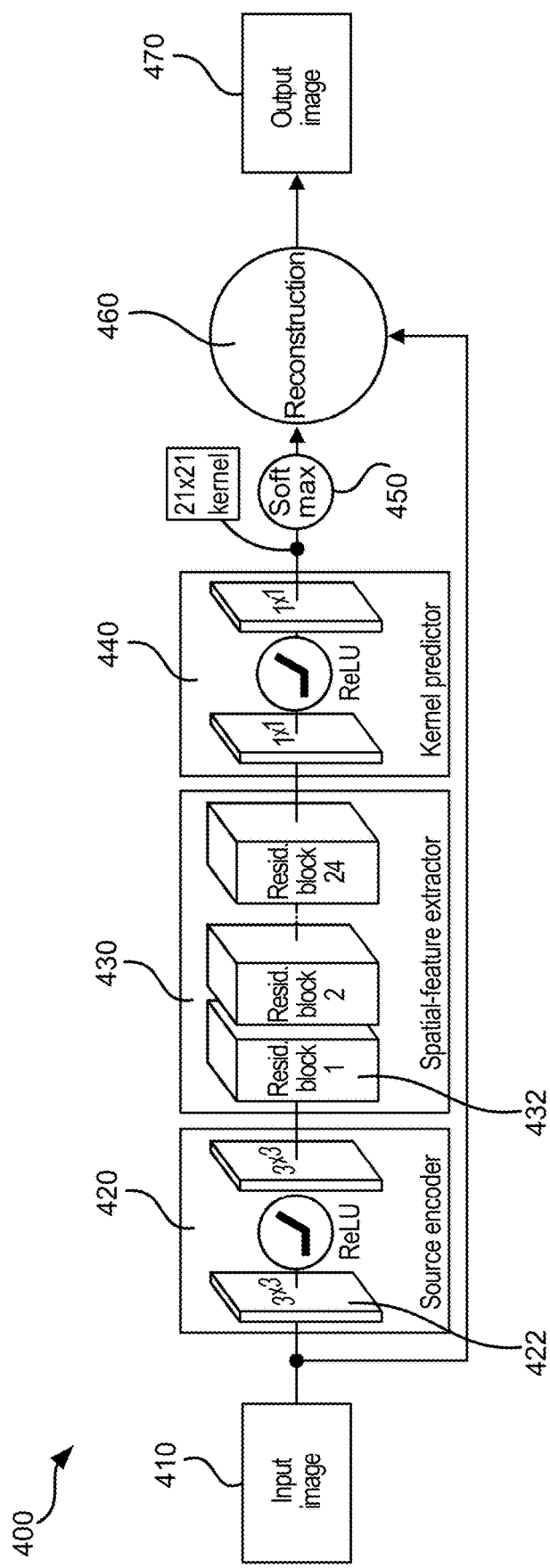
FIG. 4A illustrates a schematic block diagram of an exemplary single-frame denoiser according to some embodiments.

FIG. 4A illustrates a schematic block diagram of an exemplary single-frame denoiser 400 according to some embodiments. The denoiser 400 may include a source encoder 420 coupled to the input 410, followed by a spatial-feature extractor 430. The output of the spatial-feature extractor 430 may be fed into a KPCN kernel-prediction module 440. The scalar kernels output by the kernel-prediction module 440 may be normalized using a softmax function 450. A reconstruction module 460 may apply the normalized kernels to the noisy input image 410 to obtain a denoised image 470. Exemplary embodiments of a kernel-prediction module 440 and the reconstruction module 460 are described above. The kernel-prediction module 440 is optional.

Figure 4B:
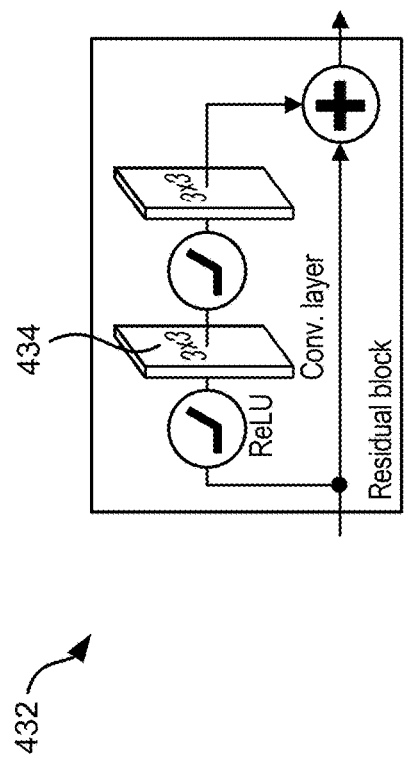
FIG. 4B illustrates a schematic block diagram of an exemplary residual block shown in FIG. 4A according to some embodiments.

In some embodiments, the spatial-feature extractor 430 may comprise a convolutional neural network, and may include a number of residual blocks 432. FIG. 4B illustrates a schematic block diagram of an exemplary residual block 432. In some embodiments, each residual block 432 may include two 3×3 convolutional layers 434 bypassed by a skip connection. In other embodiments, each residual block 432 may include more or fewer convolutional layers 434, and each layer 434 may include more or fewer nodes. A rectified linear unit (ReLU) may serve as the activation function that couples the two layers 434. Other types of activation functions may be used according to other embodiments. The skip connection may enable chaining many such residual blocks 432 without optimization instabilities. In some embodiments, up to 24 residual blocks 432 may be chained as illustrated in FIG. 4A. In other embodiments, more or fewer residual blocks 432 may be used. Further, the spatial-feature extractor 430 may include other types of neural networks, such as multilayer perceptron neural networks.

To make the denoiser 400 more versatile, the spatial-feature extractor 430 may be prefixed by the source encoder 420 as illustrated in FIG. 4A. In some embodiments, the source encoder 420 may include two 3×3 convolutional layers 422 coupled by a ReLU, as illustrated in FIG. 4A. In other embodiments, the source encoder 420 may include more or fewer layers 422, and each layer 422 may include more or fewer nodes. Other types of activation functions may also be used. The source encoder 420 may include other types of neural networks, such as multilayer perceptron neural networks. The source encoder 420 may be tailored to extract common low-level features and unify the inputs to the spatial-feature extractor 430. For example, different input datasets may contain different cinematic effects, or may have different sets of auxiliary features. The source encoder 420 may be configured to translate the information present in an input dataset to a "common format" that can be fed into the spatial-feature extractor 430.

In cases when the denoiser 400 is expected to handle significantly different input datasets, for example, input datasets from different renderers with varying sets of auxiliary buffers, or with completely different visual content, there may be one source encoder 420 for each input dataset. In some embodiments, the denoiser 400 may be trained with a first training dataset using a first source encoder 420. For training the denoiser 400 with a second training dataset characteristically different from the first training dataset, a second source encoder 420 may be swapped in. Thus, the denoiser 400 may learn to use one or more source encoders 420 for creating a shared representation among multiple datasets from different data sources. In some embodiments, the initial training may use two or more training datasets and two or more corresponding source encoders 420. In some other embodiments, the initial training may use one training dataset and one corresponding source encoder 420.

Once the denoiser 400 has been initially trained, the parameters of the spatial-feature extractor 430 may be "frozen." The denoiser 400 may be subsequently adapted for a new training dataset by swapping in a new source encoder 420. The denoiser 400 may be re-trained on the new training dataset by optimizing only the parameters of the new source encoder 420. In this manner, the parameters of the spatial-feature extractor 430 are leveraged in the new task. Because a source encoder 420 may be relative shallow (e.g., with only two 3×3 convolutional layers as illustrated in FIG. 4A), the re-training may converge relatively fast. In addition, the re-training may require only a relatively small training dataset.

The source encoder 420, the spatial-feature extractor 430, and the kernel predictor 440, as illustrated in FIG. 4A, may serve as the main building blocks of the system and jointly represent a single-frame module for obtaining a denoised image from the input tuple of a single frame.

B. Temporal Denoiser

The single-frame module discussed above may produce an animated sequence with some temporal artifacts-flickering-when executed on a sequence of frames independently. This is because each of the denoised frames may be "wrong" in a slightly different way. In order to achieve temporal stability, a denoiser according some embodiments of the present invention may consider an entire sequence of frames—a temporal neighborhood $\mathcal{T} = [\{c^{i-M}, f^{i-M}\}, \ldots (c^i, f^i), \ldots \{c^{i+M}, f^{i+M}\}]$ of 2M+1 input tuples-when denoising a single frame. This approach may have two benefits: first, the temporal neighbors may provide additional information that helps to reduce the error in the denoised color values d; second, since the neighborhoods of consecutive frames overlap, the residual error in each frame will be correlated, thereby reducing the perceptive temporal flicker. This solution to incorporate temporal neighbors is motivated by a number of observations. Target applications may include those in which the denoiser has access to both past and future frames. The temporal neighborhood may occasionally be asymmetric, e.g. when denoising the first or last frame of a sequence. In addition, the cost of denoising a sequence may be asymptotically sub-quadratic to allow filtering over large neighborhoods.

Figure 5A:
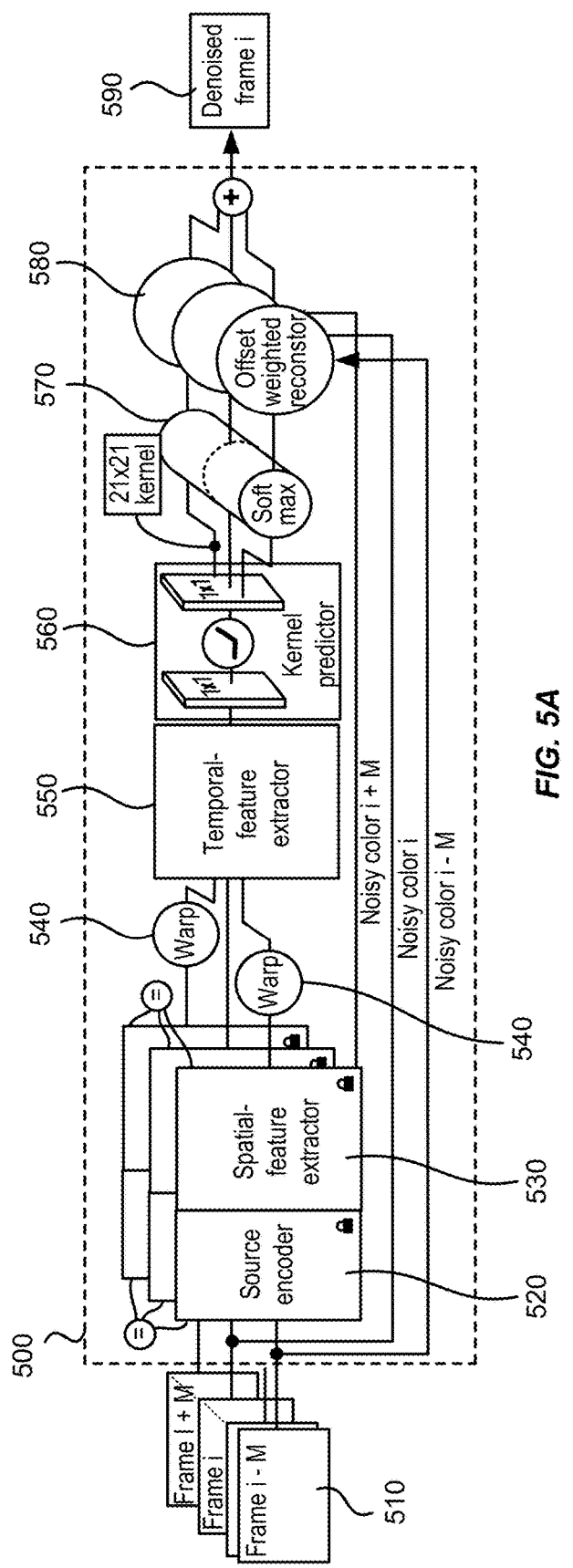
FIG. 5A illustrates an exemplary temporal denoiser according to some embodiments.

FIG. 5A illustrates a schematic block diagram of an exemplary temporal denoiser 500 according to some embodiments. A sequence of frames 510 may be input into the temporal denoiser 500. Each respective frame of the sequence of frames 510 may be pre-processed individually by a respective source encoder 520 and a respective spatial-feature extractor 530. The source encoder 520 and the spatial-feature extractor 530 are similar to the source encoder 420 and the spatial-feature extractor 430 as illustrated in FIG. 4A and described above. Spatial features are extracted by the spatial-feature extractor 530 from each respective frame. In some other embodiments, the spatial-feature extractor 530 may be omitted.

In order to align the spatial features of animated content in the sequence of frames 510, the spatial features extracted from each frame are motion-warped at 540 using motion vectors obtained either from the renderer or computed using optical flow. The motion vectors may be stacked with respect to each other such that the spatial features of each frame are warped into the time of the center frame. The warped spatial features are concatenated and input into a temporal-feature extractor 550. In some other embodiments, the motion-warping step 540 may be omitted. Instead, motion-warping may be applied to each frame of the sequence of frames 510 before they are input to the source encoder 520.

Figure 5B:
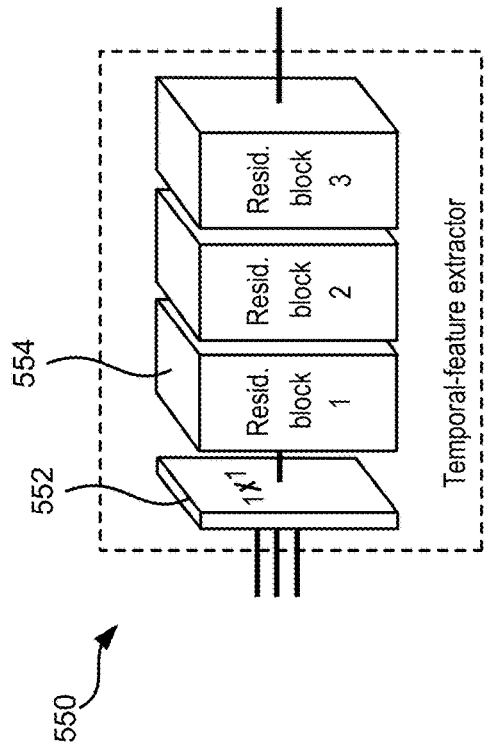
FIG. 5B illustrates a schematic block diagram of an exemplary temporal-feature extractor shown in FIG. 5A according to some embodiments.

FIG. 5B illustrates a schematic block diagram of an exemplary temporal-feature extractor 550 according to some embodiments. As illustrated, the temporal-feature extractor 550 may include a 1×1 convolutional layer 552, and a plurality of residual blocks 554 (e.g., three residual blocks). The concatenated spatial features are passed through the 1×1 convolutional layer 552 to bring back the concatenated information to the appropriate number of channels for the residual blocks 554. For instance, if the spatial features for each frame has 32 channels and the spatial features of 7 frames are concatenated, the resulting vector may have 32×7=224 channels. The 1×1 convolutional layer 552 may bring down the number of channels according to the configuration of the residual blocks 554 (e.g., to 64 channels). The residual blocks 554 may be similar to the residual blocks 432 as illustrated in FIG. 4B and described above. In some other embodiments, the temporal-feature extractor 550 may include other types of neural networks, such as multi-layer perceptron neural networks.

Referring again to FIG. 5A, similar to the single-frame network 400 illustrated in FIG. 4A, the temporal features extracted by the temporal-feature extractor 550 may be fed into a kernel predictor 560, only this time there is an independent kernel predictor 560 for each of the frames 510. Each respective kernel predictor 560 may produce a respective set of scalar kernels (e.g., a set of 21×21 kernels) for a respective frame. The multiple sets of kernels may be jointly normalized using a softmax function 570 across all kernels (e.g., 21×21×5 kernels for a five-frame input). The kernel-prediction module 560 may be optional.

A reconstruction module 580 may apply the normalized kernels to the noisy input frames 510 to obtain a denoised frame 590 of the center frame i. The joint normalization may ensure that the final denoised frame 590 can be obtained by simply adding the kernel-weighted noisy input frames 510.

In embodiments where motion-warping 540 is performed on the spatial features extracted from each frame, each respective set of kernels may be offset along an inverted motion-vector path, e.g., by motion-warping from the center frame back to the corresponding frame and applying the square kernel thereof. This may ensure that, in each frame of the sequence of frames 510, the kernel is applied to a pixel patch that content-wise corresponds well to the patch in the center frame i.

1. Network Parameters and Training

In some embodiments, the same set of network parameters may be used across all the instantiations of the source encoder 520 and the spatial-feature extractor 530 (as represented by the "=" sign in FIG. 5A). The source encoder 520 and the spatial-feature extractor 530 may be pre-trained independently as part of a single-frame network, which may be optimized using a set of noisy and ground-truth image pairs. The optimized parameters may be then locked (e.g., treated as constant during later backpropagation). The pre-trained source encoder 520 and the spatial-feature extractor 530 may be instantiated across all input frames 510 in the temporal neighborhood. Training the rest of the temporal denoiser network 500 then requires optimizing only the parameters of the relatively small temporal-feature extractor 550 and the kernel predictor 560. The optimization of the temporal denoiser 500 may be performed using pairs of noisy input sequences and reference images for the center frame of each input sequence.

In some other embodiments, the source encoder 520 and the spatial-feature extractor 530 may not be pre-trained, and instead are jointly trained with the temporal-feature extractor 550 and the kernel predictor 560. In some further embodiments, the source encoders 520 and the spatial-feature extractors 530 for the different frames of the sequence of frames 510 may have network parameters that are independent from each other. In some further embodiments, the spatial-feature extractor 530 may be omitted, and the source encoder 520 and the temporal-feature extractor 550 are jointly trained.

The approach to temporal denoising according to embodiments of the present invention as described above is substantially different from the work by Chaitanya et al. [2017] [Chaitanya et al. [2017] [Chakravarty R. A., Chaitanya Anton Kaplanyan et al., 2017. *ACM Trans. Graph. (Proc. SIGGRAPH)* (2017)] who utilize recurrent connections to accumulate information over subsequent frames. The two works differ primarily due to the very different application they target. Since their target is real-time rendering, Chaitanya et al. [2017] [Chakravarty R. A., Chaitanya Anton Kaplanyan et al., 2017. *ACM Trans. Graph. (Proc. SIGGRAPH)* (2017)] are able to build a temporal context using only past frames. In contrast, embodiments of the present invention are able to make use of a symmetrical neighborhood around the frame to be denoised. The effects of different types of temporal context and neighborhood size are discussed below.

2. First Method of Denoising Images Using a Temporal Denoiser

Figure 6:
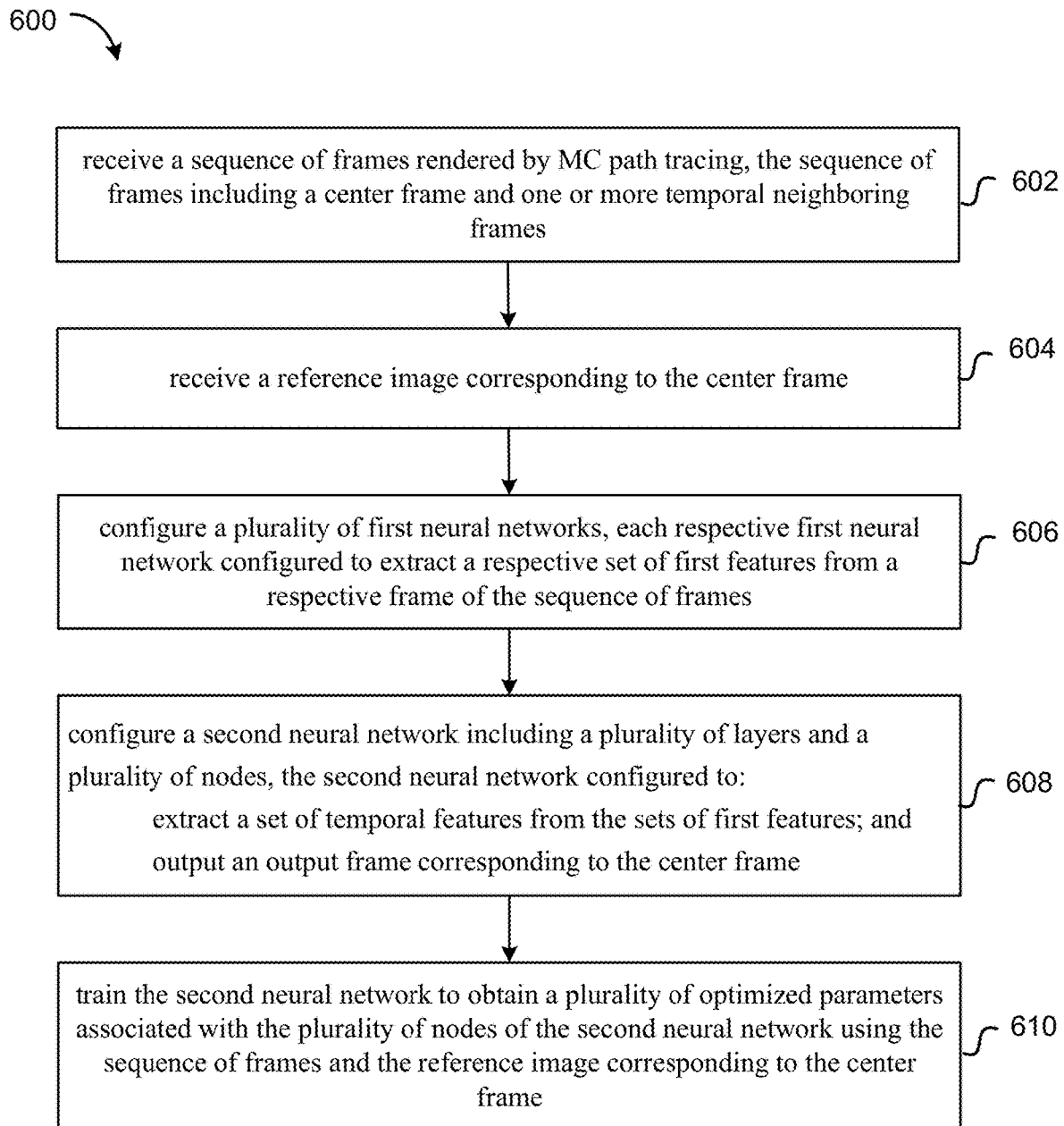
FIG. 6 is a flowchart illustrating a method of denoising images rendered by MC path tracing using a temporal denoiser according to some embodiments.

FIG. 6 is a flowchart illustrating a method 600 of denoising images rendered by MC path tracing using a temporal denoiser according to some embodiments.

At 602, a sequence of frames rendered by MC path tracing is received. The sequence of frames may include a center frame and one or more temporal neighboring frames. The temporal neighboring frames may include both past frames and future frames, or only past frames, or only future frames.

At 604, a reference image corresponding to the center frame is received. The reference image may be rendered by MC path tracing using more samples per pixel and may be less noisy than the center frame. Alternatively, the reference image may be generated by filtering an image rendered by MC path tracing using a denoiser.

At 606, a plurality of first neural networks is configured. Each respective first neural network may be configured to extract a respective set of first features from a respective frame of the sequence of frames. In some embodiments, each first neural network may include a respective source encoder (e.g., the source encoder 520 illustrated in FIG. 5A). Each first neural network may optionally include a respective spatial-feature extractor (e.g., the spatial feature extractor 530 illustrated in FIG. 5A).

At 608, a second neural network is configured. The second neural network includes a plurality of layers and a plurality of nodes. The second neural network is configured to extract a set of temporal features from the sets of first features, and output an output frame corresponding to the center frame. In some embodiments, the second neural network may include a kernel predictor (e.g., the kernel predictor 560 illustrated in FIG. 5A) configured to generate a respective set of weights for each respective frame of the sequence of frames. The respective set of weights are associated with a neighborhood of pixels around each pixel of the respective frame. The second neural network may further include a reconstruction module (e.g., the reconstruction module 580 illustrated in FIG. 5A) configured to reconstruct a plurality of denoised frames. Each denoised frame corresponds to a respective frame of the sequence of frames and reconstructed using a respective set of weights. The output frame may be obtained by summing the plurality of denoised frames.

At 610, the second neural network is train to obtain a plurality of optimized parameters associated with the plurality of nodes of the second neural network using the sequence of frames and the reference image corresponding to the center frame.

It should be appreciated that the specific steps illustrated in FIG. 6 provide a particular method of denoising images rendered by MC path tracing according to some embodiments. Other sequences of steps may also be performed according to alternative embodiments. For example, alternative embodiments may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

3. Second Method of Denoising Images Using a Temporal Denoiser

Figure 7:
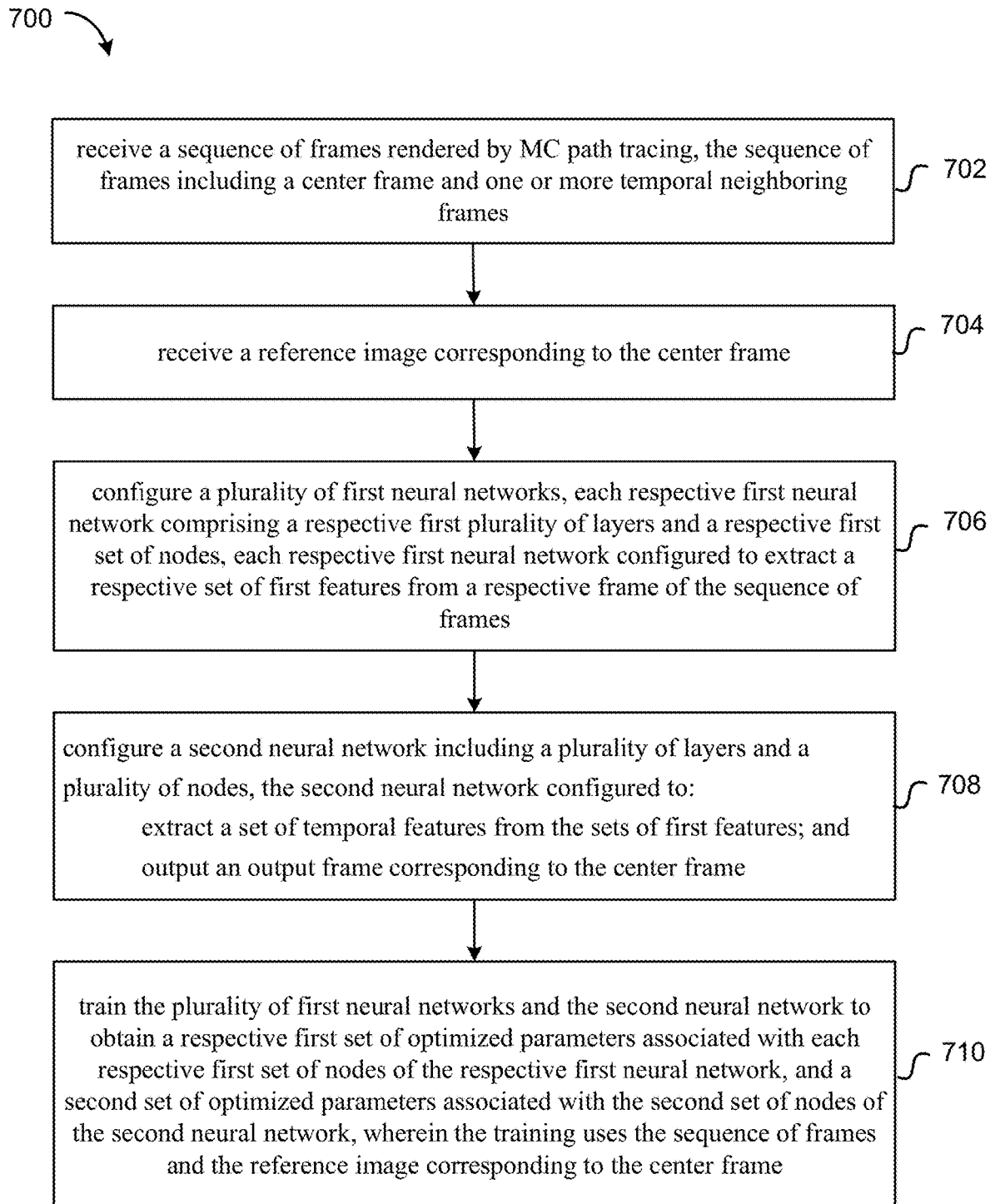
FIG. 7 is a flowchart illustrating a method of denoising images rendered by MC path tracing using a temporal denoiser according to some other embodiments.

FIG. 7 is a flowchart illustrating a method 700 of denoising images rendered by MC path tracing using a temporal denoiser according to some other embodiments.

At 702, a sequence of frames rendered by MC path tracing is received. The sequence of frames may include a center frame and one or more temporal neighboring frames. The temporal neighboring frames may include both past frames and future frames, or only past frames, or only future frames.

At 704, a reference image corresponding to the center frame is received. The reference image may be rendered by MC path tracing using more samples per pixel and may be less noisy than the center frame. Alternatively, the reference image may be generated by filtering an image rendered by MC path tracing using a denoiser.

At 706, a plurality of first neural networks is configured. Each respective first neural network may include a respective first plurality of layers and a respective first set of nodes. Each respective first neural network may be configured to extract a respective set of first features from a respective frame of the sequence of frames. In some embodiments, each first neural network may include a respective source encoder (e.g., the source encoder 520 illustrated in FIG. 5A). Each first neural network may optionally include a respective spatial-feature extractor (e.g., the spatial feature extractor 530 illustrated in FIG. 5A).

At 708, a second neural network is configured. The second neural network includes a plurality of layers and a plurality of nodes. The second neural network is configured to extract a set of temporal features from the sets of first features, and output an output frame corresponding to the center frame. In some embodiments, the second neural network may include a kernel predictor (e.g., the kernel predictor 560 illustrated in FIG. 5A) configured to generate a respective set of weights for each respective frame of the sequence of frames. The respective set of weights are associated with a neighborhood of pixels around each pixel of the respective frame. The second neural network may further include a reconstruction module (e.g., the reconstruction module 580 illustrated in FIG. 5A) configured to reconstruct a plurality of denoised frames. Each denoised frame corresponds to a respective frame of the sequence of frames and reconstructed using a respective set of weights. The output frame may be obtained by summing the plurality of denoised frames.

At 710, the plurality of first neural networks and the second neural network are jointly trained to obtain a respective first set of optimized parameters associated with each respective first set of nodes of the respective first neural network, and a second set of optimized parameters associated with the second set of nodes of the second neural network. The training uses the sequence of frames and the reference image corresponding to the center frame.

It should be appreciated that the specific steps illustrated in FIG. 7 provide a particular method of denoising images rendered by MC path tracing according to some embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

VI. Multi-Scale Architecture

While denoising algorithms may be good at removing high-frequency noise, they tend to leave low-frequency artifacts. Neural-network-based denoisers are no exception. Inspired by the work of [Mauricio Delbracio et al., *ACM Transactions on Graphics* 33, 1, Article 8 (February 2014), 15 pages], a denoiser according to some embodiments may provide improved performance by filtering at different spatial scales.

A. Scale Decomposition

Figure 8A:
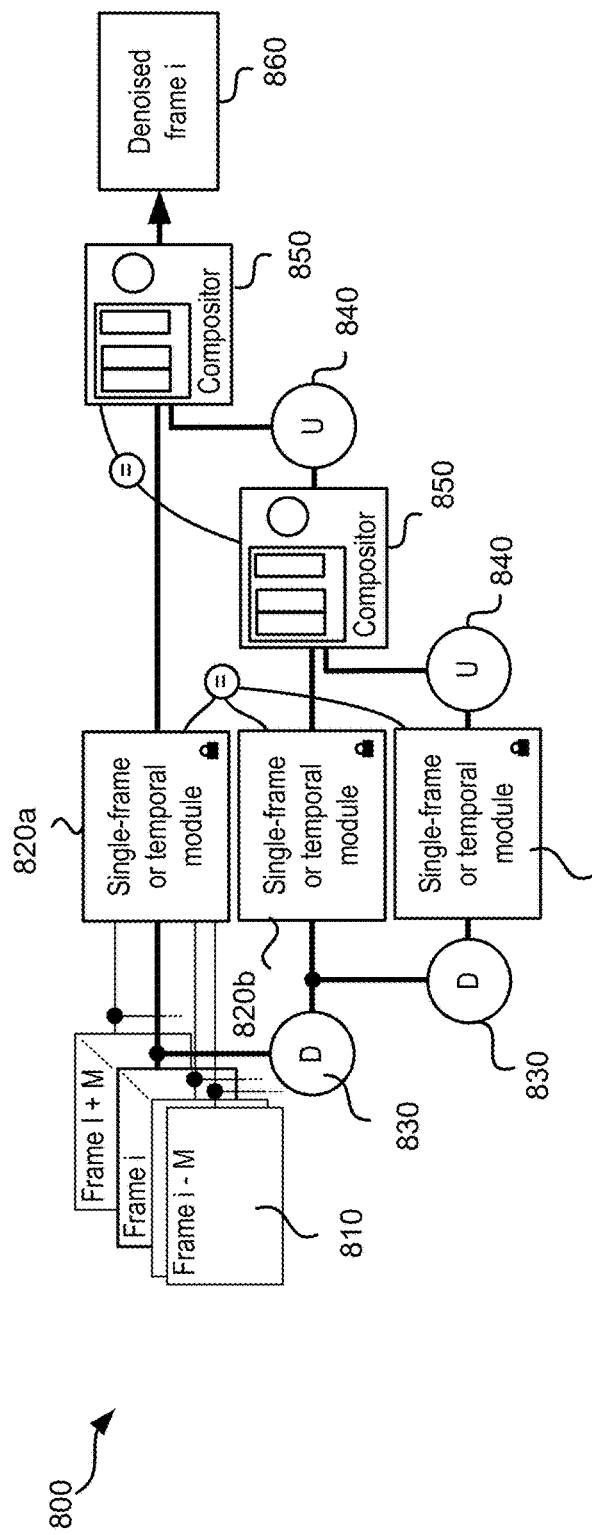
FIG. 8A illustrates a schematic block diagram of an exemplary multi-scale denoiser according to some embodiments.

FIG. 8A illustrates a schematic block diagram of an exemplary multi-scale denoiser 800 according to some embodiments. For an input frame 810 (or a sequence of frames), a multi-level pyramid may be constructed using a down-sampling operation ("D") 830. In an exemplary embodiment, the down-sampling operation 830 may down-sample the image of the input frame 810 uniformly by a factor of two along each coordinate direction (i.e., 2×2 in the two orthogonal directions). The down-sampled image may be down-sampled again by a factor of two along each coordinate direction to create the next level of the pyramid, and so on and so forth. In some embodiments, a box filter may be used for the down-sampling operation 830, where the average of each 2×2 pixel block in a finer scale image is computed for each pixel in the down-sampled image. In some other embodiments, a strided convolutional layer (e.g., with a stride of 2) in a neural network performs the down-sampling, where the down-sampling weights are learned. It should be understood that other factors (e.g., 3×3 or 4×4) may be used in the down-sampling operation.

In the example illustrated in FIG. 8A, the pyramid includes three levels: the input frame on the top level, and two lower levels with successively coarser scales. In other embodiments, the pyramid may include more than three levels, such as four, five, or more levels. In the 2×2 down-sampling example. The input frame may also include a set of auxiliary buffers (and their corresponding variances) that encode scene information (e.g., surface normal, albedo, depth, and the like). The auxiliary buffers in f may also be down-sampled in a similar fashion. In some embodiments, variance buffers may be additionally divided by a factor of four to account for the corresponding reduction in noise by the down-sampling operation.

As illustrated in FIG. 8A, a respective image at each level of the pyramid may be fed into a respective single-frame denoiser module 820a, 820b, or 820c. For example, the image of the input frame at the top level may be fed into a first single-frame denoiser module 820a to produce a first denoised image at the original scale; the down-sampled image at the first lower level may be fed into a second single-frame denoiser module 820b to produce a second denoised image at a first coarser scale; and the down-sampled image at the second lower level may be fed into a third single-frame denoiser module 820c to produce a third denoised image at a second coarser scale, as illustrated in FIG. 8A. In some other embodiments, the single-frame denoiser modules 820a, 820b, and 820c may be replaced by temporal denoiser modules when the input is a sequence of frames. The following discussions refer to a single-frame denoising scenario. It should be understood that the methods discussed herein can be applied to temporal denoising as well.

B. Scale Compositor

In some embodiments, the denoised images at various scales may be progressively combined—from the coarsest to the finest scale-using scale-compositing modules 850. As illustrated in FIG. 8A, a denoised image at a coarse-scale $i^c$ may be up-sampled using an up-sampling operation ("U") 840 to obtain an up-sampled coarse-scale image $Ui^c$. The up-sampling operation 840 is an inverse operation of a corresponding down-sampling operation, where a coarse-scale image $i^c$ is up-sampled uniformly by a factor (e.g., a factor of two) along each coordinate direction. The up-sampled coarse-scale image $Ui^c$ may then be combined with a fine-scale image $i^f$ at the next scale level using the scale-compositing module 850. In some embodiments, a bilinear interpolation may be used for the up-sampling operation 840. Other interpolation methods, such as linear interpolation, cubic interpolation, Gaussian interpolation, Lanczos interpolation, and the like, may also be used.

Figure 8B:
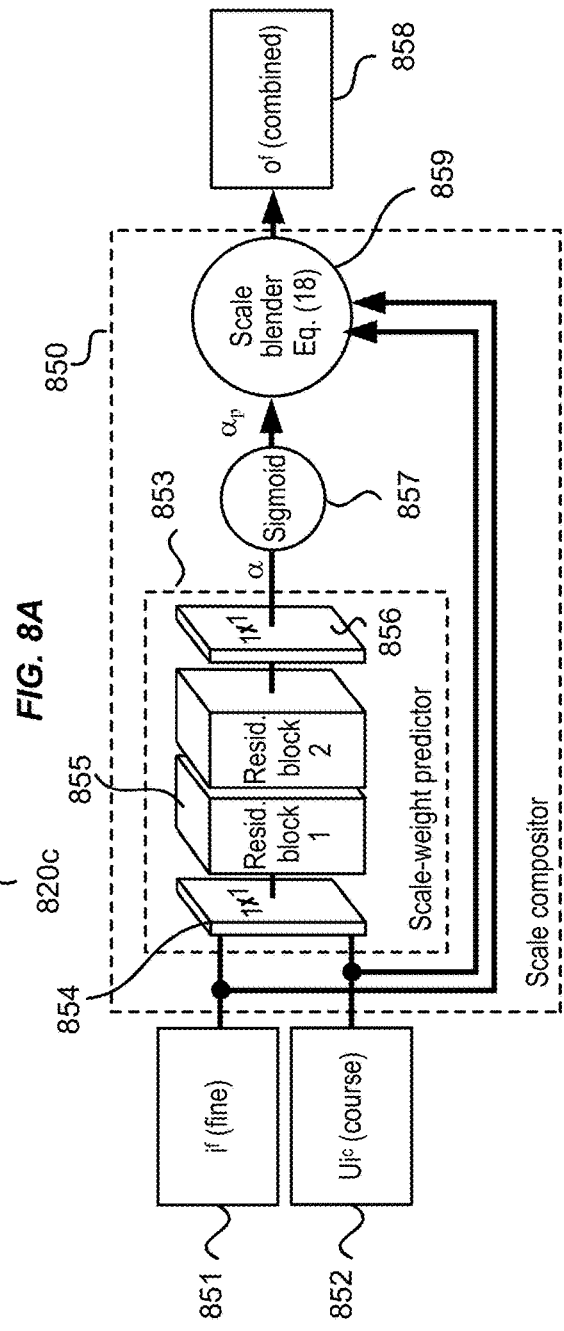
FIG. 8B illustrates a schematic block diagram of an exemplary scale-compositing module shown in FIG. 8A according to some embodiments.

FIG. 8B illustrates schematically a block diagram of an exemplary scale-compositing module 850 according to some embodiments. The scale-compositing module 850 takes as input two denoised images at two adjacent scales: a fine-scale image $i^f$ 851 and an up-sampled coarse-scale image $Ui^c$ 852. The two images 851 and 852 are input to a neural network 853 (referred herein as the scale-weight predictor), which is configured to extract a set of per-pixel scaler weights $\alpha$. The set of per-pixel scaler weights $\alpha$ may be normalized by a sigmoid function 857 to produce a set of normalized per-pixel scaler weights $\alpha_p$. In some embodiments, the scale-weight predictor 853 may comprise a convolutional neural network, and may include an input layer 854, a plurality of residual blocks 855 (e.g., two residual blocks 855), and an output layer 856. In some other embodiments, the scale-weight predictor 853 may comprise a multilayer perceptron neural network, or other types of neural network.

A scale blender 859 uses the set of normalized per-pixel scaler weights $\alpha_p$ to blend the two images $i^f$ 851 and $Ui^c$ 852 to produce a combined image $O^f$ 858 as:

$$o_p = i_p^f - \alpha_p [UDi^f]_p + \alpha_p [Ui^c]_p, \qquad (18)$$

where D and U are down-sampling and up-sampling operators, respectively (e.g., 2×2 down-sampling and 2×2 up-sampling operators). $UDi^f$ extracts low frequencies from the fine-scale image $i^f$; and $Ui^c$ refers to the up-sampled result from the coarse-scale image $i^c$. Thus, the blending takes the fine-scale image $i^f$ and replaces its low frequencies with low frequencies obtained from the coarse-scale image $i^c$.

In some other embodiments, a multi-scale denoiser may be implemented using a UNET architecture that is inherently multi-scale. A denoised image may be obtained at every scale of the UNET. The per-pixel blending weights may be computed directly from the UNET feature at the last layer of the corresponding scale. A compositing module may be configured to blend two adjacent-scale denoised images. The compositing module may include a single convolutional layer in some embodiments. The UNET may have more scales than used in the reconstruction. For instance, the UNET may have five scales (e.g., to further improve the spatial reach of the neural network), but only the output of three scales may be used in the multi-scale reconstruction.

C. Network Parameters and Training

In some embodiments, the single-frame denoiser modules 820a, 820b, and 820c applied to different scales may share the same set of parameters (as represented by the "=" in FIG. 8A). A single-frame denoiser module may be pre-trained using a set of noisy and ground-truth image pairs. The optimized parameters may then be locked, and the pre-trained single-frame denoiser module may be instantiated across all scales in the pyramid. In some embodiments, the scale-weight predictors 854 across different scales may also share the same set of parameters (as represented by the "=" in FIG. 8A). In such cases, since the scale compositor 850 appears twice or more in the multi-level hierarchy, its parameters are optimized using backpropagation twice or more for each entry in the training set. Therefore, the scale compositor 850 may be trained relatively quickly.

In some other embodiments, the single-frame denoiser module 820a, 820b, or 820c may not be pre-trained, and may be jointly trained with the scale-weight predictor 854. In some further embodiments, the single-frame denoiser modules 820a, 820b, and 820c applied to different scales may not share the same set of parameters. Similarly, the scale-weight predictors 854 across different scales may not share the same set of parameters.

A difference between the multi-scale architecture according to the present invention and the one proposed by [Mauricio Delbracio et al., ACM Transactions on Graphics 33, 1, Article 8 (February 2014), 15 pages] may be that, here, a weighted scale compositor 850 is employed, where the weights are predicted by the network. In hierarchical schemes, ringing artifacts due to aliasing in the decomposition are a recurrent problem. The multi-scale compositor 850 may mitigate these artifacts by weighting the contribution of the coarser levels of the mip-map layers in the pyramid on a per-pixel basis. This mechanism may effectively disable the multi-scale reconstruction if the denoised output is inconsistent across the mip-map layers, which may alleviate ringing artifacts.

Figure 9:
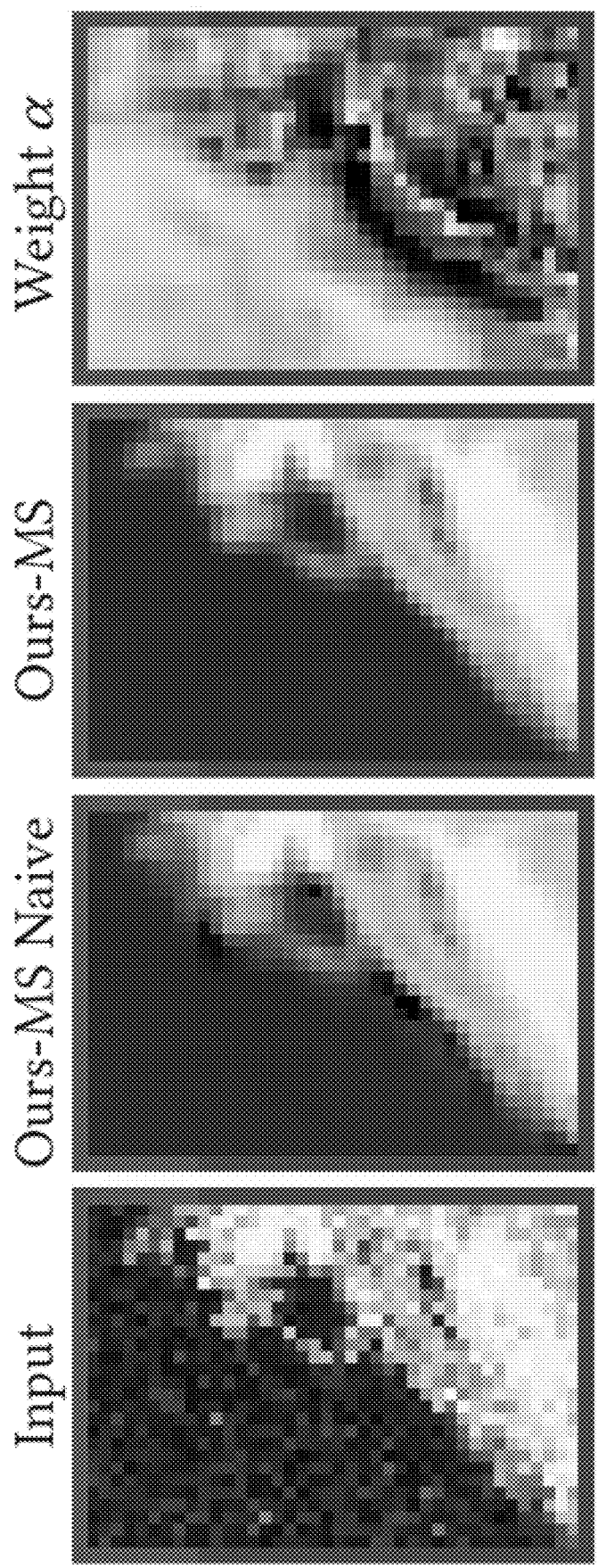
FIG. 9 shows results of multi-scale denoising according to some embodiments.

FIG. 9 shows results of multi-scale denoising according to some embodiments. As illustrated, aliasing in the mip-map decomposition can lead to ringing artifacts in a naïve reconstruction without using smart weights α (Ours-MS Naive). The weighted reconstruction (Ours-MS) modulates the contributions from coarser scales on a per-pixel basis using weights α predicted by the scale compositor 850 (brighter corresponds to higher contribution of coarser scale), thereby alleviating ringing.

D. First Method of Denoising Images Using a Multi-Scale Denoiser

Figure 10:
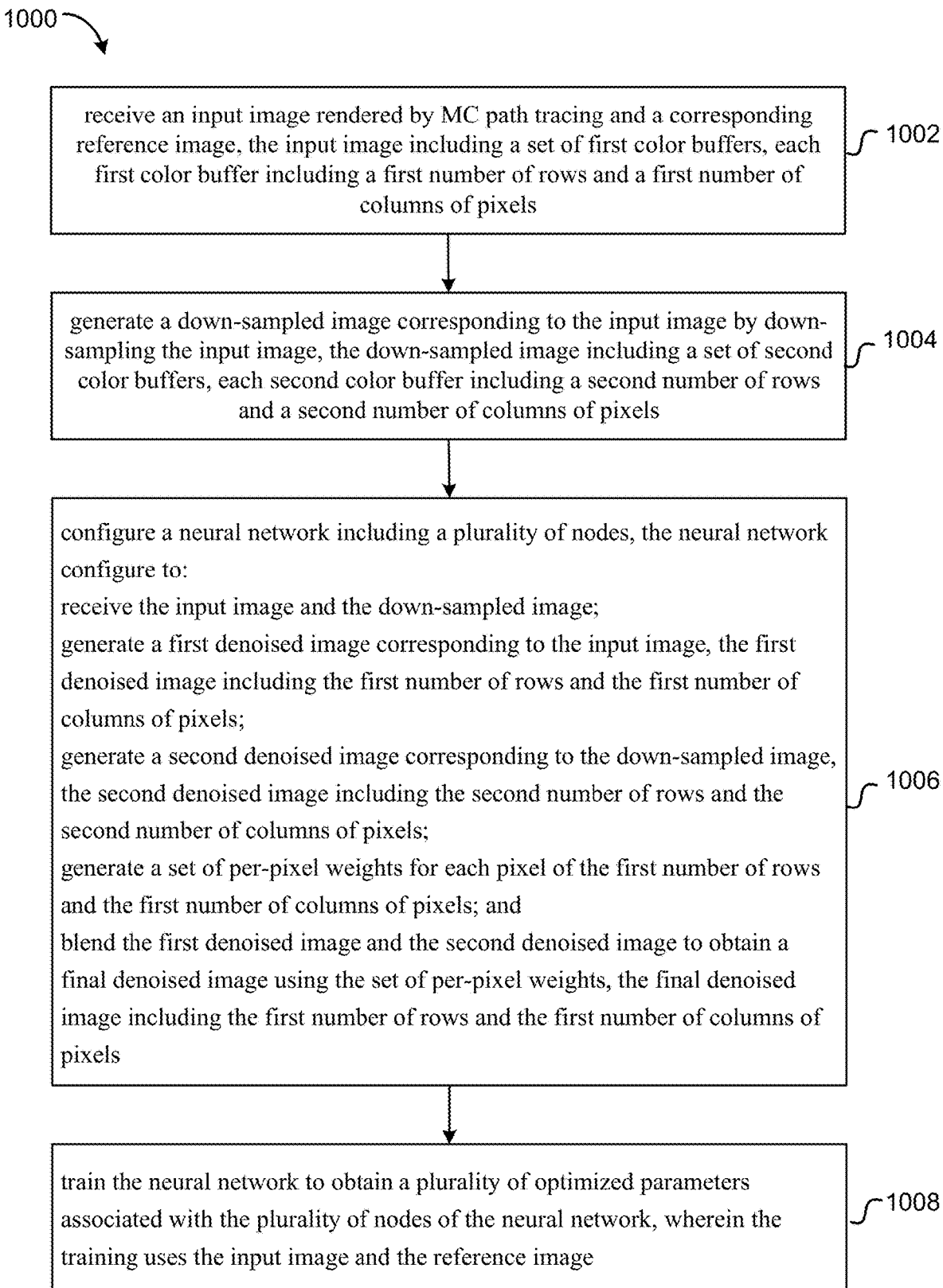
FIG. 10 is a flowchart illustrating a method of denoising images rendered by MC path tracing using a multi-scale denoiser according to some embodiments.

FIG. 10 is a flowchart illustrating a method 1000 of denoising images rendered by MC path tracing using a multi-scale denoiser according to some embodiments.

At 1002, an input image rendered by MC path tracing and a corresponding reference image are received. The input image includes a set of first color buffers. Each first color buffer includes a first number of rows and a first number of columns of pixels.

At 1004, a down-sampled image corresponding to the input image is generated by down-sampling the input image. The down-sampled image includes a set of second color buffers. Each second color buffer includes a second number of rows and a second number of columns of pixels. For example, the input image may be down-sampled by a factor of two or a factor of three along each coordinate direction (i.e., 2×2 or 3×3 in the two orthogonal directions).

At 1006, a neural network is configured. The neural network includes a plurality of nodes. The neural network may be configure to receive the input image and the down-sampled image, generate a first denoised image corresponding to the input image, and generate a second denoised image corresponding to the down-sampled image. The first denoised image includes the first number of rows and the first number of columns of pixels. The second denoised image includes the second number of rows and the second number of columns of pixels. The neural network is further configured to generate a set of per-pixel weights for each pixel of the first number of rows and the first number of columns of pixels, and blend the first denoised image and the second denoised image to obtain a final denoised image using the set of per-pixel weights. The final denoised image includes the first number of rows and the first number of columns of pixels.

In some embodiments, the neural network may be implemented using a UNET architecture that is inherently multi-scale. A denoised image may be obtained at every scale of the UNET. The per-pixel blending weights may be computed directly from the UNET feature at the last layer of the corresponding scale.

At 1008, the neural network is trained to obtain a plurality of optimized parameters associated with the plurality of nodes of the neural network. The training uses the input image and the reference image.

It should be appreciated that the specific steps illustrated in FIG. 10 provide a particular method of denoising images rendered by MC path tracing according to some embodiments. Other sequences of steps may also be performed according to alternative embodiments. For example, alternative embodiments may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

E. Second Method of Denoising Images Using a Multi-Scale Denoiser

Figure 11:
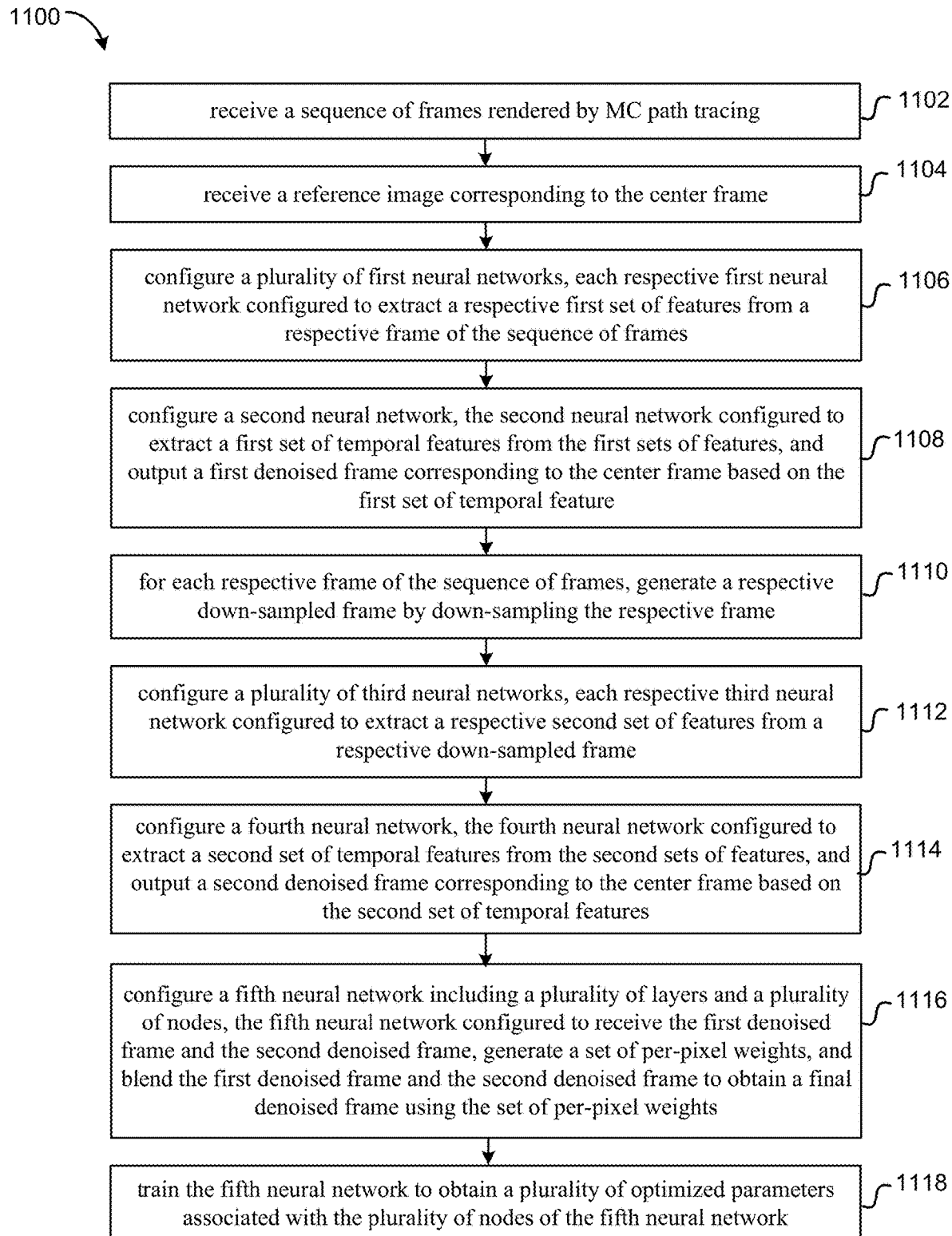
FIG. 11 is a flowchart illustrating a method of denoising images rendered by MC path tracing using a multi-scale denoiser according to some other embodiments.

FIG. 11 is a flowchart illustrating a method 1100 of denoising images rendered by MC path tracing using a multi-scale denoiser according to some embodiments.

At 1102, a sequence of frames rendered by MC path tracing is received. The sequence of frames includes a center frame and one or more temporal neighboring frames. Each frame includes a first number of rows and a first number of columns of pixels.

At 1104, a reference image corresponding to the center frame is received.

At 1106, a plurality of first neural networks is configured. Each respective first neural network is configured to extract a respective first set of features from a respective frame of the sequence of frames. In some embodiments, each first neural network may include a respective source encoder (e.g., the source encoder 520 illustrated in FIG. 5A). Each first neural network may optionally include a respective spatial-feature extractor (e.g., the spatial feature extractor 530 illustrated in FIG. 5A).

At 1108, a second neural network is configured. The second neural network is configured to extract a first set of temporal features from the first sets of features, and output a first denoised frame corresponding to the center frame based on the first set of temporal features. The first denoised frame includes the first number of rows and the first number of columns of pixels.

At 1110, for each respective frame of the sequence of frames, a respective down-sampled frame is generated by down-sampling the respective frame, The respective down-sampled frame includes a second number of rows and a second number of columns of pixels. For example, the input image may be down-sampled by a factor of two or a factor of three along each coordinate direction (i.e., 2×2 or 3×3 in the two orthogonal directions).

At 1112, a plurality of third neural networks is configured. Each respective third neural network is configured to extract a respective second set of features from a respective down-sampled frame. In some embodiments, each third neural network may include a respective source encoder (e.g., the source encoder 520 illustrated in FIG. 5A). Each first neural network may optionally include a respective spatial-feature extractor (e.g., the spatial feature extractor 530 illustrated in FIG. 5A).

At 1114, a fourth neural network is configured. The fourth neural network is configured to extract a second set of temporal features from the second sets of features, and output a second denoised frame corresponding to the center frame based on the second set of temporal features. The second denoised frame includes the second number of rows and the second number of columns of pixels.

At 1116, a fifth neural network is configured. The fifth neural network includes a plurality of layers and a plurality of nodes. The fifth neural network is configured to receive the first denoised frame and the second denoised frame, generate a set of per-pixel weights for each pixel of the first number of rows and the first number of columns of pixels, and blend the first denoised frame and the second denoised frame to obtain a final denoised frame using the set of per-pixel weights. The final denoised frame including the first number of rows and the first number of columns of pixels.

At 1118, the fifth neural network is trained to obtain a plurality of optimized parameters associated with the plurality of nodes of the fifth neural network. The training may use the sequence of frames and the reference image. In some embodiments, the plurality of first neural networks, the second neural network, the plurality of third neural networks, and the fourth neural network may be jointly trained with the training of the fifth neural network. In some other embodiments, the plurality of first neural networks, the second neural network, the plurality of third neural networks, and the fourth neural network may be pre-trained.

It should be appreciated that the specific steps illustrated in FIG. 11 provide a particular method of denoising images rendered by MC path tracing according to some embodiments. Other sequences of steps may also be performed according to alternative embodiments. For example, alternative embodiments may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

VII. Asymmetric Loss for Artistic Control

In some applications, for example in feature-film productions, it may be desirable to retain some residual noise rather than sacrifice detail by over-blurring. The choice of variance-bias tradeoff may be an artistic decision and can be made on a movie or scene basis. Therefore, it may be desirable that the end users of a denoiser have some control over the level to which residual noise is retained. A denoiser according to some embodiments may use an asymmetric loss function that may allow the denoiser (and a user thereof) to trade between variance and bias.

In some embodiments, a denoiser neural network may be optimized using a modified, asymmetric loss function $l_\lambda'$ expressed as, $$l_\lambda''(d,r)=l(d,r)(1+\lambda H((d-r)(r-c))), \qquad (19)$$

where l is a symmetric loss function, d represents data of a denoised image, r represents data of a reference image, c represents data of an input image, and $\lambda$ is a positive parameter. The Heaviside function H(•) returns 1 if the argument is positive and 0 otherwise. If the differences (d−r) and (r−c) have the same sign—i.e. the denoised result and the input are not on the same "side" relative to the reference—then such result is penalized by scaling the original loss l using an additional factor $\lambda$. $\lambda$ can be interpreted as the strength of the asymmetry, and may represent the "aggressiveness" of the denoiser.

Figure 12A:
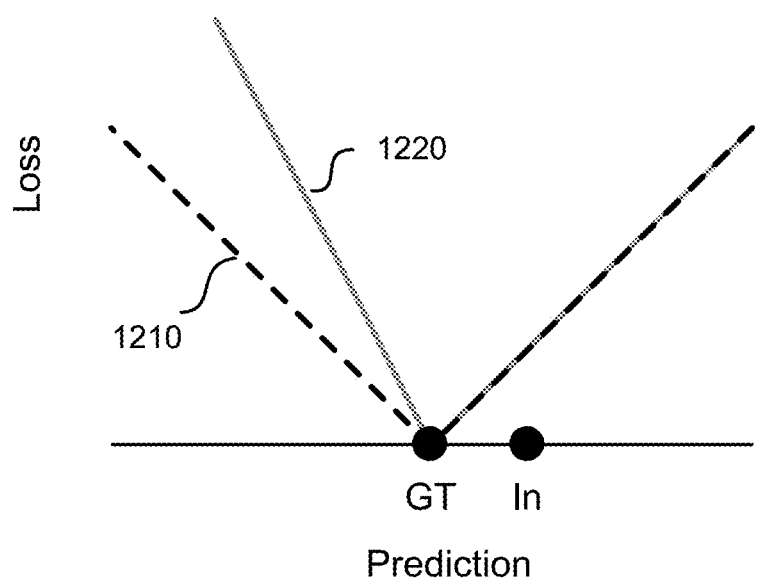
FIGS. 12A and 12B illustrate an asymmetric loss function according to some embodiments.
Figure 12B:
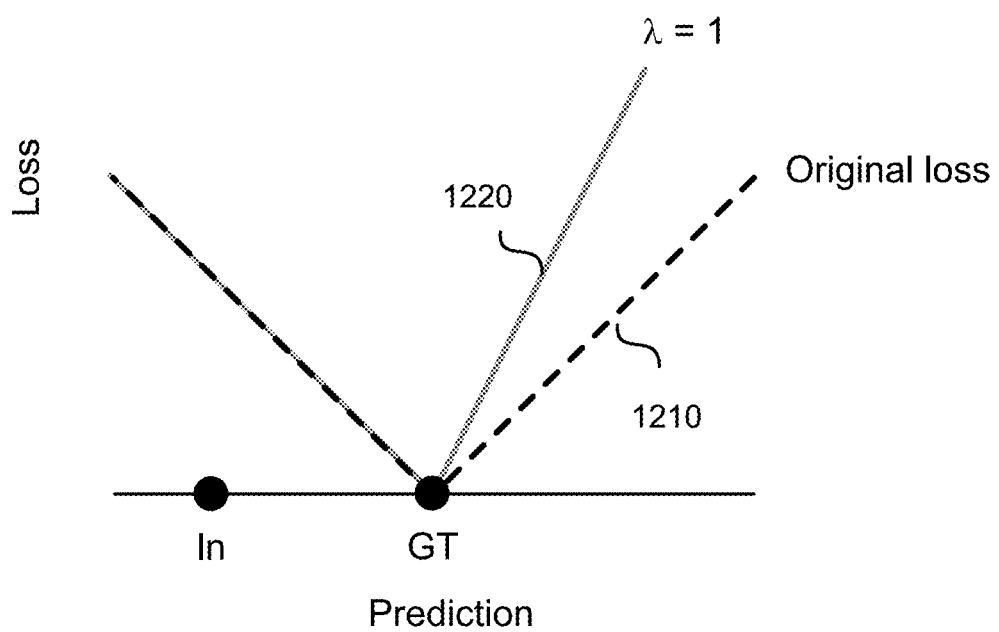

FIGS. 12A and 12B illustrate an asymmetric loss function, as expressed by Eq. (19), according to some embodiments. The horizontal axis represents the predicted values by the denoiser, and the vertical axis represents the values of the loss functions. The dashed lines 1210 represent an original symmetric loss function l, and the solid lines 1220 represent a modified asymmetric loss function $l_\lambda'$ with $\lambda=1$. FIG. 12A shows a case where the input value ("In") is on the right side of the ground-truth value ("GT") (i.e., the input value is greater than the ground-truth value). FIG. 12B shows a case where the input value is on the left side of the ground-truth value (i.e., the input value is less than the ground-truth value).

The side of the asymmetry varies per pixel depending on whether the input value at that pixel is greater or less than the ground-truth value. As illustrated, when the predicted values are on the same side of the ground truth as the input value, the asymmetric loss function $l_\lambda'$ coincides with the symmetric loss function l. On the other hand, when the predicted values are on the opposite side of the ground truth from the input value, the asymmetric loss function $l_\lambda'$ has a steeper slope than that of the symmetric loss function l. In other words, the error is "magnified" by a factor $(1+\lambda)$ only when the error has the opposite sign of the input error. The steepness of the slope is determined by the value of $\lambda$.

The loss $l_\lambda'$ h is asymmetric in the sense that, given two solutions that are equally close to the reference, it prefers the one which deviates less from the input. This may have the effect of producing solutions that retain some of the input noise but only in situations when the minimum loss cannot be reached. In order to shed some light on the mechanism that allows this behavior, a Bayesian decision theory perspective on the asymmetric loss is provided in Appendix A.

A. Training

During training, random values of λ for each pixel may be provided to the denoiser network together with a training dataset according to some embodiments. The network may learn to adapt its behavior to λ. After the network has been trained, the value(s) of λ may be set by a user (e.g., a computer animation artist) at run time. The value(s) of λ can be the same for all pixels, or alternatively can vary from pixel to pixel. This may provide the user with a direct control over the performance of the denoiser—higher values of λ may lead to more conservative denoising permitting the denoiser to leave residual noise; λ=0 reverts back to the symmetric loss. In some embodiments, the user may set the value of λ for each pixel, where the values of λ for different pixels can be different.

In some further embodiments, a plurality of denoiser networks may be trained, where each network is trained with a respective value of λ. At run time, depending on the value of λ set by a user, a corresponding network may be activated.

B. Method of Denoising Images Using an Asymmetric Loss Function

Figure 13:
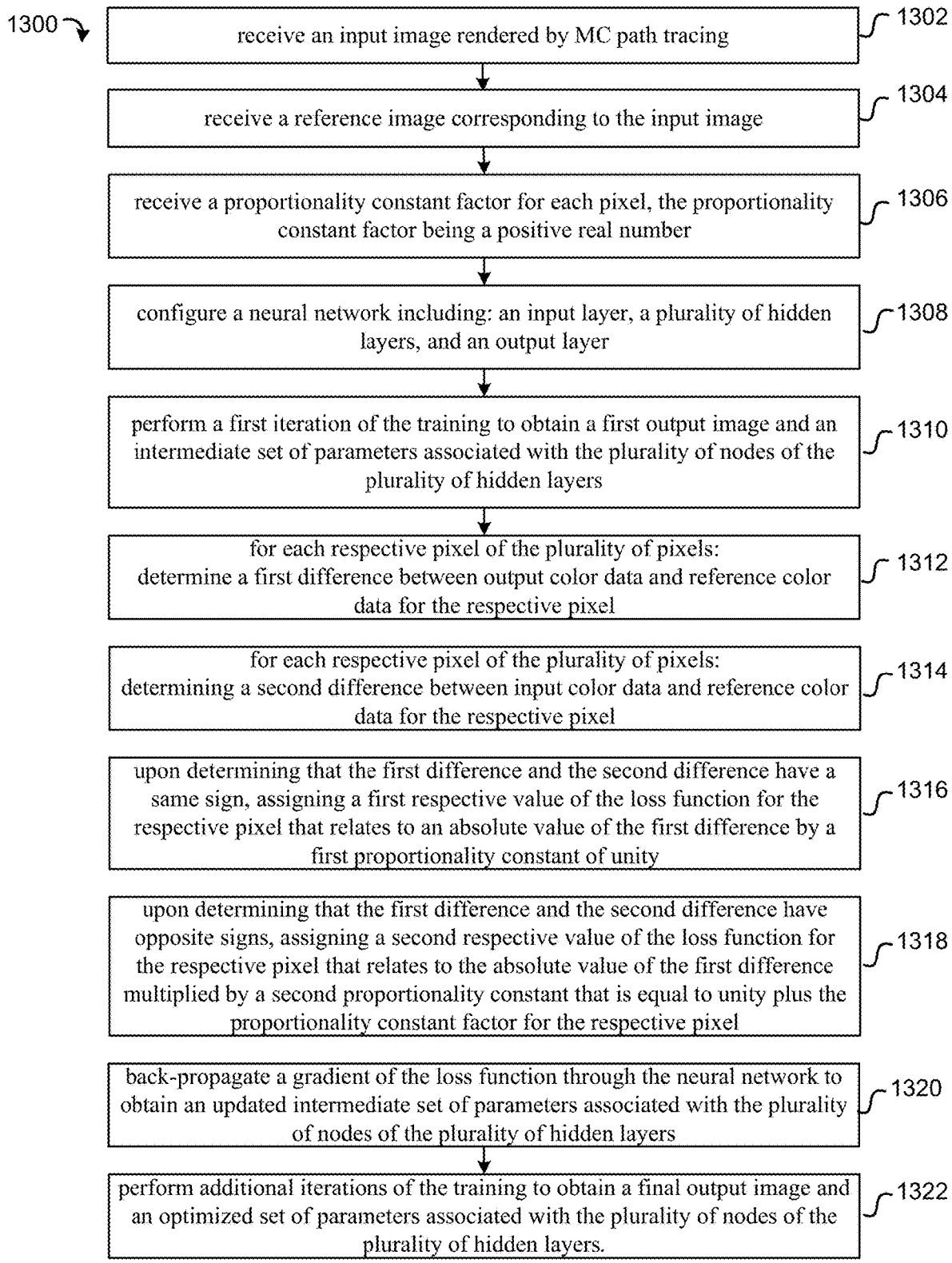
FIG. 13 is a flowchart illustrating a method of denoising images rendered by MC path tracing using an asymmetric loss function according to some embodiments.

FIG. 13 is a flowchart illustrating a method 1300 of denoising images rendered by MC path tracing using an asymmetric loss function according to some embodiments.

At 1302, an input image rendered by MC path tracing is received. The input image includes a plurality of pixels and includes input color data for each pixel.

At 1304, a reference image corresponding to the input image is received. The reference image includes the plurality of pixels and includes reference color data for each pixel. The reference image may be rendered by MC path tracing using more samples per pixel and may be less noisy than the input image. Alternatively, the reference image may be generated by filtering an image rendered by MC path tracing using a denoiser.

At 1306, a proportionality constant factor for each pixel is received. The proportionality constant factor may be a positive real number. The proportionality constant factor may be the parameter λ as discussed above.

At 1308, a neural network is configured. The neural network may include an input layer configured to receive the input image, a plurality of hidden layers including a plurality of nodes, and an output layer coupled to a last layer of the plurality of hidden layers and configured to output an output image corresponding to the input image. A first layer of the plurality of hidden layers is coupled to the input layer. The output image may include the plurality of pixels and includes output color data for each pixel.

At 1310, a first iteration of training the neural network is performed to obtain a first output image and an intermediate set of parameters associated with the plurality of nodes of the plurality of hidden layers.

At 1312-1318, values of a loss function are determined for the plurality of pixels. More specifically, at 1312, for each respective pixel of the plurality of pixels, a first difference between output color data and reference color data for the respective pixel is determined. At 1314, a second difference between input color data and reference color data for the respective pixel is determined. At 1316, upon determining that the first difference and the second difference have a same sign, a first respective value of the loss function is assigned for the respective pixel. The first respective value relates to an absolute value of the first difference multiplied by a first proportionality constant of unity. At 1318, upon determining that the first difference and the second difference have opposite signs, a second respective value of the loss function is assigned for the respective pixel. The second respective value relates to the absolute value of the first difference multiplied by a second proportionality constant that is equal to unity plus the proportionality constant factor for the respective pixel.

At 1320, a gradient of the loss function is back-propagated through the neural network to obtain an updated intermediate set of parameters associated with the plurality of nodes of the plurality of hidden layers.

At 1322, additional iterations of the training are performed to obtain a final output image and an optimized set of parameters associated with the plurality of nodes of the plurality of hidden layers.

It should be appreciated that the specific steps illustrated in FIG. 13 provide a particular method of denoising images rendered by MC path tracing according to some embodiments. Other sequences of steps may also be performed according to alternative embodiments. For example, alternative embodiments may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

VIII. Adaptive Sampling

According to some embodiments, residual noise in a denoised image may be further reduced via adaptive sampling. As the noise distribution in an MC rendered image may be uneven across an image plane (e.g. due to varying materials, depth of field, or lighting conditions), adaptive sampling may help achieving a more uniform noise distribution in a final image. Traditional solutions include adapting the number of samples per-pixel in a MC rendering to be proportional to the relative variance of each pixel (e.g., using the variance buffers). Such approach disregards the denoising step, which may have a large impact on the reconstruction errors. Therefore, some algorithms [Tzu-Mao Li, Yu-Ting Wu, and Yung-Yu Chuang, ACM Trans. Graph. 31, 6, Article 194 (November 2012), 9 pages; Bochang Moon, Nathan Carr, and Sung-Eui Yoon, Adaptive Rendering Based on Weighted Local Regression. ACM Trans. Graph. 33, 5 (September 2014), 170:1-170:14; Fabrice Rousselle, Claude Knaus, and Matthias Zwicker, Graph. 30, 6, Article 159 (December 2011), 12 pages] alternate sampling and denoising steps, and distribute samples across the pixels not according to the input variance, but rather according to the estimated reconstruction errors from the denoising steps.

Figure 14:
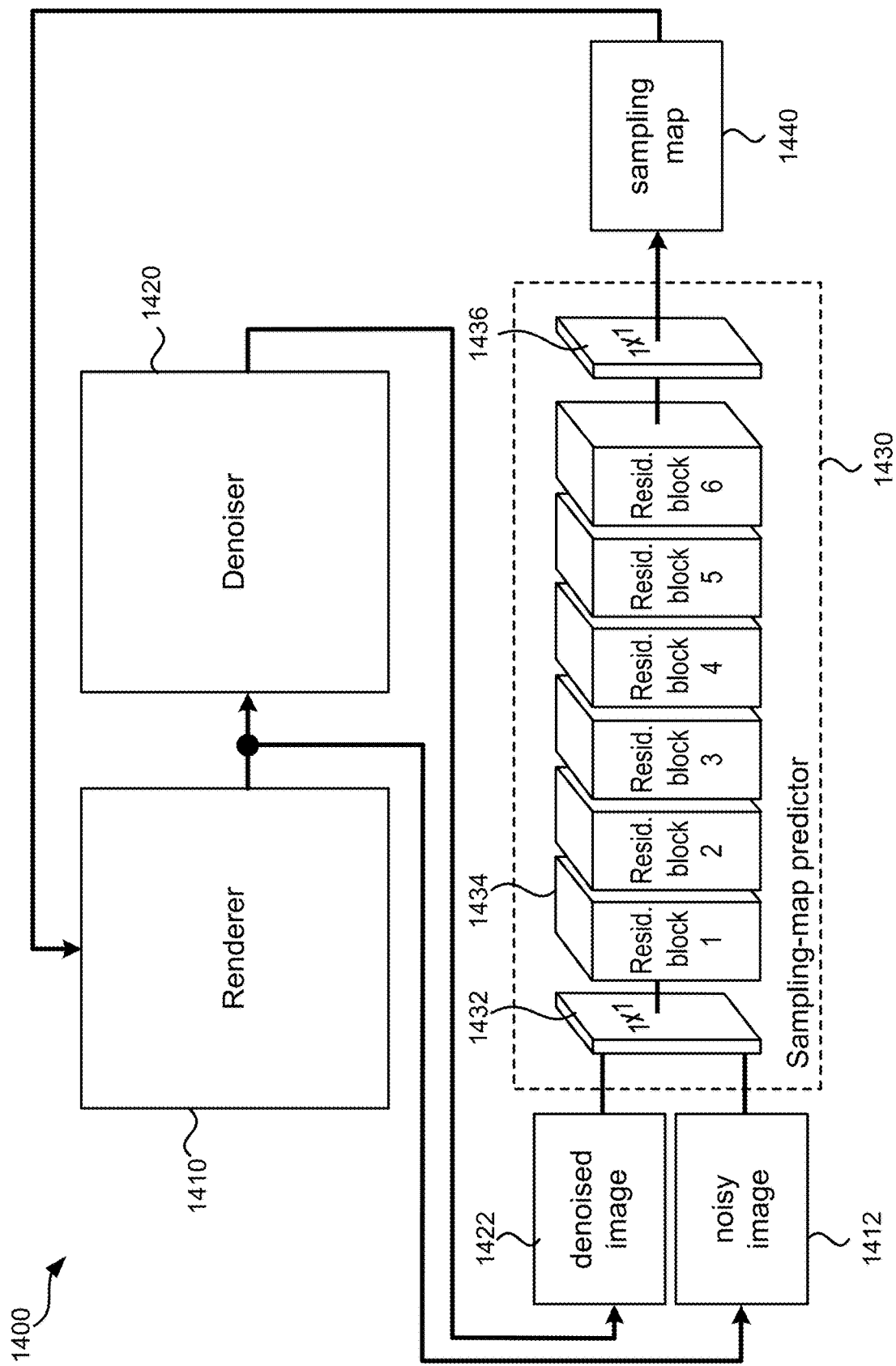
FIG. 14 illustrates a schematic block diagram of an exemplary system for rendering images by MC path tracing using adaptive sampling according to some embodiments.

According to some embodiments, an error-prediction neural network is coupled to a denoiser neural network and a MC renderer for adaptive sampling. FIG. 14 illustrates a schematic block diagram of an exemplary system 1400 for rendering images by MC path tracing using adaptive sampling according to some embodiments. The system 1400 may include a renderer 1410 configured to render images 1412 using MC path tracing. The system 1400 may further include a denoiser 1420 coupled to the renderer 1410. The denoiser 1420 may include a convolutional neural network or a multilayer perceptron neural network according to various embodiments. The denoiser 1420 may be a single-frame denoiser or a temporal denoiser as discussed above with references to FIGS. 4A and 5A. The denoiser 1420 may take a noisy image 1412 (or a sequence of images) rendered by the renderer 1410 as input, and produce a corresponding denoised image 1422.

The system 1400 further includes a sampling-map predictor 1430. In some embodiments, the sampling-map predictor 1430 may include a convolutional neural network that comprises an input layer 1432, a plurality of residual blocks 1434 (e.g., 6 residual blocks), and an output layer 1436, as illustrated in FIG. 14. In some other embodiments, the sampling-map predictor 1430 may include a multilayer perceptron neural network or other types of neural network. The sampling-map predictor 1430 may be configured to take the noisy image 1412 and the denoised image 1422 as inputs, and generate a sampling map 1440. The sampling map 1440 may include a respective error value for each respective pixel. The sampling-map predictor 1430 may be trained using a training dataset that includes pairs of noisy and denoised images. In some embodiments, the sampling-map predictor 1430 may be optimized using an L1 distance between predicted and ground-truth errors.

The sampling map 1440 may be input to the renderer 1410 to guide the adaptive sampling by the renderer 1410 in subsequent iterations of rendering. The process of rendering, denoising, sampling-map predicting, and back to rendering may repeat for several iterations. In some embodiments, a first iteration may start with 16 samples per pixel uniformly across the image plane (i.e., non-adaptive sampling). The rendered image is then denoised and the sampling-map predicting network is executed. In a next iteration, the total number of samples across all pixels in the image plane may be doubled, where the samples are allocated to each pixel proportionally to the sampling map (i.e., adaptive sampling). For example, the number of samples for each respective pixel may be proportional to the error value of a corresponding pixel in the sampling map. This process may be repeated for one or more iterations, doubling the total number of samples in each subsequent iteration. In other embodiments, the total number of samples across all pixels may be increased in each iteration by factors more or fewer than a factor of two. For example, it may be tripled or quadrupled.

In various embodiments, one or more of four different per-pixel error metrics may be considered for guiding the adaptive sampling: the relative squared error (rSE), the symmetric absolute percentage error (SAPE), the structural similarity (SSIM), and its multi-scale version (MS-SSIM). The SAPE may be defined as $|d-r|/(d+r+10^{-2})$, where d is the color data of the denoised image, and r is the color data of the reference image. Four separate sampling-map predicting networks 1430 can be trained, each optimized to predict one of the four errors. Each of the four trained sampling-map predicting networks 1430 is then tested in the system 1400 for adaptive sampling on 11 scenes. For comparison, adaptive sampling guided by the relative variance of the input (rVar) is also considered.

Figure 15A:
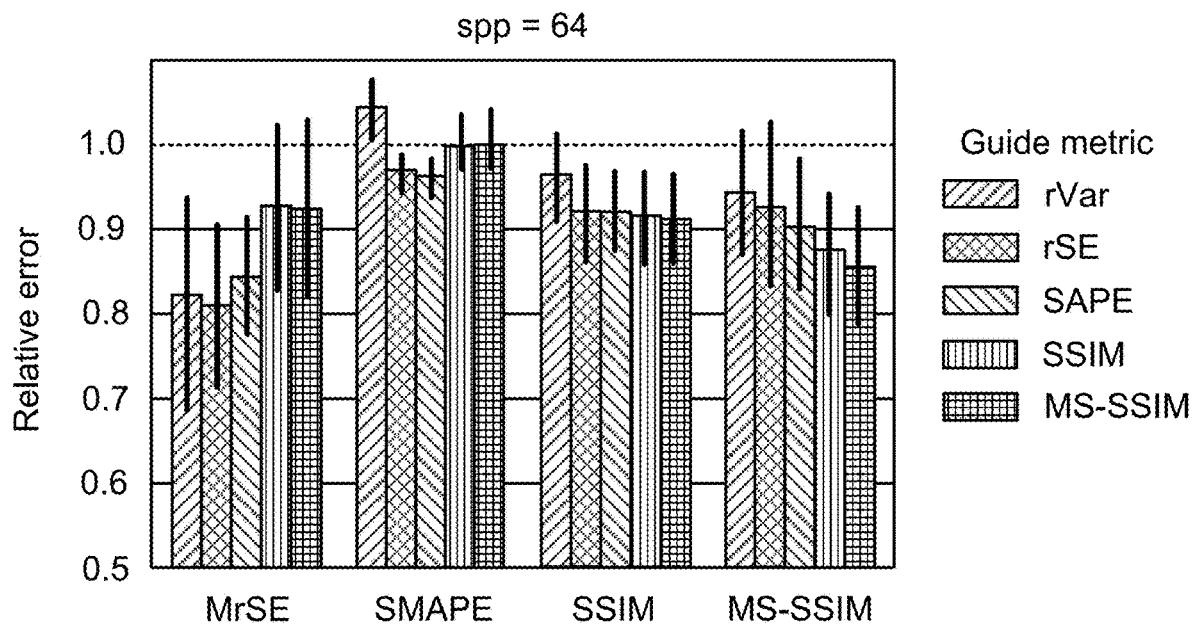
FIGS. 15A and 15B compare performances of adaptive sampling according to various embodiments.
Figure 15B:
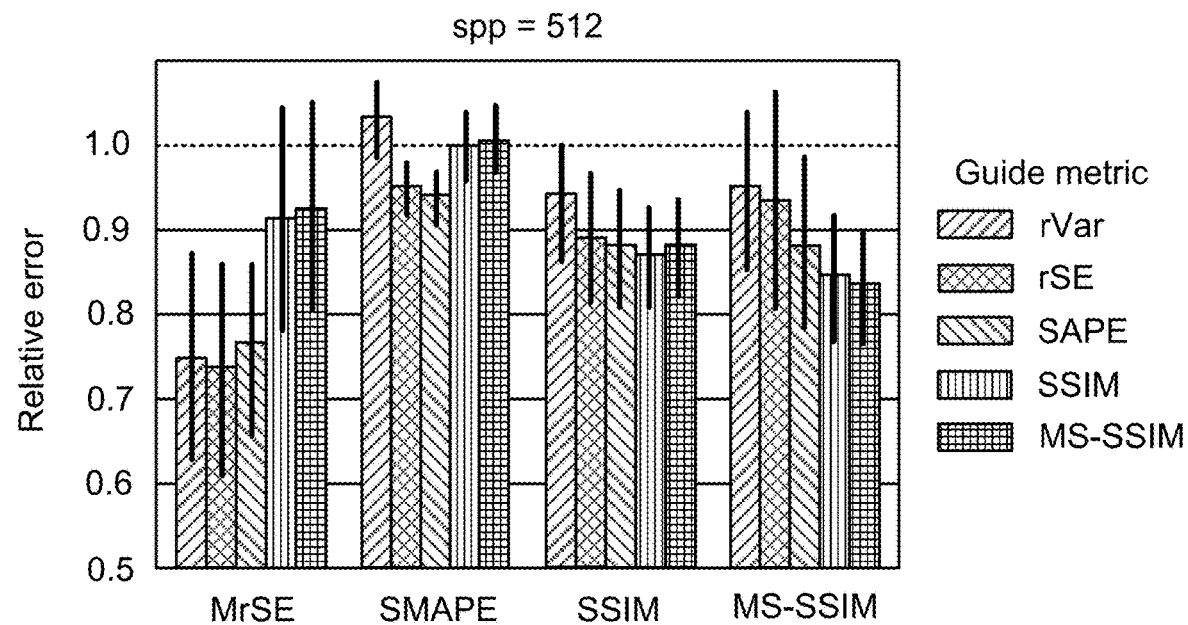

FIGS. 15A and 15B show the statistics averaged over the 11 scenes and 64 and 512 average per-pixel sample rates, respectively. The performance is measured using four different metrics that correspond to the four error metrics, but averaged over all pixels in the image (i.e., MrSE, SMAPE, SSIM, and MS-SSIM). The values in the charts correspond to the relative performance over uniform sampling (lower is better). Beyond the expected outcome (matching the guide and evaluation metric yields a better score), it may be noticed that the input relative variance may be a poor guide according to perceptual metrics. As illustrated, the symmetric absolute percentage error (SAPE) may offer a good compromise for all objective and perceptual metrics.

A. Method of Rendering Images by MC Path Tracing Using Adaptive Sampling

Figure 16:
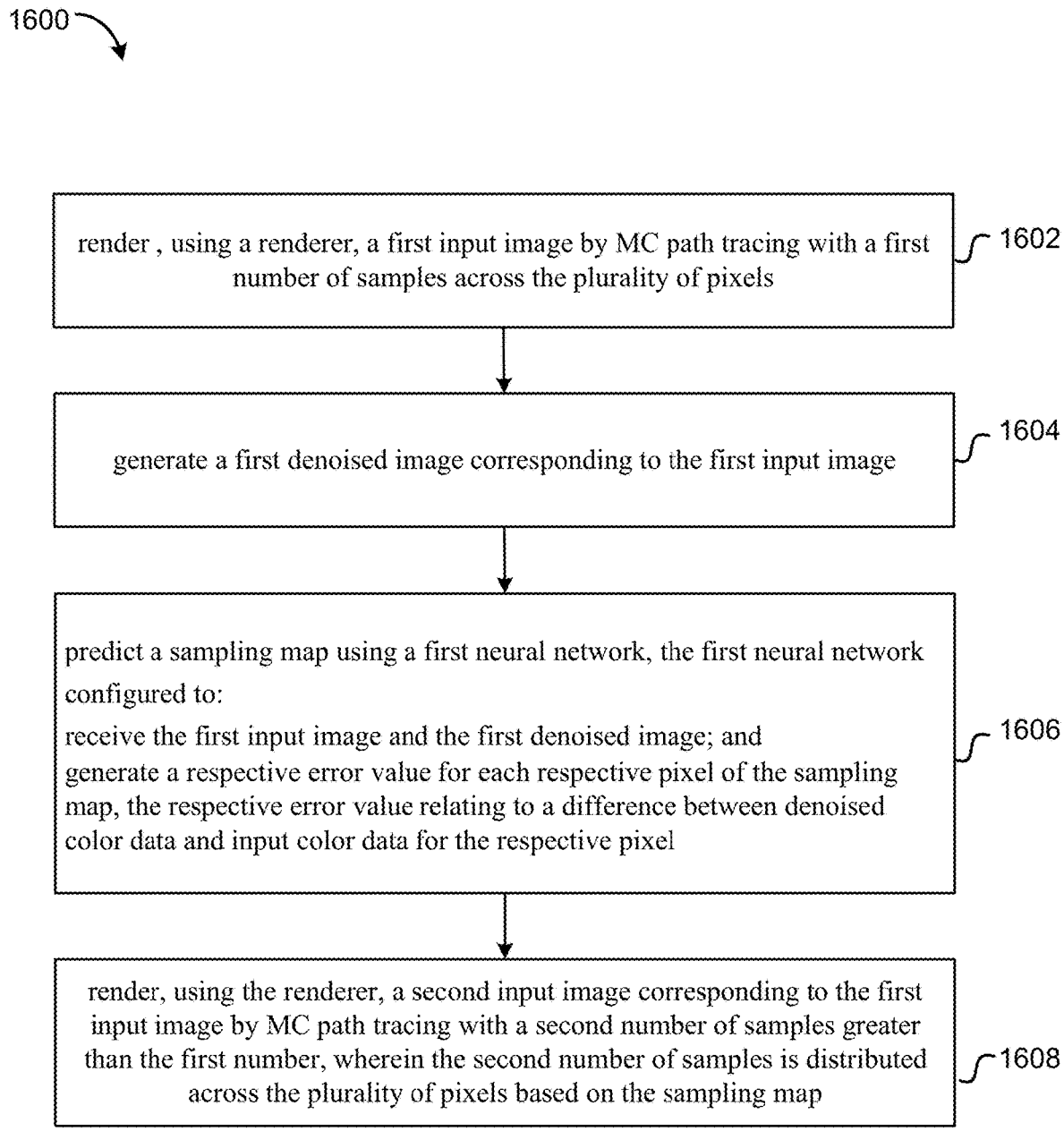
FIG. 16 is a flowchart illustrating a method of rendering images by MC path tracing using adaptive sampling according to some embodiments.

FIG. 16 is a flowchart illustrating a method 1600 of rendering images by MC path tracing using adaptive sampling according to some embodiments.

At 1602, a first input image is rendered using a renderer by MC path tracing. The first input image includes a plurality of pixels and includes input color data for each pixel. The first input image is rendered with a first number of samples across the plurality of pixels. In some embodiments, the first input image is rendered with the first number of samples uniformly distributed across the plurality of pixels.

At 1604, a first denoised image corresponding to the first input image is generated. The first denoised image includes the plurality of pixels and includes denoised color data for each pixel. The first denoised image may be generated, for example, using a neural network.

At 1606, a sampling map is predicted using a first neural network. The sampling map includes the plurality of pixels. The first neural network is configured to receive the first input image and the first denoised image, and generate a respective error value for each respective pixel of the sampling map. The respective error value relates to a difference between denoised color data and input color data for the respective pixel.

At 1608, a second input image corresponding to the first input image is rendered using the renderer by MC path tracing. The second input image includes the plurality of pixels, and is rendered with a second number of samples greater than the first number. The second number of samples is distributed across the plurality of pixels based on the sampling map. In some embodiments, the second input image is rendered with the second number of samples distributed across the plurality of pixels such that a number of samples for each respective pixel is proportional to the respective error value of the respective pixel in the sampling map. For example, the number of samples for each respective pixel may be linearly or quadratically proportional to the respective error value of the respective pixel in the sampling map. In some embodiments, the second number of samples may be multiples (e.g., two times, three times, or four times) of the first number of samples.

It should be appreciated that the specific steps illustrated in FIG. 16 provide a particular method of rendering images by MC path tracing according to some embodiments. Other sequences of steps may also be performed according to alternative embodiments. For example, alternative embodiments may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

IX. Exemplary Embodiments

The different datasets used for training and evaluation are discussed below. The details of how the models are trained are also discussed.

A. Training, Validation, and Testing Data

In some embodiments, three datasets, where the first two contain production data and the last one consists of data from publicly available scenes, are used for training. Each dataset features different visual content and was generated with a different renderer with different approaches to obtaining motion vectors. The training sets include 7-frame sequences—each rendered at several sample-per-pixel (spp) rates that were produced by writing out intermediate results progressively during rendering. A high-quality reference image is rendered for the center frame of each sequence and is used as the target for denoising (referred herein as "prediction"). Several frames from each of these sets are held out for validation (e.g. evaluating convergence and picking hyper-parameters).

In order to evaluate performance, five test sets are prepared. Three of them include additional held-out frames from the same sources as training data and include the same visual content. The remaining two test sets represent content that none of the networks in the experiments was trained on, enabling testing the ability to generalize and adapt to unseen data.

Table 1 shows information about the training, validation, and test datasets used in some exemplary embodiments. The data column reports the number of unique, 7-frame-long sequences×the number of different samples per pixel (spp) rates that they were obtained with.

TABLE 1

| Name | Used for | Data | Characteristics |
|---|---|---|---|
| FIRST DATASET | Training | 174 × 4 | First renderer; adaptive |
| | Validation | 5 × 4 | low-discrepancy |
| | Testing | 4 × 4 | sampling; rendered |
| SECOND DATASET | Testing | 10 × 4 | motion vectors |
| THIRD DATASET | Training | 290 × 3 | Second renderer; uniform |
| | Validation | 6 × 3 | low-discrepancy |
| | Testing | 6 × 3 | sampling; |
| FOURTH DATASET | Testing | 10 × 4 | optical-flow motion vectors |
| FIFTH DATASET | Training | 1200 | Third renderer; uniform |
| | Validation | 3 × 4 | independent sampling; |
| | Testing | 6 × 4 | rendered motion vectors |

In all cases, the inputs to the network include color (3 channels), color-variance (1 channel), albedo (3 channels), normal (3 channels), and depth (1 channel) buffers. However, the definition of each buffer may vary depending on the renderer. For example, color-variance may be obtained differently for low-discrepancy and independent samplers.

In some embodiments, similarly to Bako et al. [2017] [Steve Bako et al., Kernel-Predicting Convolutional Networks for Denoising Monte Carlo Renderings. ACM Transactions on Graphics (Proceedings of SIGGRAPH 2017) 36, 4, Article 97 (2017), 97:1-97:14 pages. https://doi.org/10.1145/3072959.3073708], rendered outputs are decomposed into diffuse and specular buffers and are denoised separately. However, unlike Bako et al. [[Steve Bako et al., Kernel-Predicting Convolutional Networks for Denoising Monte Carlo Renderings. ACM Transactions on Graphics (Proceedings of SIGGRAPH 2017) 36, 4, Article 97 (2017), 97:1-97:14 pages. https://doi.org/10.1145/3072959.3073708]], where a different network is employed for denoising each component, here, a single network may be used on each of the components independently. A single source-aware encoder may be used for all components.

B. Implementation and Training

In some embodiments, the networks are implemented in TensorFlow [Martin Abadi, Ashish Agarwal, Paul Barham et al., *TensorFlow: Large-Scale Machine Learning on Heterogeneous Systems* (2015). http://tensorflow.org/ Software available from tensorflow.org] and optimize them using Adam. Trainable weights were initialized using Xavier initialization [Xavier Glorot and Yoshua Bengio, 2010. In *International conference on artificial intelligence and statistics*, 249-256]. In some embodiments, KPCN predicts 21×21 scalar kernels.

In some embodiments, for training, 128×128 patches may be randomly extracted from the training dataset and fed into the network in mini-batches of size 12 (learning rate, $\eta=10^{-4}$) for training the single-frame and multi-scale modules, and in mini-batches of size 3 ($\eta=0.25\times10^{-4}$) for training the temporal network. The patches may be selected adaptively depending on the content using the selection process described by Bako et a. [2017] [Steve Bako et al., Kernel-Predicting Convolutional Networks for Denoising Monte Carlo Renderings. ACM Transactions on Graphics (Proceedings of SIGGRAPH 2017) 36, 4, Article 97 (2017), 97:1-97:14 pages. https://doi.org/10.1145/3072959.3073708].

During training, the performance may be evaluated on a validation dataset-using one that corresponds to the training dataset but contains different images-after every 2048 iterations. Training may be terminated when the training wall-clock time reaches seven days and the best-performing instance may be retained.

C. Comparisons

The denoisers according to some embodiments may be compared to two state-of-the-art methods: the NFOR denoiser [Benedikt Bitterli et al. Nonlinearly Weighted First-order Regression for Denoising Monte Carlo Renderings. *Computer Graphics Forum* 35, 4 (2016), 107-117] and a variant of the recurrent approach proposed by Chaitanya et al. [2017][Chakravarty R. A., Chaitanya Anton Kaplanyan et al., 2017. *ACM Trans. Graph. (Proc. SIGGRAPH)* (2017)]. In order to ensure a fair comparison to the latter, a single-frame, direct-prediction network may be pre-trained with the same dimensions as the proposed network. Recurrent connections are then added to obtain a temporal context. The temporal network is then trained on sequences to directly predict the denoised color of the center frame. In this way, the recurrent network has an equivalent number of parameters and accesses to the same amount of training data as those according to embodiments of the present invention. This approach is referred to as R-DP. A direct reimplementation of the method by Chaitanya et al. [2017][Chakravarty R. A., Chaitanya Anton Kaplanyan et al., 2017. *ACM Trans. Graph. (Proc. SIGGRAPH)* (2017)] is also considered. But it does not yield better results than R-DP. Thus, the present method is compared primarily to R-DP, which puts emphasis on the main concepts rather than particular implementation details.

D. Results and Analysis

The impact of the various components of the modular architecture, as well as the asymmetric loss and adaptive sampling scheme, are discussed below. While some improvements may appear subtle, they may be important for high quality results and use in production environments.

1. Source-Aware Encoder

Table 2 shows reconstruction accuracies of denoising networks using source-aware encoders. Three networks are trained: one using the first dataset rendered by the first renderer (as shown in Table 1), one using the third dataset rendered by the second renderer (as shown in Table 1), and one using both the first dataset and the third dataset with the source-aware encoder that extracts a common input representation. The Hyperion-specific network generalizes poorly to RenderMan data, and vice versa, whereas the network trained with both robustly handles all datasets.

TABLE 2

| 1-SSIM (rel.) | First renderer | | | Second renderer |
| --- | --- | --- | --- | --- |
| | First dataset | Second dataset | Third dataset | Fourth dataset |
| Trained on the first dataset | 13.31% | 5.25% | 18.89% | 18.68% |
| Trained on the third dataset | 21.08% | 8.67% | 7.89% | 12.25% |
| Trained on both the first and the third datasets | 12.91% | 5.07% | 7.87% | 12.18% |

As illustrated in Table 2, the network performs rather poorly on the third and fourth datasets rendered by the second renderer when trained with the first dataset rendered by the first renderer; similarly, the network performs rather poorly on the first and second datasets rendered by the first renderer when trained with the third dataset rendered by the second renderer. This suggests a poor generalization across rendering engines. However, when trained using both the first dataset rendered by the first render and the third dataset rendered by the second render, the network can robustly handle both sources, including content that it has not experienced (e.g., the second dataset and the fourth dataset). Note that the combined training yields marginally better results than networks that are specialized for a particular renderer, presumably due to the increased training set size.

According to some embodiments, adaptation of an existing network to novel data via lightweight retraining, and the performance as a function of the training-set size are investigated. Two experiments are conducted: 1) training a third-renderer-aware encoder for a pre-trained network with frozen weights (which used the combination of the first and third training datasets), and 2) training the network from scratch using a separate fifth training dataset rendered by the third renderer (as shown in Table 1)—this may represent a naive baseline. Various subsets of the fifth training dataset (from only 75, up to all 1200) are used to evaluate the network performance as the volume of training data increases.

2. Temporal Denoiser

Figure 17:
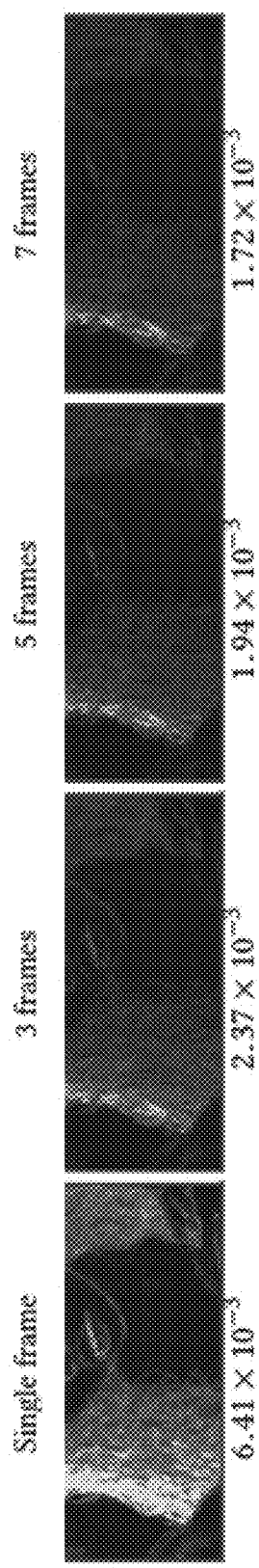
FIG. 17 illustrates the increased stability of a temporal denoiser according to some embodiments.

One of the goals of a denoiser may be to improve temporal coherence and reduce flickering in denoised sequences. FIG. 17 illustrates the increased stability of a temporal denoiser according to some embodiments as discussed above, by visualizing how the average difference between denoised adjacent frames in a static sequence decreases as the temporal window is increased. False-colored, mean 1-SSIM is computed between adjacent frames of a sequence with 24 renders of the same scene. Each render uses a different random-number seed. Bright values correspond to high temporal instability.

While a main goal of the temporal denoiser may be to alleviate flickering artifacts, it has the added benefit of improving detail reconstruction in mostly static regions as well.

Figure 18:
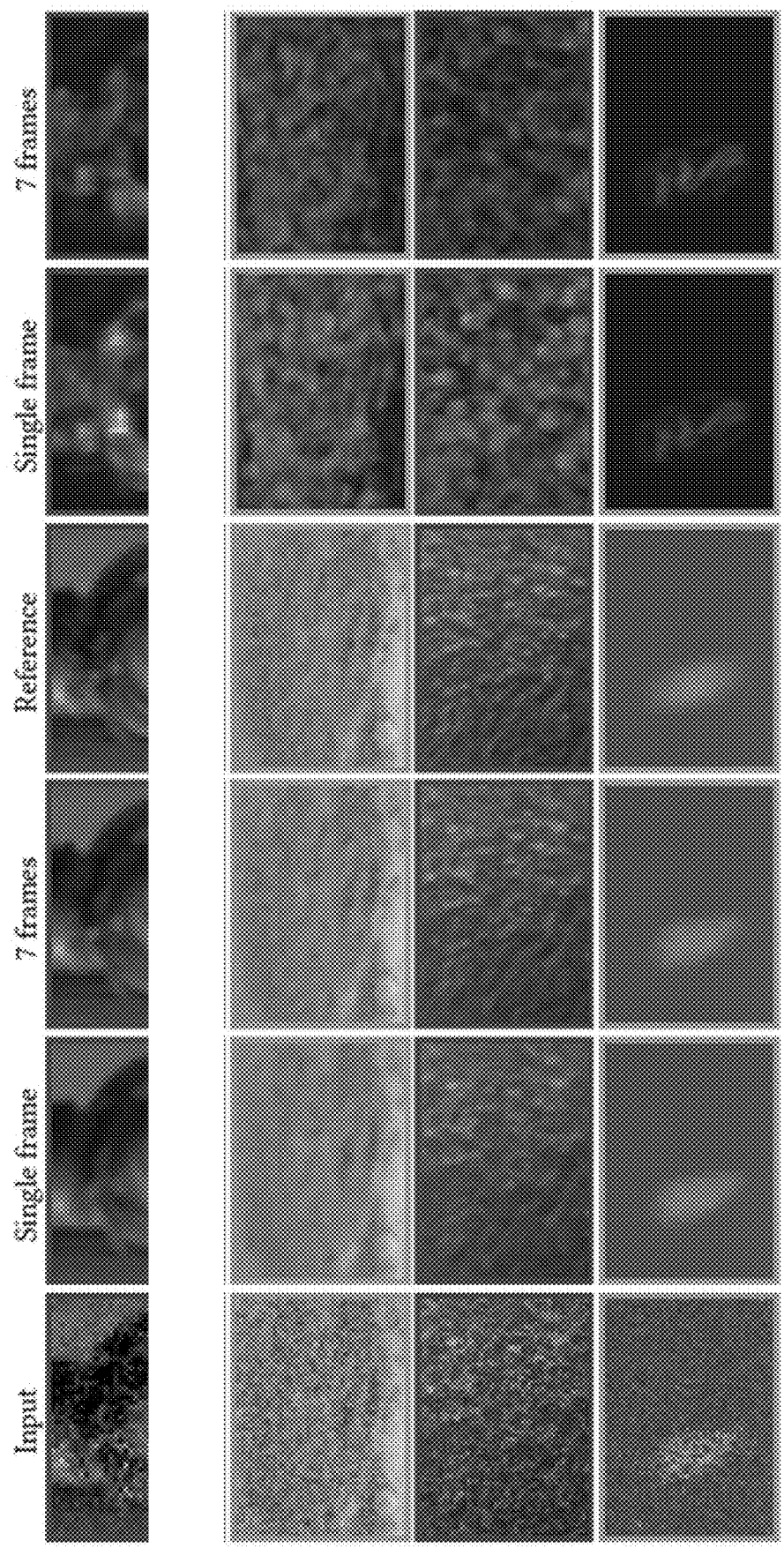
FIG. 18 shows performance comparisons of the temporal network for four different crops (in four rows) according to some embodiments of the present invention.

FIG. 18 shows performance comparisons of the temporal network (as discussed above) for four different crops (in four rows) according to some embodiments of the present invention. As illustrated, considering larger temporal windows may help not only with temporal flickering (see FIG. 17), but may also increase the quality of the reconstruction. The reconstruction error (1-SSIM, right-most two columns) is reduced for largely static content (top three rows of crops), and stable for moving content (bottom row of crops).

The temporal architecture according to some embodiments as discussed above uses the proposed temporal combiner, which predicts reconstruction kernels for all frames in the temporal window at once. To compare this design to the recurrent architecture used in Chaitanya et al. [2017] [Chakravarty R. A., Chaitanya Anton Kaplanyan et al., 2017. ACM Trans. Graph. (Proc. SIGGRAPH) (2017)], the temporal combiner in the modular architecture is replaced with a recurrent combiner that predicts denoised colors directly—this approach is denoted as R-DP. In order to train R-DP, a spatial-feature extractor (two weeks) is pre-trained, and its weights are then fixed. Its last feature layer is then used as the input to the recurrent combiner. The spatial-feature extractor was trained with a direct-prediction backend, to ensure the features extracted are useful for this task.

Figure 19:
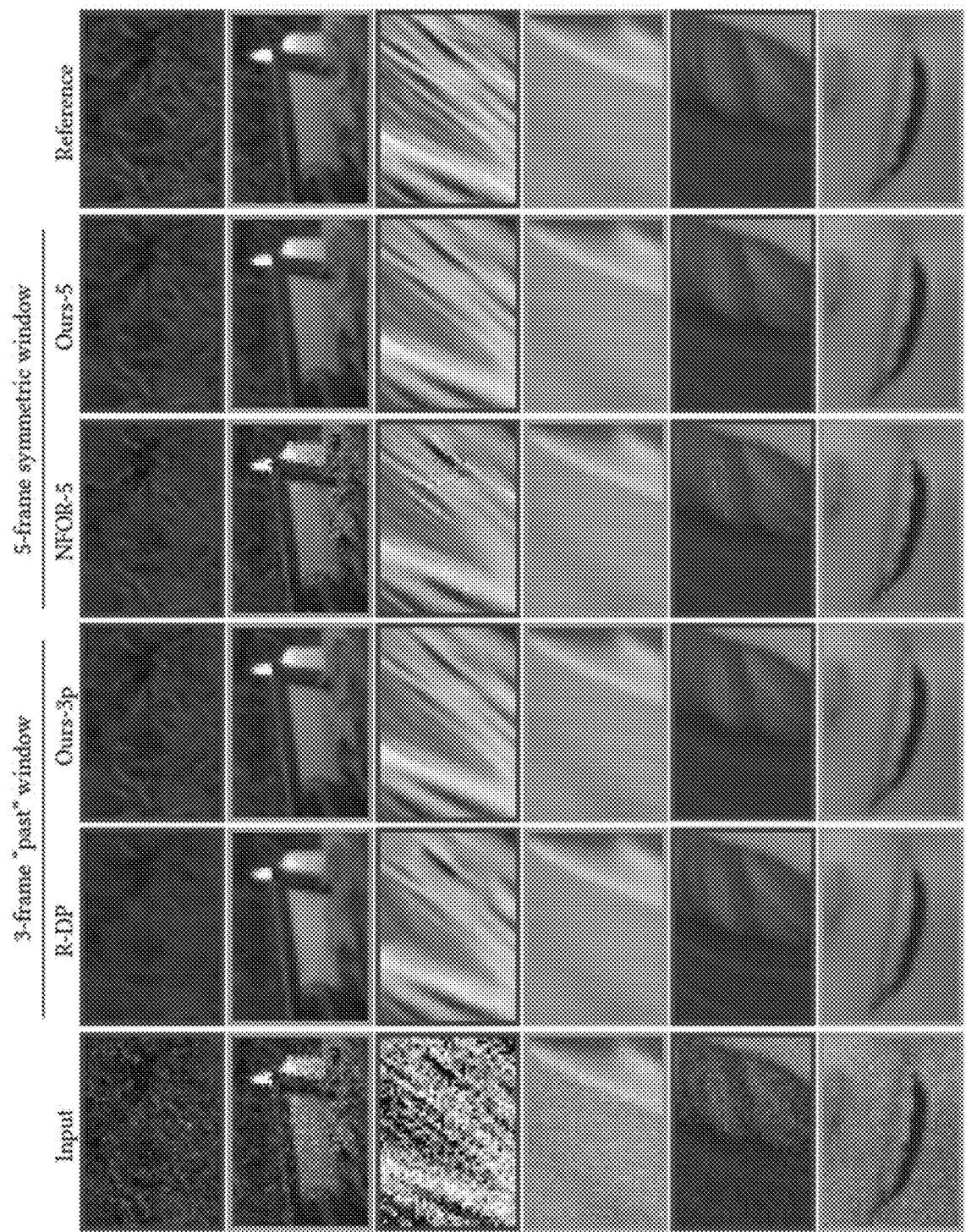
FIG. 19 compares the performances of the kernel-prediction temporal combiner (Ours) according to some embodiments to those of the direct-prediction recurrent combiner (R-DP), and the NFOR denoiser.

FIG. 19 compares the performances of the kernel-prediction temporal combiner (Ours) to those of the direct-prediction recurrent combiner (R-DP), and the NFOR denoiser. R-DP is designed to use only previous frames, whereas NFOR can handle symmetric temporal windows; results for the kernel-prediction combiner in both configurations are shown. Both networks, R-DP and Ours-3p, are trained for the same time (2 weeks of training for the single-frame feature extractor, 1 week of training for the temporal combiner). As illustrated, on the test data, R-DP results suffer from over-blurring, as well as brightness- and color-shift artifacts. When comparing to the NFOR denoiser [Benedikt Bitterli et al., 2016. Nonlinearly Weighted First-order Regression for Denoising Monte Carlo Renderings. Computer Graphics Forum 35, 4 (2016), 107-117], a symmetric temporal window (2 previous, 2 next) is used for both denoisers (NFOR-5, Ours-5). As illustrated, the NFOR results are sharp overall, but suffer from residual noise artifacts, whereas the temporal network according to the present embodiments produces consistently smooth results while preserving details.

Figure 20C:
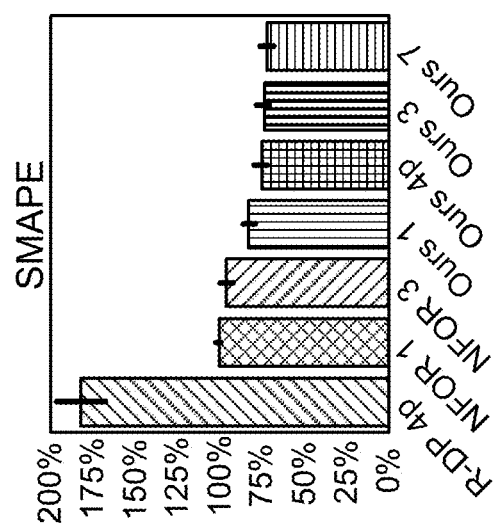
FIGS. 20A-20C show errors averaged over the datasets using temporal denoisers according to some embodiments, relative to a single-frame denoiser, for three evaluation metrics, 1-SSIM, MrSE, and SMAPE, (lower is better,) respectively.
Figure 20B:
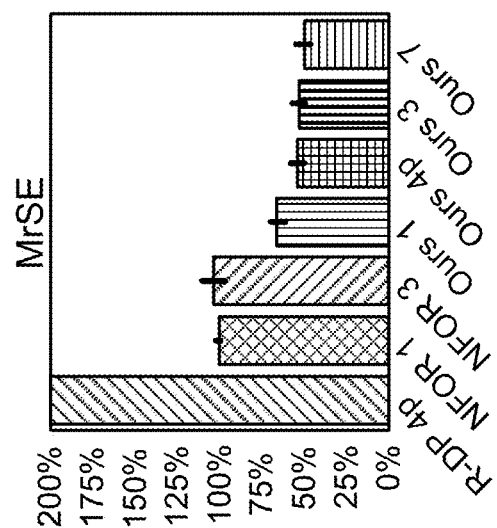
Figure 20A:
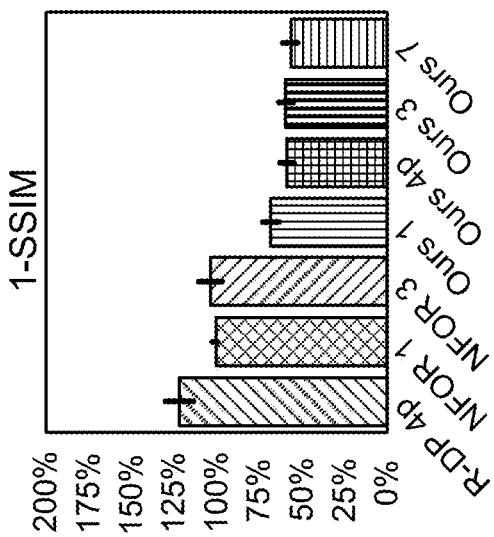

FIGS. 20A-20C show a quantitative comparison on three error metrics, 1-SSIM, MrSE, and SMAPE, (lower is better,) respectively, between methods using temporal denoisers according to some embodiments, averaged over all frames in the second dataset and the fourth dataset (as shown in Table 1), relative to the performance of a single-frame NFOR baseline. The recurrent direct-prediction combiner 'R-DP 4p' and 'Ours 4p' operate on past frames. All other denoisers use symmetric temporal windows indicated by the number in their name. The performance of only NFOR3 improves in terms of the SMAPE metric.

3. Multi-Scale Architecture

Figure 21:
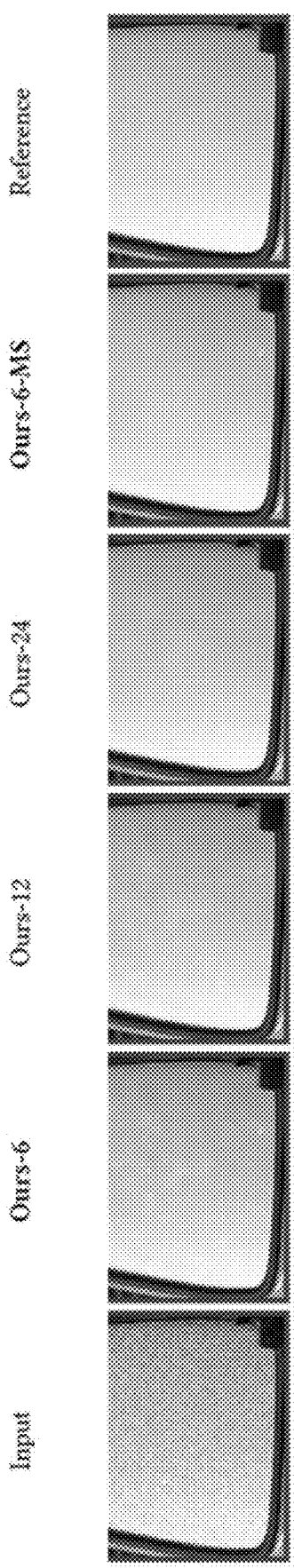
FIG. 21 shows multi-scale reconstruction results according to some embodiments.

Residual low-frequency noise artifacts, blotches, may sometimes visually distracting. As discussed above, multi-scale denoising neural networks may be constructed to mitigate low-frequency noise artifacts according to some embodiments. FIG. 21 shows multi-scale reconstruction results according to some embodiments. As illustrated, the occurrence of residual low-frequency noise is dominated by the network depth (e.g., the number of residual blocks 855 as shown in FIG. 8B), not the kernel size. As the network depth is increased (from Ours-6 to Ours-12, and to Ours-24), low-frequency blotches gradually vanish, even though the kernel size is fixed. Effectively, with 24 residual blocks, the network leverages information gathered over a 97×97 pixels footprint when predicting the 21×21 kernel, which explains the improved handling of low frequencies. As illustrated, using the multi-scale kernel-prediction architecture, low-frequency artifacts may be drastically reduced, achieving visually pleasing results with a shallow 6-block network. The multi-scale architecture (Ours-6-MS) can yield smooth result even with a shallow network, enabling good results in memory- or run-time-constrained environments.

4. Asymmetric Loss

Figure 22:
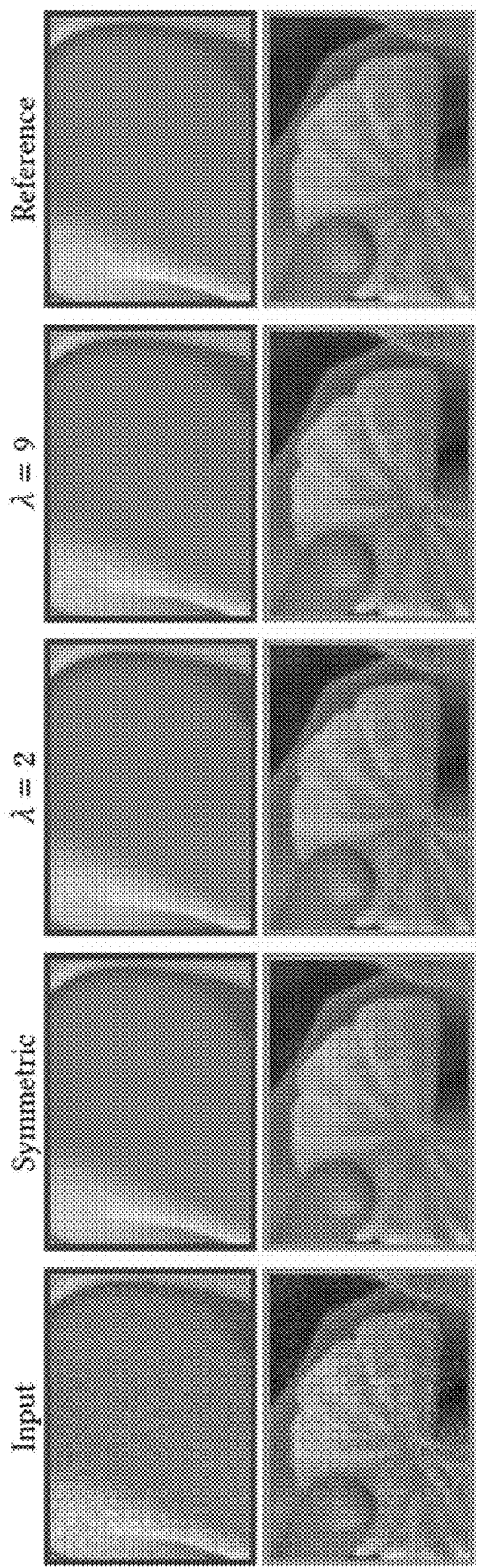
FIG. 22 shows results using asymmetric loss according to some embodiments, compared to those using symmetric loss.

An asymmetric loss may be used to fine-tune a trained network to enable user control over the variance-bias trade off according to some embodiments, as discussed above. FIG. 22 shows results using asymmetric loss according to some embodiments, as compared to those using symmetric loss. The asymmetry parameter λ (as discussed above) may give a user a fine-grained control over the denoiser's variance-bias trade-off. As illustrated, increasing λ (thus increased asymmetry) allows the network to resort to solutions that feature some of the input noise instead of enforcing an overly smooth result. Leaving a small amount of residual noise also helps preserving input details.

5. Adaptive Sampling

Figure 23:
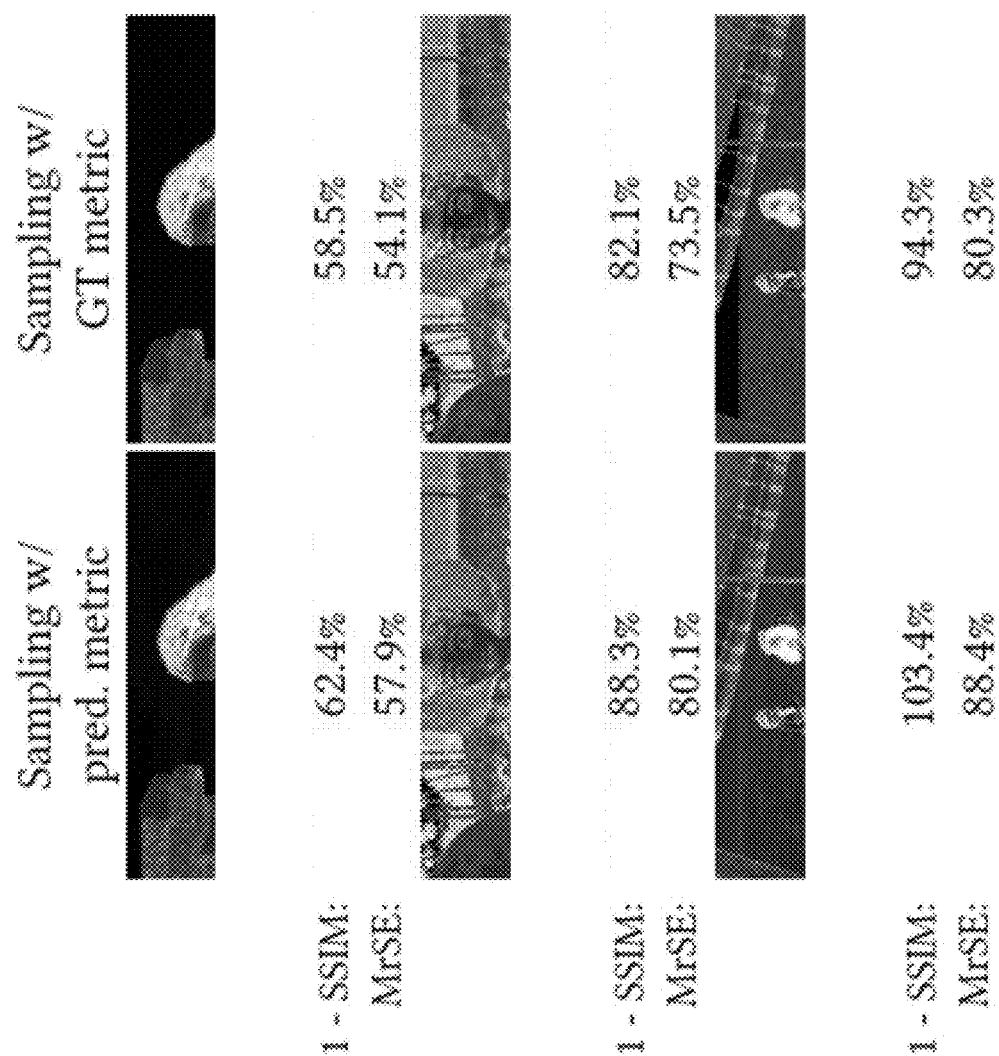
FIG. 23 shows results using adaptive sampling according to some embodiments, compared to uniform sampling, according to both MrSE and SSIM.

As discussed above, residual noise in a denoised image may be further reduced via adaptive sampling according to some embodiments. FIG. 23 shows results using adaptive sampling at 512 spp according to some embodiments, as compared to uniform sampling, according to both MrSE and SSIM. Samples are distributed using the SAPE loss predicted by the network, which resulted in sample distributions that capture the general distribution obtained using the ground-truth loss, computed using the reference image. 11 scenes are adaptively sampled using the SAPE-predicting network as a guide (see FIGS. 15A and 15B for a comparison of sampling metrics). The results are visualized for the best (top row) median (middle row), and worst (bottom row) error relative to uniform sampling, according to SSIM. As illustrated, in the worst case (bottom row), the adaptive result was slightly worse according to SSIM, but still offered a significant improvement according to MrSE. In the best case, both the SSIM and MrSE losses were reduced by approximately 40% relative to uniform sampling. The predicted sampling map (left column) correctly captures the overall distribution of the ground-truth sampling map (right column). The relative reconstruction error, with respect to uniform sampling, when using the predicted and ground-truth maps are given under each (lower is better).

6. Runtime Cost

The denoising time of a video sequence of resolution 1920×804 with the 7-frame temporal denoiser with 21×21 kernel prediction is 10.2 s per frame. This time can be broken down in the cost of the spatial-feature extractor (3.0 s per frame), running the temporal combiner (2 s per frame), and kernel prediction (5.2 s per frame). These numbers are averages over 100 experiments and are recorded with an Nvidia Titan X (Pascal) GPU. The frames are denoised in 8 overlapping spatial tiles of size 544×466 to fit the GPU memory.

7. Analysis of KPCN

Kernel prediction has been observed empirically to converge faster with greater stability than direct prediction [Steve Bako et al., 2017. Kernel-Predicting Convolutional Networks for Denoising Monte Carlo Renderings. ACM Transactions on Graphics (Proceedings of SIGGRAPH 2017) 36, 4, Article 97 (2017), 97:1-97:14 pages. https://doi.org/10.1145/3072959.3073708; Simon Niklaus, Long Mai, and Feng Liu, 2017. In *The IEEE Conference on Computer Vision and Pattern Recognition (CVPR)*; Vogels 2016]. In this section, theoretical evidence is provided to explain these observations. The convergence behavior of a shallow, convex analogue of KPCN is analyzed and compared against its direct-prediction variant. In Appendix B, it is demonstrated that kernel prediction is implicitly performing mirror descent [Amir Beck and Marc Teboulle, 2003. Operations Research Letters 31, 3 (2003), 167-175] on a function constrained on the probability simplex with an entropic regularizer (see Sébastien Bubeck, *Foundations and Trends® in Machine Learning* 8, 3-4 (2015), 231-358]; Shai Shalev-Shwartz et al, *Foundations and Trends® in Machine Learning* 4, 2 (2012), 107-194] for an in-depth treatment of mirror descent). Established results in convex optimization can be leveraged to show that optimizing the kernel prediction problem may enjoy an exponential improvement in convergence speed over otherwise equivalent direct-prediction methods with respect to the dimensionality of the parameter space.

Since the structure of the KPCN and DPCN networks proposed by Steve Bako et al., 2017. Kernel-Predicting Convolutional Networks for Denoising Monte Carlo Renderings. ACM Transactions on Graphics (Proceedings of SIGGRAPH 2017) 36, 4, Article 97 (2017), 97:1-97:14 pages. https://doi.org/10.1145/3072959.3073708] differ only in the final layer, the following "shallow", convex analogue of KPCN is considered. Given a set of data points $x^n \in \mathbb{R}^d$ and corresponding targets $y^n \in \mathbb{R}$ for n=1, ..., N, one may solve:

$$\operatorname*{argmin}_{\theta \in \Theta} l(\theta) = \operatorname*{argmin}_{\theta \in \Theta} \frac{1}{N} \sum_{n=1}^{N} f_n(y^n - \theta^T x^n), \qquad (20)$$

where $f_n$ is a convex loss function (e.g. squared or absolute error). For direct prediction, the parameter space is $\Theta \subseteq \mathbb{R}^d$. For kernel prediction the parameter space $\Theta = \Delta_d = \{\theta \in \mathbb{R}_+^d : \Sigma_{j=1}^d \theta_j = 1\}$ is restricted to the probability simplex.

The following proposition characterizes the difference in rate of convergence between kernel and direct prediction. Specifically, it compares the loss evaluated on the averaged sequence of solutions after T≥1 update steps, $$l\left(\frac{1}{T} \sum_{t=1}^{T} \theta^{(t)}\right)$$

with the loss at the optimum, $l(\theta^*)$. This is exactly the setting in which ubiquitously used adaptive convex optimization algorithms (e.g. ADAGRAD [John Duchi, Elad Hazan, and Yoram Singer, *Journal of Machine Learning Research* 12, July (2011), 2121-2159] and ADAM [Diederik P. Kingma and Jimmy Ba, 2014. Adam: A Method for Stochastic Optimization. CoRR abs/1412.6980 (2014). http://arxiv.org/abs/1412.6980]) have been analyzed. Recently, David Balduzzi et al., 2017. Neural Taylor Approximations: Convergence and Exploration in Rectifier Networks. In *Proceedings of the 34th International Conference on Machine Learning (Proceedings of Machine Learning Research)*, Doina Precup and Yee Whye Teh (Eds.), Vol. 70. PMLR, International Convention Centre, Sydney, Australia, 351-360. http://proceedings.mlr.press/v70/balduzzi17c.html] used this framework to obtain convergence guarantees for a more general class of non-convex, nonsmooth deep neural networks (including convolutional networks with ReLU non-linearities).

a) Proposition 1

Define $$E_{Kernel} \triangleq l\left(\frac{1}{T} \sum_{t=1}^{T} \theta^{(t)}\right) - l(\theta^*)$$

as the suboptimality of the solution to (6) with $\Theta=\mathbb{R}^d$ after T iterations. Similarly, define $E_{Direct}$ as the suboptimality of the solution to the same regression problem where $\Theta \subseteq \mathbb{R}_d$. Therefore, $$E_{Kernel} = O\left(\sqrt{\frac{\log d}{T}}\right), \text{ and } E_{Direct} = O\left(\sqrt{\frac{d}{T}}\right). \tag{21}$$

The proof is provided in Appendix B. Proposition 1 states that kernel prediction achieves exponentially faster convergence—in terms of the dimension of the parameter space, d—than direct prediction. This analysis of the simplest, convex analogue of kernel prediction goes some way towards explaining the large empirical improvement in convergence speed and stability of KPCN over its direct prediction variants.

As discussed above, a modular denoising architecture that extends kernel-predicting networks [Steve Bako et al., 2017. Kernel-Predicting Convolutional Networks for Denoising Monte Carlo Renderings. ACM Transactions on Graphics (Proceedings of SIGGRAPH 2017) 36, 4, Article 97 (2017), 97:1-97:14 pages. https://doi.org/10.1145/3072959.3073708; Vogels 2016], enabling temporal and multi-scale filtering, is presented. The theoretical benefit in terms of convergence speed of kernel prediction over direct prediction is discussed, which supports empirical observations and further justifies its use in the modular denoising architecture.

Source-aware encoders are proposed, which are able to robustly handle diverse data from multiple different rendering systems over a wide range of sampling rates. The temporal approach extracts and combines feature representations from neighboring frames rather than building a temporal context using recurrent connections. As such it may require fewer reference images (relative to the size of the training set) for training. The system is evaluated by comparing its performance to recently published methods demonstrating consistent state-of-the-art results across all test data.

An asymmetric loss function is also proposed, which may offer a user control on the denoiser variance-bias tradeoff. A decision theoretic justification is provided, which posits that, when uncertain, the network will choose to retain residual noise rather than over-blurring. It is empirically confirmed that the asymmetric loss retains subtle details but may not simply increase the noise level uniformly in the image.

X. Example Systems

Figure 24:
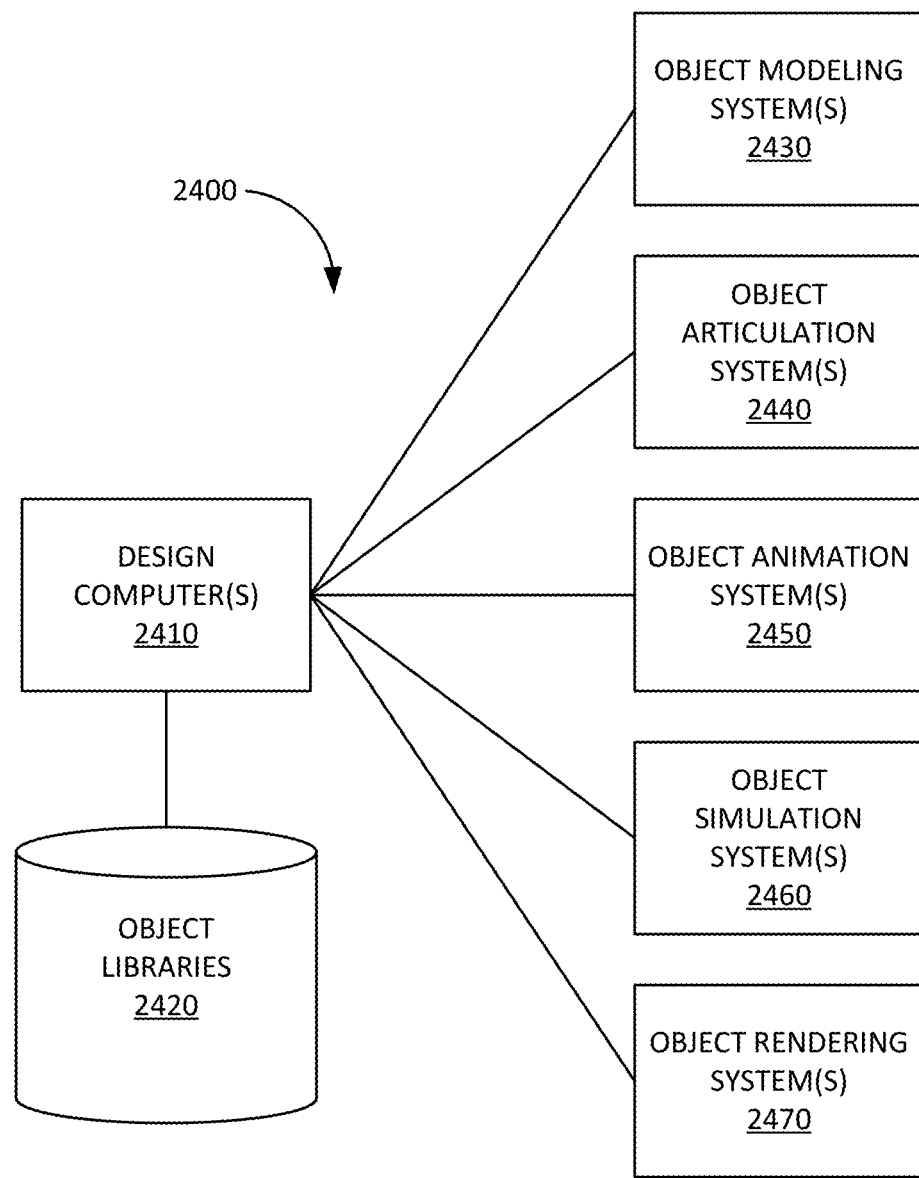
FIG. 24 is a simplified block diagram of system for creating computer graphics imagery (CGI) and computer-aided animation that may implement or incorporate various embodiments.

FIG. 24 is a simplified block diagram of system 2400 for creating computer graphics imagery (CGI) and computer-aided animation that may implement or incorporate various embodiments. In this example, system 2400 can include one or more design computers 2410, object library 2420, one or more object modeler systems 2430, one or more object articulation systems 2440, one or more object animation systems 2450, one or more object simulation systems 2460, and one or more object rendering systems 2470. Any of the systems 2430-2470 may be invoked by or used directly by a user of the one or more design computers 2410 and/or automatically invoked by or used by one or more processes associated with the one or more design computers 2410. Any of the elements of system 2400 can include hardware and/or software elements configured for specific functions.

The one or more design computers 2410 can include hardware and software elements configured for designing CGI and assisting with computer-aided animation. Each of the one or more design computers 2410 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 2410 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 2410 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 2410 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 2410 acting as an animator may employ one or more systems or tools to specify motion and position of one or more objects over time to produce an animation.

Object library 2420 can include elements configured for storing and accessing information related to objects used by the one or more design computers 2410 during the various stages of a production process to produce CGI and animation. Some examples of object library 2420 can include a file, a database, or other storage devices and mechanisms. Object library 2420 may be locally accessible to the one or more design computers 2410 or hosted by one or more external computer systems.

Some examples of information stored in object library 2420 can include an object itself, metadata, object geometry, object topology, rigging, control data, animation data, animation cues, simulation data, texture data, lighting data, shader code, or the like. An object stored in object library 2420 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 2430 can include hardware and/or software elements configured for modeling one or more objects. Modeling can include the creating, sculpting, and editing of an object. In various embodiments, the one or more object modeling systems 2430 may be configured to generate a model to include a description of the shape of an object. The one or more object modeling systems 2430 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 2430 may further generate model data (e.g., 2D and 3D model data) for use by other elements of system 2400 or that can be stored in object library 2420. The one or more object modeling systems 2430 may be configured to allow a user to associate additional information, metadata, color, lighting, rigging, controls, or the like, with all or a portion of the generated model data.

The one or more object articulation systems 2440 can include hardware and/or software elements configured to articulating one or more computer-generated objects. Articulation can include the building or creation of rigs, the rigging of an object, and the editing of rigging. In various embodiments, the one or more articulation systems 2440 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 2440 may further generate articulation data (e.g., data associated with controls or animations variables) for use by other elements of system 2400 or that can be stored in object library 2420. The one or more object articulation systems 2440 may be configured to allow a user to associate additional information, metadata, color, lighting, rigging, controls, or the like, with all or a portion of the generated articulation data.

The one or more object animation systems 2450 can include hardware and/or software elements configured for animating one or more computer-generated objects. Animation can include the specification of motion and position of an object over time. The one or more object animation systems 2450 may be invoked by or used directly by a user of the one or more design computers 2410 and/or automatically invoked by or used by one or more processes associated with the one or more design computers 2410.

In various embodiments, the one or more animation systems 2450 may be configured to enable users to manipulate controls or animation variables or utilized character rigging to specify one or more key frames of animation sequence. The one or more animation systems 2450 generate intermediary frames based on the one or more key frames. In some embodiments, the one or more animation systems 2450 may be configured to enable users to specify animation cues, paths, or the like according to one or more predefined sequences. The one or more animation systems 2450 generate frames of the animation based on the animation cues or paths. In further embodiments, the one or more animation systems 2450 may be configured to enable users to define animations using one or more animation languages, morphs, deformations, or the like.

The one or more object animation systems 2450 may further generate animation data (e.g., inputs associated with controls or animation variables) for use by other elements of system 2400 or that can be stored in object library 2420. The one or more object animation systems 2450 may be configured to allow a user to associate additional information, metadata, color, lighting, rigging, controls, or the like, with all or a portion of the generated animation data.

The one or more object simulation systems 2460 can include hardware and/or software elements configured for simulating one or more computer-generated objects. Simulation can include determining motion and position of an object over time in response to one or more simulated forces or conditions. The one or more object simulation systems 2460 may be invoked by or used directly by a user of the one or more design computers 2410 and/or automatically invoked by or used by one or more processes associated with the one or more design computers 2410.

In various embodiments, the one or more object simulation systems 2460 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 2460 may be used to simulate the behavior of objects, such as hair, fur, and cloth, in response to a physics model and/or animation of one or more characters and objects within a computer-generated scene.

The one or more object simulation systems 2460 may further generate simulation data (e.g., motion and position of an object over time) for use by other elements of system 2400 or that can be stored in object library 2420. The generated simulation data may be combined with or used in addition to animation data generated by the one or more object animation systems 2450. The one or more object simulation systems 2460 may be configured to allow a user to associate additional information, metadata, color, lighting, rigging, controls, or the like, with all or a portion of the generated simulation data.

The one or more object rendering systems 2470 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 2470 may be invoked by or used directly by a user of the one or more design computers 2410 and/or automatically invoked by or used by one or more processes associated with the one or more design computers 2410. One example of a software program embodied as the one or more object rendering systems 2470 can include PhotoRealistic RenderMan, or PRMan, produced by Pixar Animations Studios of Emeryville, Calif.

In various embodiments, the one or more object rendering systems 2470 can be configured to render one or more objects to produce one or more computer-generated images or a set of images over time that provide an animation. The one or more object rendering systems 2470 may generate digital images or raster graphics images.

In various embodiments, a rendered image can be understood in terms of a number of visible features. Some examples of visible features that may be considered by the one or more object rendering systems 2470 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air), shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 2470 may further render images (e.g., motion and position of an object over time) for use by other elements of system 2400 or that can be stored in object library 2420. The one or more object rendering systems 2470 may be configured to allow a user to associate additional information or metadata with all or a portion of the rendered image.

Figure 25:
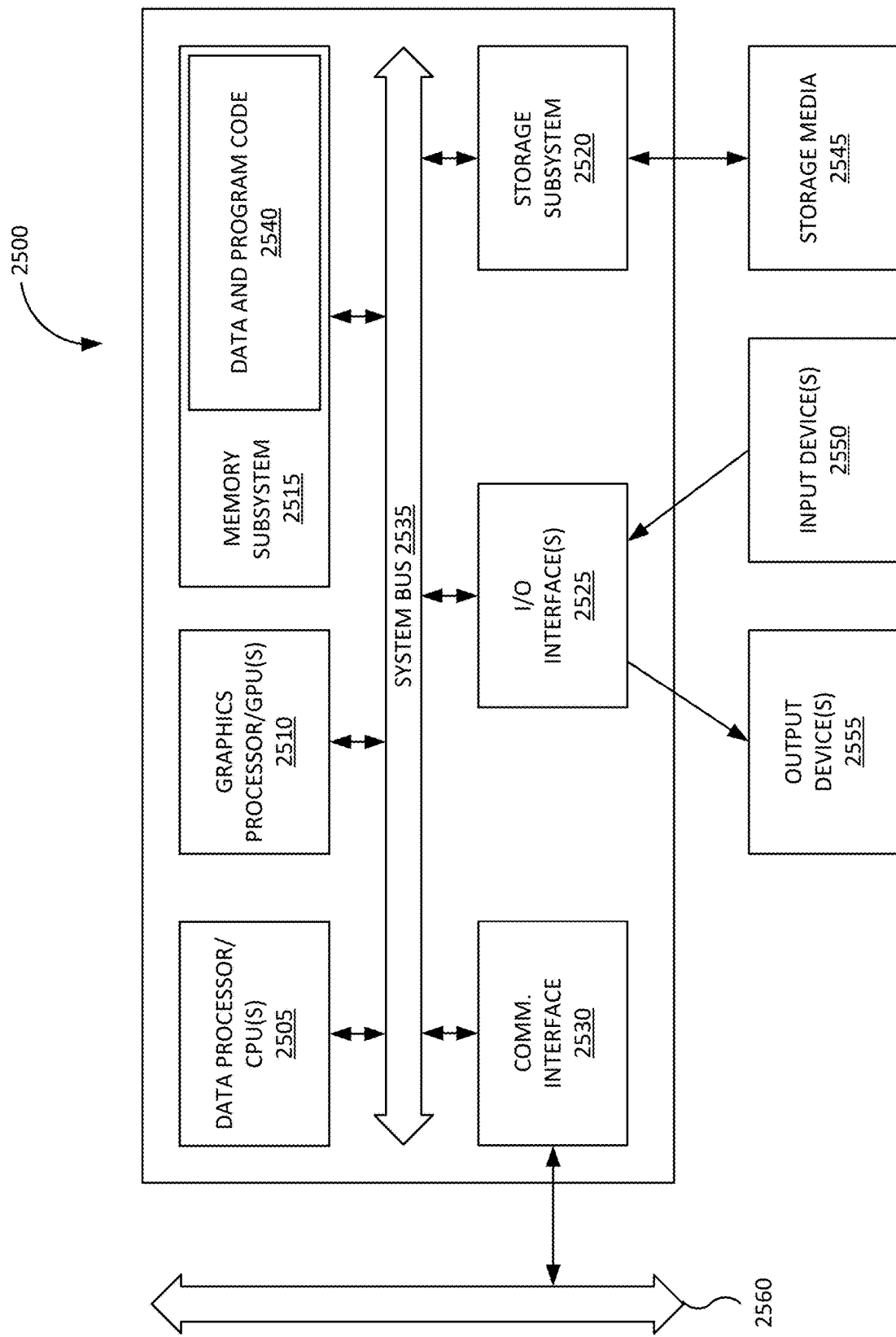
FIG. 25 is a block diagram of a computer system according to some embodiments of the present invention.

FIG. 25 is a block diagram of computer system 2500. FIG. 25 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 2500 and any of its components or subsystems can include hardware and/or software elements configured for performing methods described herein.

Computer system 2500 may include familiar computer components, such as one or more data processors or central processing units (CPUs) 2505, one or more graphics processors or graphical processing units (GPUs) 2510, memory subsystem 2515, storage subsystem 2520, one or more input/output (I/O) interfaces 2525, communications interface 2530, or the like. Computer system 2500 can include system bus 2535 interconnecting the above components and providing functionality, such connectivity as inter-device communication.

The one or more data processors or central processing units (CPUs) 2505 can execute logic or program code or for providing application-specific functionality. Some examples of CPU(s) 2505 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 2510 can execute logic or program code associated with graphics or for providing graphics-specific functionality. GPUs 2510 may include any conventional graphics processing unit, such as those provided by conventional video cards. In various embodiments, GPUs 2510 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 2510 may include any number of registers, logic units, arithmetic units, caches, memory interfaces, or the like.

Memory subsystem 2515 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 2515 can include data and program code 2540.

Storage subsystem 2520 can also store information using machine-readable articles, information storage devices, or computer-readable storage media. Storage subsystem 2520 may store information using storage media 2545. Some examples of storage media 2545 used by storage subsystem 2520 can include floppy disks, hard disks, optical storage media such as CD-ROMS, DVDs and bar codes, removable storage devices, networked storage devices, or the like. In some embodiments, all or part of data and program code 2540 may be stored using storage subsystem 2520.

The one or more input/output (I/O) interfaces 2525 can perform I/O operations. One or more input devices 2550 and/or one or more output devices 2555 may be communicatively coupled to the one or more I/O interfaces 2525. The one or more input devices 2550 can receive information from one or more sources for computer system 2500. Some examples of the one or more input devices 2550 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 2550 may allow a user of computer system 2500 to interact with one or more non-graphical or graphical user interfaces to enter a comment, select objects, icons, text, user interface widgets, or other user interface elements that appear on a monitor/display device via a command, a click of a button, or the like.

The one or more output devices 2555 can output information to one or more destinations for computer system 2500. Some examples of the one or more output devices 2555 can include a printer, a fax, a feedback device for a mouse or joystick, external storage systems, a monitor or other display device, a communications interface appropriately configured as a transceiver, or the like. The one or more output devices 2555 may allow a user of computer system 2500 to view objects, icons, text, user interface widgets, or other user interface elements. A display device or monitor may be used with computer system 2500 and can include hardware and/or software elements configured for displaying information.

Communications interface 2530 can perform communications operations, including sending and receiving data. Some examples of communications interface 2530 may include a network communications interface (e.g. Ethernet, Wi-Fi, etc.). For example, communications interface 2530 may be coupled to communications network/external bus 2560, such as a computer network, a USB hub, or the like. A computer system can include multiple of the same components or subsystems, e.g., connected together by communications interface 2530 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 2500 may also include one or more applications (e.g., software components or functions) to be executed by a processor to execute, perform, or otherwise implement techniques disclosed herein. These applications may be embodied as data and program code 2540. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 2515 and/or storage subsystem 2520.

Such programs may also be encoded and transmitted using carrier signals adapted for transmission via wired, optical, and/or wireless networks conforming to a variety of protocols, including the Internet. As such, a computer readable medium according to examples described herein may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of this disclosure. However, other embodiments of the disclosure herein may be directed to specific embodiments relating to each individual aspect, or specific combinations of these individual aspects.

The above description of exemplary embodiments of this disclosure have been presented for the purposes of illustration and description. It is not intended to be exhaustive or to limit this disclosure to the precise form described, and many modifications and variations are possible in light of the teaching above. The embodiments were chosen and described in order to best explain the principles of this disclosure and its practical applications to thereby enable others skilled in the art to best utilize this disclosure in various embodiments and with various modifications as are suited to the particular use contemplated.

A recitation of "a," "an" or "the" is intended to mean "one or more" unless specifically indicated to the contrary.

All patents, patent applications, publications, and descriptions mentioned here are incorporated by reference in their entirety for all purposes. None is admitted to be prior art.

APPENDIX A: DECISION THEORETIC ANALYSIS OF ASYMMETRIC LOSS

A decision-theoretic interpretation of the mechanism that allows the network to remain conservative in certain situations is provided below. For a (pixel-wise) loss $l(r_p, d_p)$ and a distribution $p(r_p|c_p)$ which governs the probability of observing a particular reference given a noisy input pixel, p, the Bayes optimal solution [Kevin P. Murphy, 2012. *Machine Learning: A Probabilistic Perspective*. MIT Press] is given by $\mathrm{argmin}_{d_p}(d_p|c_p)$ where $$\tau(d_p|c_p) = \mathbb{E}_{p(r_p|c_p)}[l(r_p,d_p)] = \int l(r_p,d_p)p(r_p|c_p)dr_p. \tag{22}$$

For loss functions that operate only on the distance between the two arguments, i.e. $l(r,d)=l(d-r,0)$, Eq. (22) takes the form of a convolution of the loss with the likelihood, $$r(d_p|c_p) = \int l(d_p-r_p,0)p(r_p|c_p)dr_p \tag{23}$$

In case of symmetric loss functions and unimodal, symmetric distributions p, the convolution changes only the shape of the loss not its minimum.

Our proposed $l_\lambda''$ (Eq. (19)) is, however, asymmetric with a steeper slope on the side opposite the input to penalize strong deviations (e.g. excessive blurring). The convolution will thus shift the minimum towards the noisy input with the parameter $\lambda$ controlling the amount of offsetting; see FIGS. 12A-12B and FIGS. 26A-26B for illustrations. Therefore, solutions closer to the noisy input will be preferred. The offset of the minimum will be more pronounced when p tends towards a uniform distribution and less-so as p tends towards a delta distribution.

Figure 26A:
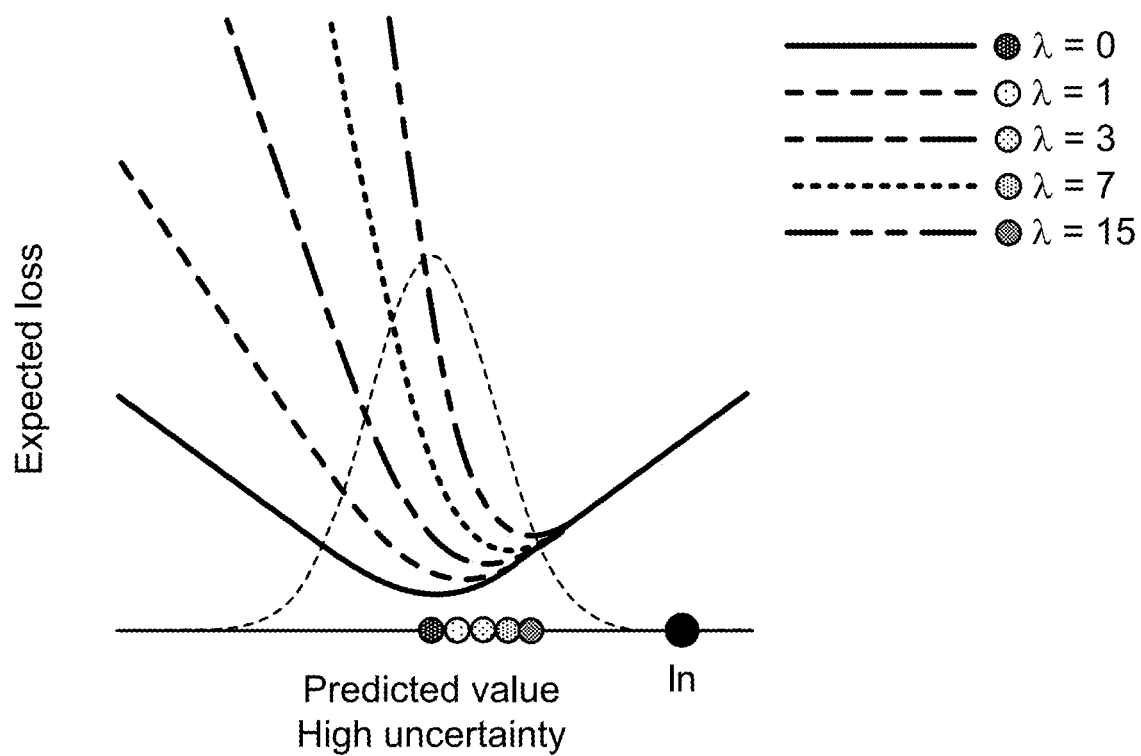
FIGS. 26A and 26B show expected loss as a function of the predicted intensity for a given pixel for a wide and narrow likelihood p, respectively, indicated by the thin dashed lines according to some embodiments.
Figure 26B:
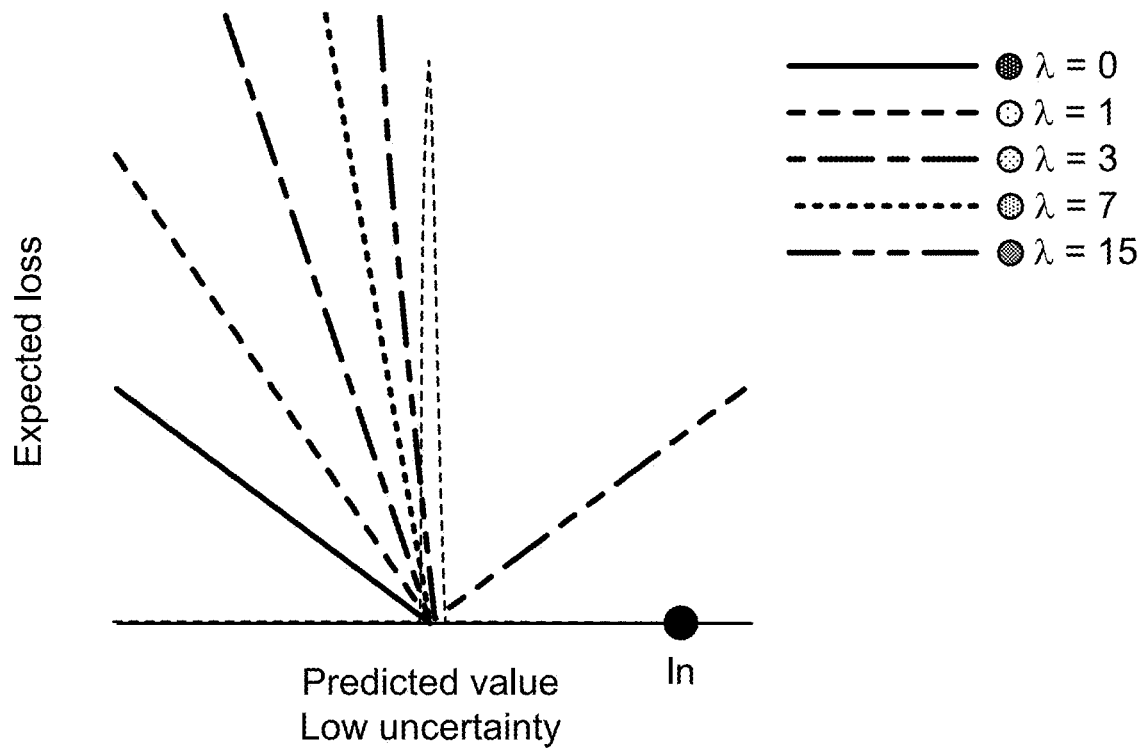

FIGS. 26A and 26B show expected loss as a function of the predicted intensity for a given pixel for a wide and narrow likelihood p, respectively, indicated by the thin dashed lines according to some embodiments. The noisy input color is denoted by "In." The thicker lines are the expected loss under asymmetric loss with varying levels of asymmetry ($\lambda=0$ amounts to a symmetric loss). The wider the likelihood, which can be interpreted as larger uncertainty of the network, the faster the minimum of this function shifts towards the input as the asymmetry level increases.

If assuming that the network learns an estimate $q \equiv p(r_p|c_p)$, it will minimise the expected loss $\mathbb{E}_q l(r_p, d_p)$ by adjusting its output based on its uncertainty in the relationship $\mathbb{E}$ between input and reference. For pixels where the uncertainty is high, it will tend to retain some of the input noise, rather than blurring, thus preserving detail. Exposing λ to the user provides a direct control over the performance of the denoiser.

APPENDIX B: MIRROR DESCENT

This section gives a basic definition of the mirror descent algorithm [Amir Beck and Marc Teboulle, 2003. *Operations Research Letters* 31, 3 (2003), 167-175]. The equivalence between gradient descent updates to the shallow kernel prediction problem in (20) and a special case of the mirror descent algorithm is then shown. Definition B.1 and Proposition B.3 rely on standard concepts from convex optimization. The readers are referred to Bubeck [Sébastien Bubeck, *Foundations and Trends® in Machine Learning* 8, 3-4 (2015), 231-358] for a comprehensive treatment of the subject.

1. Definition B.1 (Mirror Descent)

For a convex function $l(\theta)$, which is L-Lipschitz with respect to an arbitrary norm, $\|\cdot\|$, mirror descent is an iterative algorithm for solving $\mathrm{argmin}_{\theta \in \Theta} l(\theta)$. Let the mirror map $\Phi: \Theta \to \mathbb{R}$ be a function ρ-strongly convex under $\|\cdot\|$. The mirror descent update at iteration t with a learning rate $\eta > 0$ is given by $$z^{(t)} = z^{(t-1)} - \eta \nabla l(\theta^{(t-1)}) \quad (24)$$

$$\theta^{(t)} = \frac{\mathrm{argmax}\, \theta^T z^{(t)} - \Phi(\theta)}{\theta \in \Theta} \quad (25)$$

2. Proposition B.2

For a convex function in θ, $l(\theta)$, performing gradient descent kernel prediction updates is equivalent to mirror descent updates on (20) with entropic regularizer $\Phi(\theta) = \sum_{j=1}^{d} \theta_j \log \theta_j$ where the parameter space $\Theta = \Delta_d$ is restricted to the probability simplex.

3. Proof

The solution to (25) under the conditions in the proposition is $\theta^{(t)} = \mathrm{softmax}(z^{(t)})$. Recall from above, for (20) kernel prediction performs the following update $$z^{(t)} = z^{(t-1)} - \eta \nabla_\theta l(\theta^{(t-1)}), \theta^{(t)} = \mathrm{softmax}(z^{(t)}).$$

This is precisely an update iteration of the normalized exponential gradient descent algorithm, a special case of mirror descent [Shai Shalev-Shwartz et al, *Foundations and Trends® in Machine Learning* 4, 2 (2012), 107-194].

4. Proposition B.3

[Theorem 4.2 from Sébastien Bubeck, *Foundations and Trends® in Machine Learning* 8, 3-4 (2015), 231-358] Define the radius $R^2 = \sup_{\theta \in \Theta} \Phi(\theta) - \Phi(\theta^{(1)})$ where $\theta^{(1)} \in \mathrm{argmin}_{\theta \in \Theta} \Phi(\theta)$. Mirror descent as described in Proposition 10 with a learning rate, $$\eta = \frac{R}{L}\sqrt{\frac{2\rho}{T}}$$

achieves a convergence rate $$E \triangleq l\left(\frac{1}{T}\sum_{t=1}^{T} \theta^{(t)}\right) - l(\theta^*) \leq RL\sqrt{\frac{2}{\rho T}}.$$

We are now ready to provide the proof of Proposition 1.

5. Proof of Proposition 1

From Proposition B.2, it may be seen that performing kernel prediction updates is equivalent to mirror descent with $\Phi(\theta) = \sum_{j=1}^{d} \theta_j \log \theta_j$. $\Phi$ is 1-strongly convex with respect to $\|\cdot\|_1$, so $\rho = 1$. It may also been seen that $\Theta = \Delta_d$ so $R^2 = \log d$.

Performing direct prediction updates using stochastic gradient descent is equivalent to performing mirror descent updates with the mirror map $\Phi(\theta) = \frac{1}{2}\|\theta\|^2$ which is $\rho = 1$-strongly in $\|\cdot\|_2$. In this setting, $\Theta \subset \mathbb{R}^d$ so the radius $R^2 = d$. Plugging these into Proposition B.3 yields the result.

6. Discussion

In the convex setting, the optimal convergence rate for stochastic first-order optimization methods (such as SGD) is $\mathcal{O}(1/\sqrt{T})$ and cannot be improved without further assumptions (e.g. using second order information, or variance reduction [Aurélien Lucchi, Brian McWilliams, and Thomas Hofmann, *arXiv preprint arXiv:*1503.08316 (2015)]).

However, popular methods for optimizing deep networks such as AdaGrad and Adam perform adaptive updates which can greatly improve convergence speed [John Duchi, Elad Hazan, and Yoram Singer, *Journal of Machine Learning Research* 12, July (2011), 2121-2159]. However, this improvement is typically only realized under restrictive assumptions (e.g. data sparsity or low-rankness [Gabriel Krummenacher et al., 2016. In *Advances in Neural Information Processing Systems*. 1750-1758]). Practically, adaptive optimization methods often show no improvement over well-tuned SGD [Ashia C Wilson et al., *arXiv preprint arXiv:*1705.08292 (2017)].

In contrast, mirror descent with entropic regularization shows a theoretical exponential improvement over SGD regardless of the data distribution. In fact, mirror descent can be shown to be a second-order algorithm [Garvesh Raskutti and Sayan Mukherjee, *arXiv preprint arXiv:*1310.7780 (2013)]. This goes some way to explaining why-even though both KPCN and DPCN employ the Adam optimizer—KPCN shows a substantial improvement in training speed and convergence stability over DPCN.

Kernel prediction has been proposed concurrently as adaptive convolution for video interpolation [Simon Niklaus, Long Mai, and Feng Liu, 2017. In *The IEEE Conference on Computer Vision and Pattern Recognition (CVPR)*]. It should be noted that the analysis developed here also applies. However, B. Mildenhall et al., *ArXiv e-prints* (December 2017). arXiv:cs.CV/1712.02327, modified the kernel prediction output to remove the softmax. This breaks the equivalence with mirror descent and so the theoretical improvement no longer applies.

What is claimed is:

1. A method of denoising images rendered by Monte Carlo (MC) path tracing, the method comprising:
   receiving an input image rendered by MC path tracing, the input image including a plurality of pixels and input color data for each pixel;
   receiving a reference image corresponding to the input image, the reference image including the plurality of pixels and reference color data for each pixel;
   receiving a proportionality constant factor for each pixel, the proportionality constant factor being a positive real number;

configuring a neural network comprising:
  an input layer configured to receive the input image;
  a plurality of hidden layers including a plurality of nodes, a first layer of the plurality of hidden layers coupled to the input layer; and
  an output layer coupled to a last layer of the plurality of hidden layers and configured to output an output image corresponding to the input image, the output image comprising the plurality of pixels and including output color data for each pixel; and
training the neural network using the input image and the reference image, the training comprising:
  performing a first iteration of the training to obtain a first output image and an intermediate set of parameters associated with the plurality of nodes of the plurality of hidden layers;
  determining values of a loss function for the plurality of pixels by:
    for each respective pixel of the plurality of pixels:
      determining a first difference between output color data and reference color data for the respective pixel;
      determining a second difference between input color data and reference color data for the respective pixel;
      upon determining that the first difference and the second difference have a same sign, assigning a first respective value of the loss function for the respective pixel that relates to an absolute value of the first difference multiplied by a first proportionality constant of unity; and
      upon determining that the first difference and the second difference have opposite signs, assigning a second respective value of the loss function for the respective pixel that relates to the absolute value of the first difference multiplied by a second proportionality constant that is equal to unity plus the proportionality constant factor for the respective pixel;
  back-propagating a gradient of the loss function through the neural network to obtain an updated intermediate set of parameters associated with the plurality of nodes of the plurality of hidden layers; and
  performing additional iterations of the training to obtain a final output image and an optimized set of parameters associated with the plurality of nodes of the plurality of hidden layers.

2. The method of claim 1, further comprising:
receiving a new input image rendered by MC path tracing; and
generating a denoised image corresponding to the new input image by passing the new input image through the neural network using the optimized set of parameters.

3. The method of claim 1, wherein the proportionality constant factor varies from pixel to pixel.

4. The method of claim 1, wherein the proportionality constant factor is same for all pixels.

5. The method of claim 1, wherein the neural network comprises a convolutional neural network.

6. The method of claim 5, wherein the neural network comprises:
a kernel prediction module configured to generate a set of weights associated with a neighborhood of pixels around each pixel; and
a reconstruction module configured to reconstruct the output image using the set of weights.

7. The method of claim 1, wherein the neural network comprises a multilayer perceptron neural network.

8. The method of claim 1, wherein the loss function comprises relative squared error (rSE).

9. The method of claim 1, wherein the loss function comprises symmetric absolute percentage error (SAPE).

10. The method of claim 1, wherein the loss function comprises structural similarity (SSIM) error or multi-scale structural similarity (MS-SSIM) error.

11. A computer product comprising a non-transitory computer readable medium storing a plurality of instructions that when executed control a computer system to denoise images rendered by Monte Carlo (MC) path tracing, the instructions comprising:
receiving an input image rendered by MC path tracing, the input image including a plurality of pixels and input color data for each pixel;
receiving a reference image corresponding to the input image, the reference image including the plurality of pixels and reference color data for each pixel;
receiving a proportionality constant factor for each pixel, the proportionality constant factor being a positive real number;
configuring a neural network comprising:
  an input layer configured to receive the input image;
  a plurality of hidden layers including a plurality of nodes, a first layer of the plurality of hidden layers coupled to the input layer; and
  an output layer coupled to a last layer of the plurality of hidden layers and configured to output an output image corresponding to the input image, the output image comprising the plurality of pixels and including output color data for each pixel; and
training the neural network using the input image and the reference image, the training comprising:
performing a first iteration of the training to obtain a first output image and an intermediate set of parameters associated with the plurality of nodes of the plurality of hidden layers;
determining values of a loss function for the plurality of pixels by:
  for each respective pixel of the plurality of pixels:
    determining a first difference between output color data and reference color data for the respective pixel;
    determining a second difference between input color data and reference color data for the respective pixel;
    upon determining that the first difference and the second difference have a same sign, assigning a first respective value of the loss function for the respective pixel that relates to an absolute value of the first difference multiplied by a first proportionality constant of unity; and
    upon determining that the first difference and the second difference have opposite signs, assigning a second respective value of the loss function for the respective pixel that relates to the absolute value of the first difference multiplied by a second proportionality constant that is equal to unity plus the proportionality constant factor for the respective pixel;
back-propagating a gradient of the loss function through the neural network to obtain an updated intermediate set of parameters associated with the plurality of nodes of the plurality of hidden layers; and performing additional iterations of the training to obtain a final output image and an optimized set of parameters associated with the plurality of nodes of the plurality of hidden layers.

12. The computer product of claim 11, wherein the instructions further comprising:

receiving a new input image rendered by MC path tracing; and generating a denoised image corresponding to the new input image by passing the new input image through the neural network using the optimized set of parameters.

13. The computer product of claim 11, wherein the proportionality constant factor varies from pixel to pixel.

14. The computer product of claim 11, wherein the proportionality constant factor is same for all pixels.

15. The computer product of claim 11, wherein the neural network comprises a convolutional neural network.

16. The computer product of claim 15, wherein the neural network comprises a kernel prediction module configured to generate a set of weights associated with a neighborhood of pixels around each pixel; and a reconstruction module configured to reconstruct the output image using the set of weights.

17. The computer product of claim 11, wherein the neural network comprises a multilayer perceptron neural network.

18. The computer product of claim 11, wherein the loss function comprises relative squared error (rSE).

19. The computer product of claim 11, wherein the loss function comprises symmetric absolute percentage error (SAPE).

20. The computer product of claim 11, wherein the loss function comprises structural similarity (SSIM) error or multi-scale structural similarity (MS-S SIM) error.

* * * * *